(12) United States Patent
Sims et al.

(10) Patent No.: US 12,529,102 B2
(45) Date of Patent: Jan. 20, 2026

(54) SYSTEMS, METHODS, AND COMPOSITIONS FOR GENERATING MULTI-OMIC INFORMATION FROM SINGLE CELLS

(71) Applicant: The Trustees of Columbia University in the City of New York, New York, NY (US)

(72) Inventors: Peter A. Sims, Ardsley, NY (US); Timothy R. Olsen, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 920 days.

(21) Appl. No.: 17/776,655

(22) PCT Filed: Nov. 13, 2020

(86) PCT No.: PCT/US2020/060467
§ 371 (c)(1),
(2) Date: May 13, 2022

(87) PCT Pub. No.: WO2021/097250
PCT Pub. Date: May 20, 2021

(65) Prior Publication Data
US 2022/0403465 A1  Dec. 22, 2022

Related U.S. Application Data

(60) Provisional application No. 62/935,177, filed on Nov. 14, 2019.

(51) Int. Cl.
*C12Q 1/6874* (2018.01)
*C12N 15/10* (2006.01)
(Continued)

(52) U.S. Cl.
CPC ....... *C12Q 1/6874* (2013.01); *C12N 15/1065* (2013.01); *C12N 15/1096* (2013.01);
(Continued)

(58) Field of Classification Search
CPC .. C12Q 1/6874; C12Q 1/6806; C12Q 1/6809; C12Q 1/6816; C12N 15/1065; C12N 15/1096
See application file for complete search history.

(56) References Cited

U.S. PATENT DOCUMENTS 6,637,463 B1 *  10/2003  Lei ................. B01L 13/02
                                              137/841
11,542,541 B2 *  1/2023  Bibillo ............ C12Q 1/6874
(Continued)

FOREIGN PATENT DOCUMENTS

JP      2013-193988     9/2013
WO      WO 2016/145409  9/2016
(Continued)

OTHER PUBLICATIONS

International Search Report and Written Opinion for PCT/US20/60467. Mailed May 3, 2021. 22 pages.
(Continued)

*Primary Examiner* — Aaron A Priest
*Assistant Examiner* — Matthew Harold Raymonda
(74) *Attorney, Agent, or Firm* — Casimir Jones, S.C.; Rikki A. Hullinger

(57) ABSTRACT

Single-cell multi-omics by co-encapsulating a single cell with two beads, the first an RNA barcoding bead having barcoded mRNA capture primer oligonucleotides attached on the bead surface; and the second a DNA barcoding bead having two types of oligonucleotides releasably attached to the surface: (1) barcoded adapter oligonucleotides that are complementary to oligonucleotides bound to the transposase
(Continued)

that are eventually incorporated into gDNA fragments and (2) polyadenylated barcoded oligonucleotides containing the same barcode sequence as the adapters. In addition, integrated analysis of RNA and protein, including intracellular protein, from individual cells using similar co-encapsulation of a single cell, an RNA barcoding bead, and with/without a specific or non-specific protein binding bead in a microwell, to avoid protein fixation by first lysing the cell to liberate intracellular contents, and then capturing protein either on a solid surface or in solution with barcoded affinity reagents.

22 Claims, 33 Drawing Sheets

(51) Int. Cl.
 *C12Q 1/6806* (2018.01)
 *C12Q 1/6809* (2018.01)
 *C12Q 1/6816* (2018.01)

(52) U.S. Cl.
 CPC ......... *C12Q 1/6806* (2013.01); *C12Q 1/6809* (2013.01); *C12Q 1/6816* (2013.01)

(56) References Cited

U.S. PATENT DOCUMENTS

| | | |
|---|---|---|
| 2016/0265039 A1 | 9/2016 | Huang |
| 2017/0160294 A1 | 6/2017 | Neurauter et al. |
| 2018/0208975 A1 | 7/2018 | Peterson et al. |

FOREIGN PATENT DOCUMENTS

| | | | | |
|---|---|---|---|---|
| WO | WO 2016/191533 | | 12/2016 | |
| WO | WO 2017/065854 | | 4/2017 | |
| WO | WO-2017065854 | A2 * | 4/2017 | ........ B01L 3/502761 |
| WO | WO 2017/124101 | | 7/2017 | |
| WO | WO 2018/144813 | | 8/2018 | |
| WO | WO 2018/148700 | | 8/2018 | |
| WO | WO 2019/084046 | | 5/2019 | |
| WO | WO 2019/152108 | | 8/2019 | |

OTHER PUBLICATIONS

Adey et al., Rapid, low-input, low-bias construction of shotgun fragment libraries by high-density in vitro transposition. Genome Biol. 2010;11(12):R119. 1-17.
Amini et al., Haplotype-resolved whole-genome sequencing by contiguity-preserving transposition and combinatorial indexing. Nat Genet. Dec. 2014;46(12):1343-9.
Baslan et al., Genome-wide copy number analysis of single cells. Nat Protoc. May 3, 2012;7(6):1024-41.
Blanco et al., Highly efficient DNA synthesis by the phage phi 29 DNA polymerase. Symmetrical mode of DNA replication. J Biol Chem. May 25, 1989;264(15):8935-40.
Bose et al., Scalable microfluidics for single-cell RNA printing and sequencing. Genome Biol. Jun. 6, 2015;16(1):120. 1-16.
Chen et al., Single-cell whole-genome analyses by Linear Amplification via Transposon Insertion (LIANTI). Science. Apr. 14, 2017;356(6334):189-194.
Cusanovich et al., Multiplex single cell profiling of chromatin accessibility by combinatorial cellular indexing. Science. May 22, 2015;348(6237):910-4.
Dean et al., Comprehensive human genome amplification using multiple displacement amplification. Proc Natl Acad Sci U S A. Apr. 16, 2002;99(8):5261-6.
Dean et al., Rapid amplification of plasmid and phage DNA using Phi 29 DNA polymerase and multiply-primed rolling circle amplification. Genome Res. Jun. 2001;11(6):1095-9.
Dey et al., Integrated genome and transcriptome sequencing of the same cell. Nat Biotechnol. Mar. 2015;33(3):285-289.
Klein et al., Droplet barcoding for single-cell transcriptomics applied to embryonic stem cells. Cell. May 21, 2015;161(5):1187-1201.
Levitin et al., De novo gene signature identification from single-cell RNA-seq with hierarchical Poisson factorization. Mol Syst Biol. Feb. 22, 2019;15(2):e8557. 1-14.
Macaulay et al., G&T-seq: parallel sequencing of single-cell genomes and transcriptomes. Nat Methods. Jun. 2015;12(6):519-22.
Macosko et al., Highly Parallel Genome-wide Expression Profiling of Individual Cells Using Nanoliter Droplets. Cell. May 21, 2015;161(5):1202-1214.
Mizrak et al., Single-Cell Analysis of Regional Differences in Adult V-SVZ Neural Stem Cell Lineages. Cell Rep. Jan. 8, 2019;26(2):394-406.e5.
Nam et al., Somatic mutations and cell identity linked by Genotyping of Transcriptomes. Nature. Jul. 2019;571(7765):355-360.
Navin et al., Tumour evolution inferred by single-cell sequencing. Nature. Apr. 7, 2011;472(7341):90-4.
Picelli et al., Tn5 transposase and tagmentation procedures for massively scaled sequencing projects. Genome Res. Dec. 2014;24(12):2033-40.
Shiroguchi et al., Digital RNA sequencing minimizes sequence-dependent bias and amplification noise with optimized single-molecule barcodes. Proc Natl Acad Sci U S A. Jan. 24, 2012;109(4):1347-52.
Yin et al., High-throughput mapping of meiotic crossover and chromosome mis-segregation events in interspecific hybrid mice. bioRxiv, 2018, 338053, doi:10.1101/338053. 19 pages.
Yuan et al., An Automated Microwell Platform for Large-Scale Single Cell RNA-Seq. Sci Rep. Sep. 27, 2016;6:33883. 10 pages.
Yuan et al., An Optically Decodable Bead Array for Linking Imaging and Sequencing with Single-Cell Resolution. 2018. bioRxiv, doi:10.1101/355677. 12 pages.
Yuan et al., SCOPE-Seq: a scalable technology for linking live cell imaging and single-cell RNA sequencing. Genome Biol. Dec. 24, 2018;19(1):227. 5 pages.
Yuan et al., Single-cell transcriptome analysis of lineage diversity in high-grade glioma. Genome Med. Jul. 24, 2018;10(1):57. 15 pages.
Zahn et al., Scalable whole-genome single-cell library preparation without preamplification. Nat Methods. Feb. 2017;14(2):167-173.
Zhao et al., Immune and genomic correlates of response to anti-PD-1 immunotherapy in glioblastoma. Nat Med. Mar. 2019;25(3):462-469.
Zong et al., Genome-wide detection of single-nucleotide and copy-number variations of a single human cell. Science. Dec. 21, 2012;338(6114):1622-6.
Extended European Search Report for EP 20887151.7, mailed Mar. 13, 2024, 14 pages.

\* cited by examiner

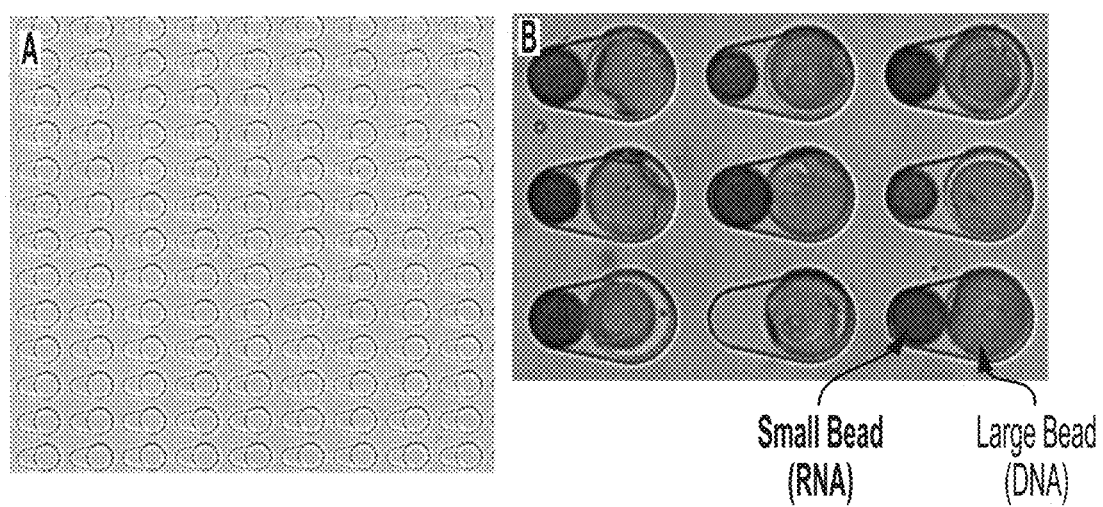
FIG. 8A-B

SYSTEMS, METHODS, AND COMPOSITIONS FOR GENERATING MULTI-OMIC INFORMATION FROM SINGLE CELLS

STATEMENT REGARDING FEDERALLY SPONSORED RESEARCH OR DEVELOPMENT

This invention was made with Government support under Contract No. U54CA209997 awarded by the National Cancer Institute (NCI) of the National Institutes of Health and grants CA202827 and HG010003 awarded by the National Institutes of Health. The Government has certain rights in the invention.

STATEMENT OF RELATED APPLICATIONS

This invention was made with government support under CA209997, CA202827 and HG010003 awarded by the National Institutes of Health. The government has certain rights in the invention.

BACKGROUND

Recent advances have enhanced the scalability of single-cell RNA-sequencing (scRNA-seq)[1-3] and even single-cell DNA-sequencing (scDNA-seq) to some extent[4]. The same cannot be said for parallel analysis of both nucleic acids from the same cell[5,6]. While scRNA-seq permits scalable mutation detection, these measurements are limited to highly expressed genes and cannot resolve copy number alterations[7].

An automated microwell platform for scRNA-seq[11] and methods for scalable linkage of scRNA-seq and live-cell imaging[8] have been developed. The microwell device (shown in FIG. 1) co-encapsulates each individual cell with a polymer bead coated in barcoded oligonucleotides that are terminated in oligo(dT) for mRNA capture and cDNA barcoding. FIG. 1B demonstrates single-cell mRNA capture—a region of a microwell array is shown in which multiple microwells contain a bead and one contains both a cell and a bead. The microwells are sealed during lysis by flowing oil over the array immediately after flowing the lysis buffer. After reverse transcription and dsDNA staining, only the bead in the microwell that contained a cell is highly fluorescent compared to other beads or compared to beads in a device with no cells. FIG. 1C is a fluorescence image of a region of a sealed microwell array after cell lysis. The cells were stained prior to lysis so that fluorophores fill the sealed microwells upon lysis.

Because the microwells are compatible with optical imaging, it is possible to integrate cell phenotypic image analysis and scRNA-seq at scale, providing access to cellular phenotypes that are difficult to infer from the transcriptome alone. The platform for scalable linkage of scRNA-seq and live-cell imaging solved the problem of barcoded capture beads being randomly deposited in microwells by using mRNA capture beads having both a sequence barcode and an optical barcode, a 'cell identifying optical barcode', that can be read out by sequential fluorescence hybridization in the device on a fluorescence microscope[8] (see FIGS. 2A-2G). This technique, known as SCOPE-seq, enables accurate linkage of scRNA-seq with live cell imaging on an unprecedented scale. This has been applied in many biological contexts for profiling human gliomas[12-14], glioma neurospheres[11], and adult neurogenesis in the brain[15].

Direct barcoding has been crucial to scRNA-seq scalability. Additionally, one can include unique molecular identifiers (UMIs) that label molecules with a specific barcode sequence prior to amplification. Not only can UMIs be used to correct amplification bias and noise, as is commonly done in single cell RNA-seq, they can also be used to correct errors induced by PCR and sequencing[22]. For example, if two reads contain the same UMI, align to the same locus, but contain different genomic sequences, then at least one of them likely contains an error.

While scWGA technology advanced significantly in recent years, stubborn technical tradeoffs remain. Key performance metrics include breadth of coverage (fraction of the genome detected), accuracy (for calling single-nucleotide variants (SNVs)), and coverage uniformity (for calling copy number variants (CNVs)).

For example, one of the earliest methods for WGA is multiple displacement amplification (MDA) which produces high-breadth but notoriously non-uniform amplification of the genome[16,17]. However, MDA is also relatively accurate due to its compatibility with a proofreading DNA polymerase, such as Φ29 DNA polymerase[18]. Multiple annealing and looping based amplification cycles (MALBAC) also produces high-breadth WGA, but with higher uniformity[19]. But MALBAC has notoriously low accuracy because it is incompatible with Φ29 DNA polymerase, and instead employs Bst exo-DNA polymerase[19]. Finally, degenerate oligonucleotide primed PCR (DOP-PCR) produces highly uniform WGA but with very low breadth (typically <10% coverage of the genome)[20,21].

New approaches to scWGA using in vitro transposition tried to address these issues and facilitate direct barcoding of gDNA[9,23]. These methods borrow from an idea that has been used in many areas including long-range haplotyping[24] and both bulk and single-cell ATAC-seq[25] that is commonly known as "tagmentation"[26]. Tagmentation uses a hyperactive transposase (typically Tn5 transposase), which can bind tightly to double-stranded DNA, fragment it, and ligate universal and/or barcoded adapters into either end of the resulting fragment[26]. The transposon adapters inside the Tn5 transposase contain both cell-identifying barcodes and UMIs along with the appropriate universal sequences for direct Illumina sequencing.

FIG. 3A is a schematic of in vitro transposition with barcoded Tn5 transposases. Both cell-specific and UMI barcodes are attached to the adapters bound to each transposase, which are incorporated into gDNA fragments. Properly adapted fragments will contain two different cell-identifying barcodes, providing a simple way of combinatorially increasing the number of possible barcodes. The resulting gDNA fragments are amplified directly by PCR. The LIANTI approach has further advanced this concept by integrating linear, isothermal pre-amplification by in vitro transcription to further reduce error rates and amplification bias[23]. Another report demonstrated scalable implementation of LIANTI for scDNA-seq using split-pool barcoded transposases[4].

None of these scDNA-seq methods, however, are particularly scalable in comparison to RNA-seq.

In addition, a major disadvantage of these methods is the use of pre-amplification before library construction and PCR enrichment. WGA typically produces relatively long amplicons, which are then fragmented and converted into a sequencing library, often with additional PCR. This precludes directly integrating barcodes into the original gDNA, because subsequent fragmentation steps would dissociate the barcodes from the final, sequenced amplicons.

Further, none of these existing technologies enable linkage of scRNA-seq and DNA-seq from the same individual cells on a large scale. Similarly, existing technologies for scRNA-seq and scDNA-seq cannot link parallel measurements of both nucleic acids in individual cells to high-content, live-cell imaging.

Scaling parallel single-cell whole genome amplification (scWGA) and scRNA-seq remains challenging, despite some advances using barcoded transposases to facilitate pooled WGA for scaling up scDNA-see[9].

In addition, there are now multiple technologies for simultaneously profiling RNA and protein from the same individual cells, but stubborn limitations remain. There are two basic approaches to this problem: 1) the use of DNA-barcoded antibodies in combination with high-throughput, microfluidic single-cell RNA-seq (scRNA-seq) and 2) the use of conventional fluorophore-labeled antibodies in combination with lower-throughput, flow cytometric workflows for scRNA-seq. The former has the advantage of higher-throughput and lower cost for the scRNA-seq component and the ability to multiplex a large number (hundreds) of protein species by combining DNA-barcoded antibodies. However, this approach has thus far been limited to extracellular proteins on the cell surface. The latter suffers from lower throughput scRNA-seq because it is incompatible with microfluidics and limited to parallel analysis of a handful (tens) of protein species due to the broad spectra of fluorescent labels. While the fluorescent antibody/flow cytometry approach does enable profiling of intracellular proteins, this comes at the cost of fixation and permeabilization procedures that reduce RNA quality and compromise scRNA-seq.

The ideal technology for combined analysis of RNA and protein in individual cells would use DNA-barcoded antibodies for high multiplexing, be able to target both intracellular and surface proteins, and avoid cellular fixation. Some of the most crucial markers of cellular identity are intracellular proteins. For example, transcription factors, which can simultaneously control the expression of hundreds of other genes, play an outsized role in cell fate determination, but are notoriously difficult to detect at the RNA level due to their low expression. Many key signaling molecules and metabolic enzymes are also intracellular proteins. There is a critical unmet need for a technology for targeted, multiplexed analysis of both intracellular and surface proteins with single-cell resolution, preferably in conjunction with other genomic measurements such as RNA- or DNA-seq.

Thus, a need exists to solve these problems, allowing economic and parallel sequencing of the genomes, transcriptomes, and intra- and extracellular proteins of thousands of individual cells with the potential to link these data to single-cell imaging[8]. The present disclosure provides such solutions.

SUMMARY

The disclosure provides in one embodiment systems, methods, and compositions for linking scRNA-seq and scDNA-seq from the same individual cells on a large scale. The disclosure relates to microfluidic devices that co-encapsulate individual cells with two different barcoded beads, wherein the first bead contains barcoded mRNA capture primers for scRNA-seq, and the second bead contains releasable barcoded oligonucleotides that can hybridize to transposase-bound genomic DNA (gDNA). The second bead also includes releasable, polyadenylated barcodes that can be captured by the first bead, thereby providing data in the scRNA-seq library identifying the scDNA-seq bead co-encapsulated with each cell.

The disclosure relates to DNA-barcoding bead, including a generally spherical bead and a constellation of DNA oligonucleotides attached to the bead via a cleavable linker, wherein the DNA oligonucleotides include a plurality of barcoded adapter oligonucleotides, wherein a subset of the barcoded adapter oligonucleotides are polyadenylated. The oligonucleotides are preferably attached to the surface of the beads. The beads may be hydrogel beads, wherein oligonucleotides are also conjugated throughout the body of the bead. The linker may be an enzymatically cleavable linker, a photocleavable linker, or a chemically cleavable linker. The photocleavable linker may be photocleavable biotin. The enzymatically cleavable linker may be an enzymatically cleavable dU-base.

The disclosure provides a generally spherical DNA barcoding bead comprising a plurality of oligonucleotides attached via a cleavable linker on the bead surface, the oligonucleotides comprising:

(a) a first subset of barcoded oligonucleotides comprising a transposase adaptor, a genomic DNA (gDNA) cell barcode identical for all oligonucleotides on the bead, a PCR adaptor, and optionally a unique molecular identifier (UMI) barcode, wherein the transposase adaptor can hybridize to a transposase-integrated universal adaptor sequence in gDNA; and (b) a second subset of polyadenylated barcoded oligonucleotides comprising a PCR adaptor, the gDNA cell barcode, a poly(dA), and optionally a UMI barcode.

A suitable kit may include a RNA-barcoding bead including a constellation of oligonucleotides attached on the bead surface, wherein the oligonucleotides are barcoded mRNA capture primers, and a DNA-barcoding bead.

A suitable array device includes a plurality of asymmetric microwells, wherein each microwell viewed from above has a pear-shaped cross-section with a wider region and a narrower region, wherein the wider region has a width of about 65 to about 75 microns and a depth of about 65 to about 75 microns, and wherein the narrower region has a width of about 35 to about 45 microns and a depth of about 35 to about 45 microns.

A suitable array device includes a plurality of asymmetric microwells, wherein each microwell viewed from above has a pear-shaped cross-section with a wider region and a narrower region, wherein the wider region has a width of about 50 to about 100 microns and a depth of about 50 to about 100 microns, and wherein the narrower region has a width of about 15 to about 80 microns and a depth of about 15 to about 80 microns.

The disclosure also relates to a method of linking scRNA-seq and scDNA-seq from the same cell, including introducing a single cell into an asymmetric microwell, introducing into the microwell a DNA-barcoding bead as described herein, wherein the DNA-barcoding bead and the microwell have relative size permitting only one DNA-barcoding bead to fit in the microwell, introducing a RNA-barcoding bead into the microwell containing the DNA-barcoding bead, wherein the RNA-barcoding bead has a size permitting only one RNA-barcoding bead to fit in the microwell containing the DNA-barcoding bead, lysing the cell to release gDNA and mRNA and capture polyadenylated mRNA on the RNA-barcoding beads, washing out cell lysate under conditions to retain gDNA in the microwell, introducing a transposase into the microwell to integrate universal adapters into the gDNA; and releasing the oligonucleotides on the DNA-barcoding bead by cleavage, whereby barcoded adapters released from the DNA-barcoding bead hybridize to the universal adapters, and polyadenylated barcodes released from the DNA-barcoding bead hybridize to oligonucleotides on the RNA-barcoding bead.

In an embodiment, this method includes adding a neutralization buffer to the microwell to release transposed, barcoded gDNA fragments from the transposases, and amplifying the barcoded gDNA fragments to generate a genomic sequencing library, and reverse transcribing the captured polyadenylated mRNA to cDNA and amplifying the cDNA.

The cleavage may be by application of UV light or by addition of a cleavage enzyme. Alternatively, chemical cleavage may be used.

The microwell may be one of a plurality of microwells on an array.

The disclosure provides a method of generating linked scRNA-seq and scDNA-seq libraries, comprising: encapsulating a plurality of single cells with one each of an RNA barcoding bead and a DNA barcoding bead within an array of asymmetric microwells, wherein the RNA barcoding bead comprises a plurality of attached oligonucleotides having a cell barcode specific for said bead and a poly(dT), and wherein the DNA barcoding bead comprises a plurality of releasably attached oligonucleotides, a first set having a gDNA cell barcode specific to said bead and a transposase adaptor that can hybridize to a transposase-integrated universal adaptor sequence in gDNA and a second set having the gDNA cell barcode and a poly(dA);
  lysing the cells to release gDNA and mRNA and to capture mRNA on the RNA barcoding beads;
  cleaving and integrating the universal adapter sequence into the gDNA using a transposase, whereby a pooled genomic sequencing library can be generated from the gDNA fragments;
  releasing the oligonucleotides from the DNA barcoding beads; and
  reverse transcribing the mRNA to cDNA,
  wherein a pooled RNA sequencing library can be generated from the cDNA that also contains barcode information for linking to the gDNA fragments from the same cell.

Scalable sequencing of RNA and DNA from the same individual cells has broad utility in cancer research. Phenotypic and genotypic heterogeneity present important challenges to cancer therapy because drug resistance can emerge through clonal selection of specific mutations or phenotypic heterogeneity. Understanding the interplay between genotype and phenotype in the development of a therapeutic response requires genome-wide analysis of both the genome and transcriptome. Because resistant subpopulations are often small and tumors contain both transformed and non-neoplastic cells, analysis of thousands of individual cells is essential. This disclosure provides an automated, scalable platform for simultaneous, genome-wide analysis of RNA and DNA from thousands of individual cells.

The disclosure provides a generally spherical epitope barcoding bead comprising a plurality of oligonucleotides attached via a cleavable linker on the bead surface, the oligonucleotides comprising:
  (a) a first subset of barcoded oligonucleotides comprising a PCR adaptor, an epitope cell barcode identical for all oligonucleotides on the bead, a hybridization sequence, and optionally a unique molecular identifier (UMI) barcode, wherein the hybridization sequence can hybridize to a universal adaptor sequence on DNA barcoded antibodies or aptamers; and
  (b) a second subset of polyadenylated barcoded oligonucleotides comprising a PCR adaptor, the epitope cell barcode, a poly(dA), and optionally a UMI barcode.

The disclosure provides a method of generating pooled scRNA-seq libraries with barcode information for linking to epitopes from the same single cell, comprising:
  encapsulating a plurality of single cells with one each of an RNA barcoding bead and an epitope barcoding bead within an array of asymmetric microwells, wherein the RNA barcoding bead comprises a plurality of attached oligonucleotides having a cell barcode specific for said bead and a poly(dT), and wherein the epitope barcoding bead comprises a plurality of releasably attached oligonucleotides, a first set having an epitope cell barcode specific to said bead and a hybridization sequence that can hybridize to a to a universal adaptor sequence on DNA barcoded antibodies or aptamers, and a second set having the epitope cell barcode and a poly(dA);
  lysing the cells in the presence of the DNA barcoded antibodies/aptamers, wherein cellular mRNA is captured on the RNA barcoding beads and cellular proteins bind to the antibodies/aptamers;
  releasing the oligonucleotides from the DNA barcoding beads and collecting a solution phase containing the DNA barcoded antibodies/aptamers bound to released cellular proteins; and
  reverse transcribing the mRNA to cDNA,
  wherein a pooled RNA sequencing library can be generated from the cDNA that also contains barcode information for linking to the intracellular and surface epitopes from the same cell.

The disclosure provides a method of generating pooled scRNA-seq libraries with barcode information for linking to epitopes from the same single cell, comprising:
  encapsulating a plurality of single cells with one each of an RNA barcoding bead and a protein binding bead within an array of asymmetric microwells, wherein the RNA barcoding bead comprises a plurality of attached oligonucleotides having a cell barcode specific for said bead and a poly(dT) and, optionally, a small subset of the same oligonucleotides having a sequence complementary to that comprised in a plurality of DNA barcoded antibodies/aptamers in place of the poly(dT), and wherein the protein binding bead, optionally, comprises functional groups for protein binding;
  lysing the cells, whereby mRNA hybridizes to the RNA barcoding beads and proteins are captured on the protein binding beads;
  introducing the DNA barcoded antibodies/aptamers to bind to their protein targets and disrupting the antibody/aptamer-protein complexes with a protease to allow DNA barcodes on antibodies/aptamers to hybridize to the RNA barcoding bead; and
  reverse transcribing the mRNA to cDNA,
  wherein a pooled RNA sequencing library can be generated from the cDNA that also contains barcode information for linking to the intracellular and surface proteins from the same cell.

A method of generating pooled scRNA-seq libraries with barcode information for linking to epitopes from the same single cell, comprising:
  encapsulating a plurality of single cells with a single RNA barcoding bead within an array of microwells comprising a hydrophobic surface or a surface comprising functional groups for protein binding, wherein the RNA barcoding bead comprises a plurality of attached oligonucleotides having a cell barcode specific for said bead and a poly(dT) and, optionally, a small subset of the same oligonucleotides having a sequence complementary to that comprised in a plurality of DNA barcoded antibodies/aptamers in place of the poly(dT);

lysing the cells, whereby mRNA hybridizes to the RNA barcoding bead and proteins are captured on the surface of the microwell;

introducing the DNA barcoded antibodies/aptamers to bind to their protein targets and disrupting the antibody/aptamer-protein complexes with a protease to allow DNA barcodes on antibodies/aptamers to hybridize to the RNA barcoding bead; and reverse transcribing the mRNA to cDNA, wherein a pooled RNA sequencing library can be generated from the cDNA that also contains barcode information for linking to the intracellular and surface epitopes from the same cell.

In one embodiment, a kit is provided comprising two sets of differently sized, generally spherical beads, the beads comprising:

(a) a set of beads of a first size selected from the group consisting of:
  i. DNA barcoding beads according to any one of claims 1 to 10,
  ii. Epitope barcoding beads according to any one of claims 12-21, and
  iii. Specific or non-specific protein binding beads comprising a hydrophobic surface, a surface functionalized with amine-reactive groups, aldehyde groups, NHS groups, or thiol-reactive groups, or a surface coated in aptamers, antibodies, proteins, or protein-binding small molecules; and (b) a set RNA barcoding beads of a second size comprising a plurality of oligonucleotides attached on the bead surface, each of said oligonucleotides comprising a PCR adaptor, a cDNA cell barcode identical for all oligonucleotides on one bead, a poly(dT), and optionally a UMI barcode, and, optionally, a small subset of said oligonucleotides having a sequence complementary to that comprised in a plurality of DNA barcoded antibodies/aptamers in place of the poly(dT), wherein the RNA barcoding beads can be either the smaller or the larger sized beads.

BRIEF DESCRIPTION OF THE FIGURES

FIGS. 8A and 8B respectively show a PDMS array with symmetric microwells and a view of microwells after dual-bead loading.

14D is an image where the cells are lysed in the wells and released RNA is captured by the RNA barcoding beads.

FIG. 21A shows an epitope (antibody) barcoding bead. FIG. 21B shows an epitope (antibody) barcoding bead, RNA barcoding bead, and a cell exist in a well. FIG. 21C shows cell lysis solution containing barcoding antibodies lyses the cell releasing mRNA and cellular proteins. FIG. 21D shows the mRNA is captured by the RNA-barcoding bead, and the antibodies bind to the cellular proteins. FIG. 21E shows UV exposure releases the antibody barcode which hybridizes to the antibody, and the antibody barcode with poly(A). FIG. 21F shows the poly(A) barcode hybridizes to the RNA barcoding bead and the solution phase containing the antibodies and proteins is collected. FIG. 21G shows the oligonucleotides used in (A)-(F).

FIG. 22A shows aptamer affinity molecules with bound protein can be isolated through a protein pull-down or by size. Isolated aptamers can then be amplified through PCR. FIG. 22B shows antibody affinity molecules with bound protein can be isolated by size. The barcodes can then by amplified by PCR.

FIG. 24A shows an aldehyde bead, RNA barcoding bead, and a cell exist in a well. FIG. 24B shows cell lysis solution (non-denaturing) containing barcoding antibodies lyses the cell releasing mRNA and cellular proteins. Released proteins (including intracellular proteins) are bound to the aldehyde bead. FIG. 24C shows barcoded antibodies are introduced and bind to proteins of interest. FIG. 24D shows all proteins are digested with a protease. Released antibody barcodes hybridize to the RNA barcoding bead.

FIG. 25A shows fluorescence images of calcein AM in sealed microwells after lysis indicating microwells that contain individual cell lysates (left) and of Cy5 after unsealing the device, washing, and probing the capture surface with anti-TOP2A and Cy5-labeled secondary antibody (right). Cell-containing microwells are Cy5+, indicating TOP2A capture. Microwells without cells are Cy5−. FIG. 25B shows the same as (A) but repeated in the absence of anti-TOP2A antibody. None of the microwells are Cy5+, indicating the specificity of antibody detection of TOP2A. FIG. 25C shows the same as (A) but repeated in the absence of cells. None of the microwells are Cy5+, further indicating the lack of spurious signal for non-specific adsorption.

DETAILED DESCRIPTION

The present disclosure provides, in one embodiment, scalable, simultaneous, genome-wide profiling of RNA and DNA from the same cell through co-encapsulation of individual cells with two distinctly functionalized beads within the asymmetric microwells of a microwell array device.

The present disclosure provides, in one embodiment, systems, methods, and compositions for large-scale parallel measurements of scRNA-seq and scDNA-seq in individual cells and for linkage of these two data streams to high-content, live-cell imaging of the individual cells. There are a number of fluorescence assays available for high-content imaging of cell cycle stage, kinase activity, GPCR activity, cytokine secretion, apoptosis, phagocytosis, immune receptor recognition, chromatin dynamics, etc.

In addition to the embodiments above, where devices are provided for joint parallel analysis of RNA and DNA from the same individual cells on a scale of thousands of single cells, multiple strategies are also provided herein for integrated analysis of RNA and protein, including intracellular protein, from individual cells using similar microwell array devices. The idea behind these strategies is to avoid protein fixation by first lysing an individual cell to liberate its intracellular contents, and then capturing protein either on a solid surface or in solution with barcoded affinity reagents. Similar to that described above, the present disclosure provides, in one embodiment, systems, methods, and compositions for large-scale parallel measurements of scRNA-seq and intra- and extracellular proteins in individual cells and for linkage of these two data streams to high-content, live-cell imaging of the individual cells.

In one embodiment of the present disclosure, systems, methods, and compositions are provided for scalable, simultaneous, genome-wide profiling of RNA and DNA from the same cell, where individual cells are co-encapsulated with two distinctly functionalized beads in an asymmetric microwell. The first bead (RNA-barcoding bead) is identical to those used in previously developed scRNA-seq or SCOPE-seq platforms[1,3,8,11]. These RNA-barcoding beads are covalently coated in oligonucleotides with a universal sequencing/amplification adapter, a bead-specific, cell-identifying barcode, a unique molecular identifier barcode (UMI), and an oligo(dT) for capturing polyadenylated mRNA.

Figure 3A:
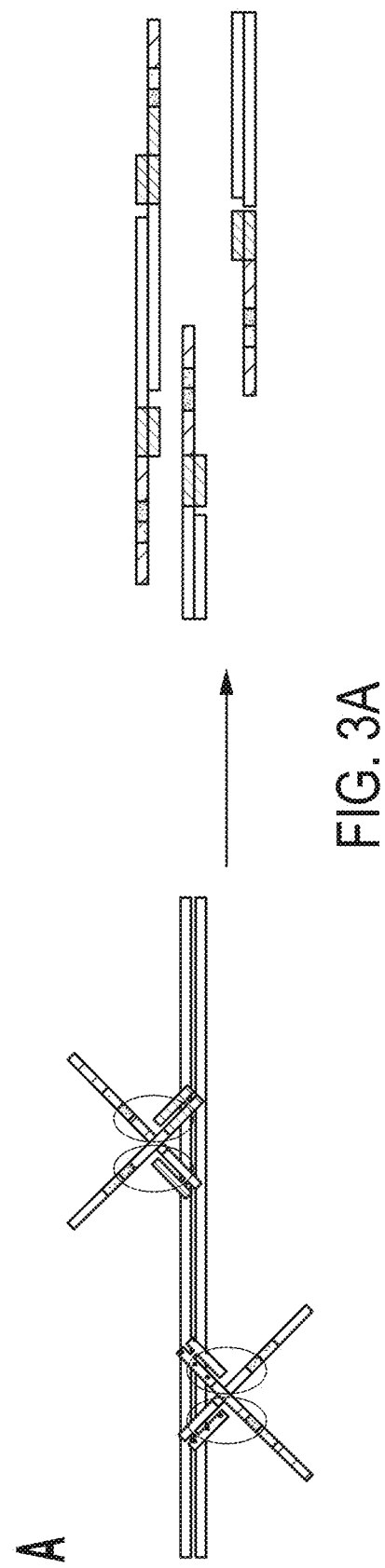
FIG. 3A is a schematic of in vitro transposition with barcoded Tn5 transposases.
Figures 3B, 3C, 3D, 3E, 3F, 3G:
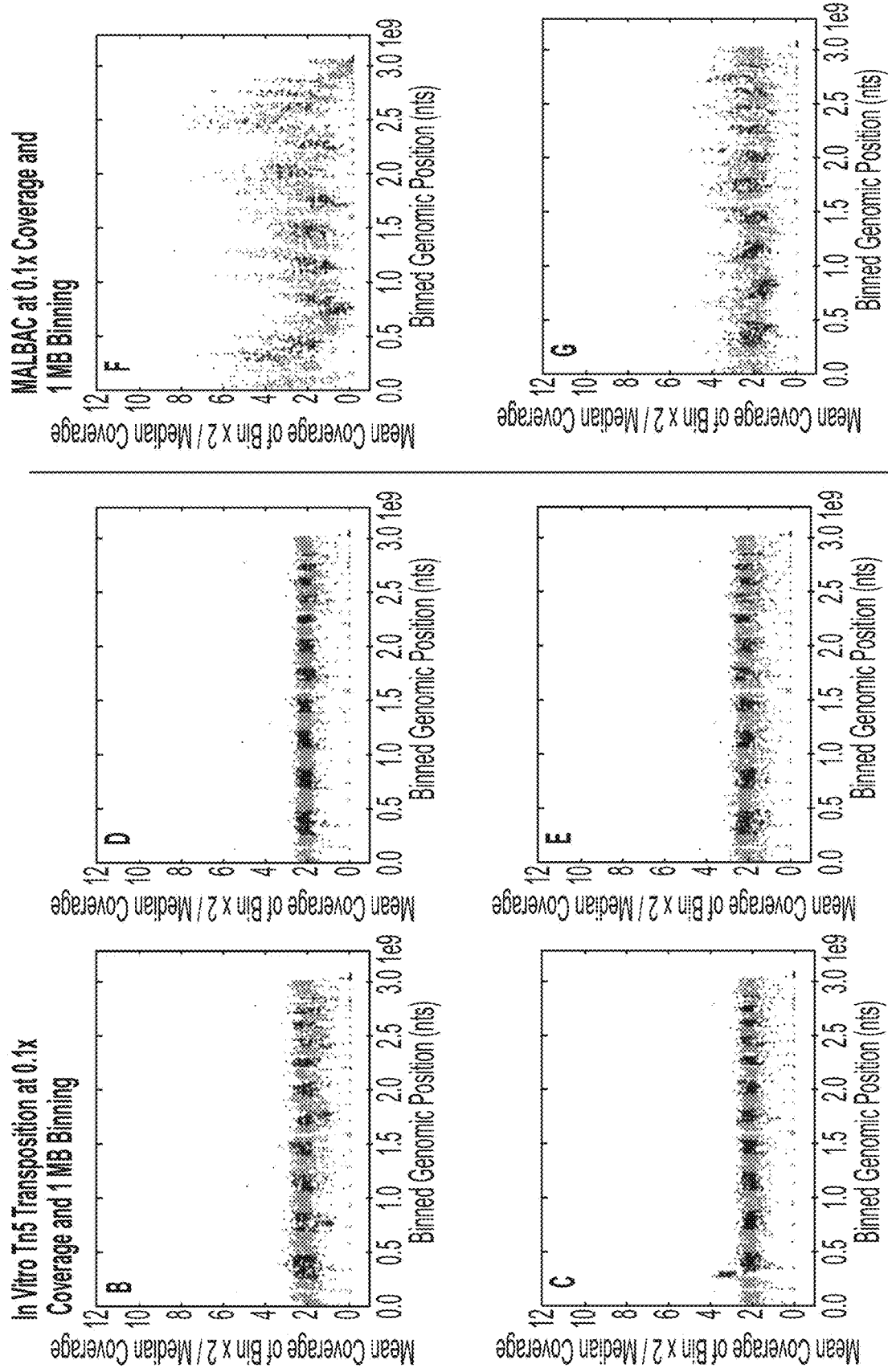
FIGS. 3B-E show physical coverage of 1 MB bins across the genome for four individual, diploid WI-38 cells produced by in vitro transposition.
FIGS. 3F-G show the same as FIGS. 3B-E but for two individual WI-38 cell genomes amplified by MALBAC WGA.

The second bead (DNA-barcoding bead) permits direct barcoding of gDNA, scWGA, and linking of the RNA and DNA libraries from the same cell. gDNA in the cell lysate is subjected to in vitro transposition using, for example, Tn5 hyperactive transposase (see Example 1). FIG. 3A shows a schematic of intro transposition with barcoded Tn5 transposases. FIGS. 3B-3E show physical coverage of 1 MB bins across the genome for four individual, diploid WI-38 cells produced by in vitro transposition. Even at 0.1× coverage, the profiles exhibit low noise and in one cell C), a structural alteration was observed. FIGS. 3B-3E show that relatively uniform coverage can be achieved even at low depth (0.1×) without applying any computational correction for GC bias, Tn5 sequence preference, etc. In addition, FIGS. 3F-3G show that the results for this cell line compare favorably to MALBAC scWGA of the same cell type. FIGS. 3F-3G show the same as FIGS. 3B-3E but for two individual WI-38 cell genomes amplified by MALBAC WGA using the commercial MALBAC kit from Yikon Genomics. At the same sequencing depth, the coverage uniformity is visibly worse than in vitro transposition. The breadth achieved (~35% at 2× coverage) is significantly better than the typical performance of DOP-PCR[21], but less impressive than the best reports of, for example, MALBAC (~90%)[19].

However, many of these previous studies involve cancer cells with significant polyploidy (and therefore higher input). In addition, MALBAC performed similarly to tagmentation in our hands with these diploid cells in terms of overall breadth (~30-35%).

An embodiment of the present invention is a microfluidic implementation of the tagmentation approach to provide large-scale linkage of scRNA-seq and DNA-seq from the same individual cells. In some embodiments, rational improvements are made such as the integration of in vitro transcription as in LIANTI[4,23]. For very large-scale CNV profiling applications, low-depth, low-breadth sequencing will likely be the preferred mode, whereas targeted enrichment of the barcoded amplicons will facilitate SNV detection.

Associating mutational data from scDNA-seq with phenotypic data from imaging and scRNA-seq is useful in cancer and developmental biology, but is also broadly useful as a general strategy for single-cell multi-omics. For example, neoplastic tissues contain genetically heterogeneous cells, and such tumor heterogeneity presents therapeutic challenges. However, the relationship between genomic sequence, copy number, and phenotype at the single-cell level has been difficult to study.

Figure 4:
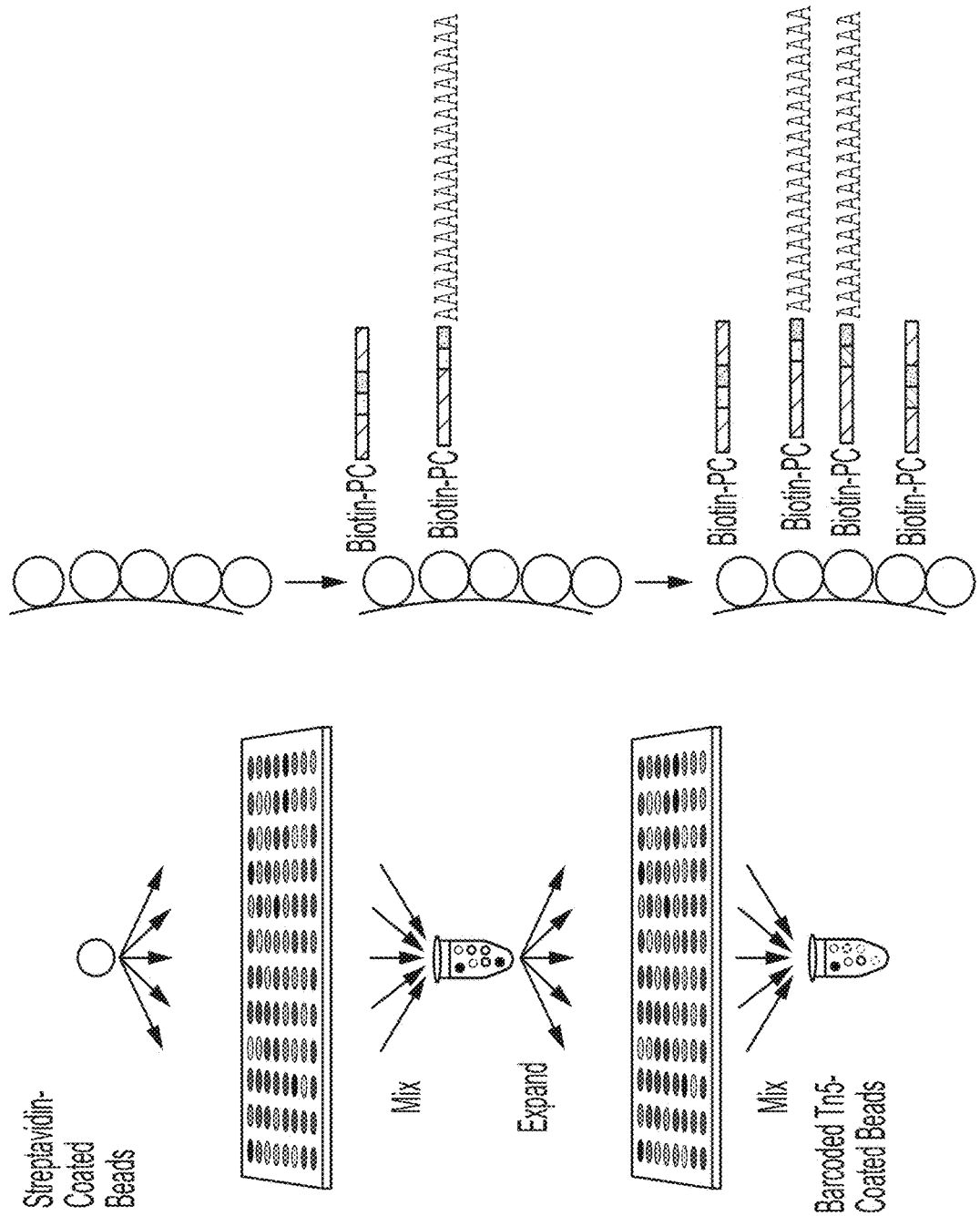
FIG. 4 illustrates synthesis of DNA-barcoding beads.
Figures 7A, 7B, 7C, 7D:
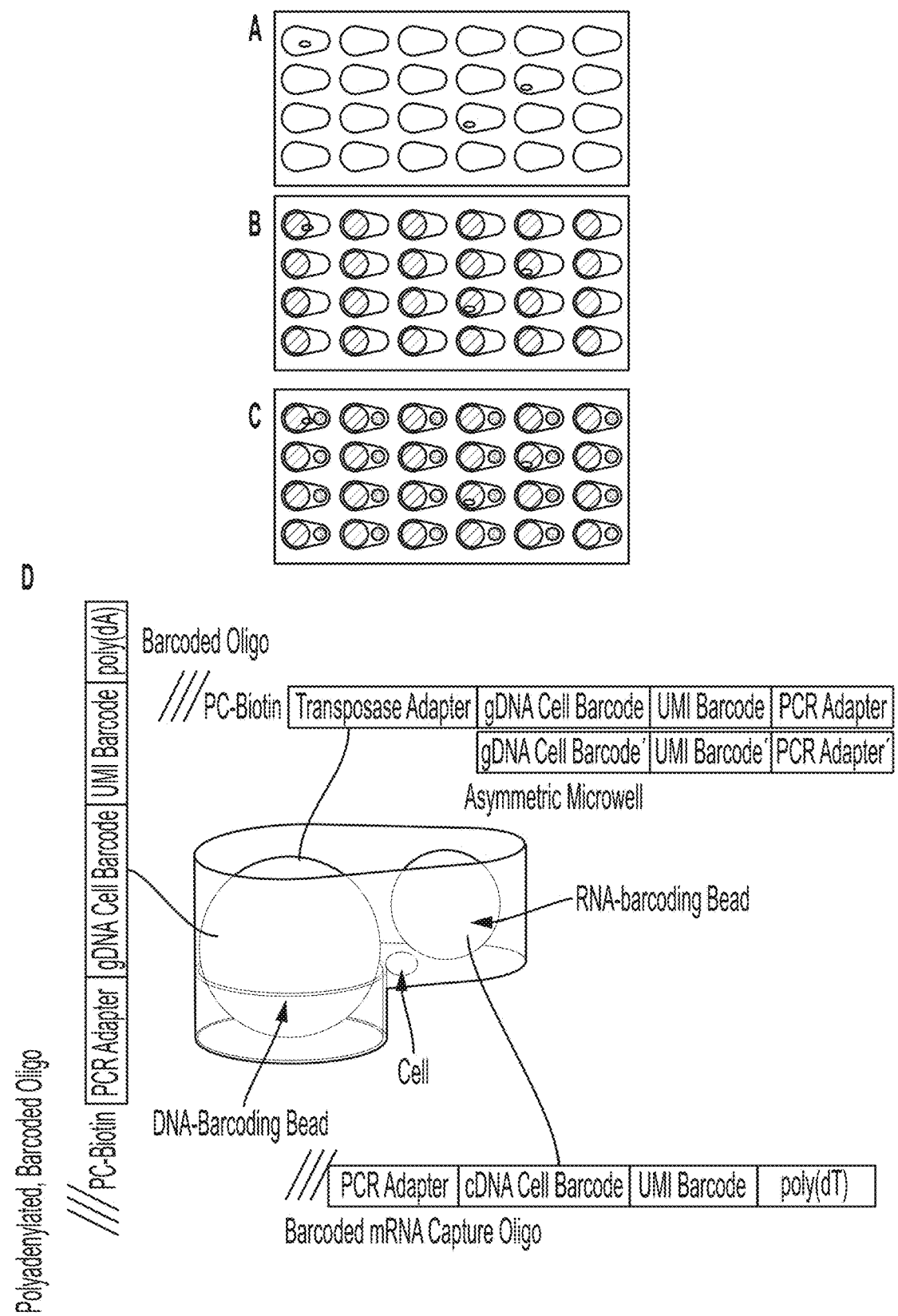
FIGS. 7A-7C illustrate loading of asymmetric microwell arrays.
FIG. 7D shows large DNA-barcoding beads containing polyadenylated barcodes and barcoded oligonucleotides each attached by a photocleavable linker.

The DNA-barcoding beads of the present disclosure are coated with two different species of releasably attached oligonucleotides:

(1) barcoded adapter oligonucleotides that are complementary to oligonucleotides bound to the transposase that are eventually incorporated into gDNA fragments and (2) polyadenylated barcoded oligonucleotides containing the same barcode sequence as the adapters (see FIG. 4 and FIG. 7D). The latter polyadenylated barcoded oligonucleotides may be a small percentage of the barcoded adapter oligonucleotides. The latter polyadenylated barcoded oligonucleotides can comprise less than 10%, less than 5%, or less than 1% of the first subset of barcoded oligonucleotides.

Both species are conjugated to beads in a releasable manner. In one example, the oligonucleotides are conjugated to beads via a photocleavable linker. In one example, the oligonucleotides are attached to the beads using photocleavable biotin, which is attached to aminated DNA via succinimidyl ester chemistry. Other examples include, but are not limited to, thiolated DNA via maleimide chemistry, aminated DNA via reductive amination with aldehyde-coated beads, and thiolated DNA via a disulfide bridge.

The DNA-barcoding beads can be generated combinatorially using the split-pooling procedure illustrated in FIG. 4. In one example, starting with commercial streptavidin-coated beads, a split-pool approach can be used to combinatorially conjugate barcoded oligos and polyadenylated barcodes. Two rounds of 384-well split-pooling can be used to obtain a library of 147,456 barcoded bead types. This can be accomplished via a series of enzymatic reactions (e.g. using DNA polymerase and/or DNA ligase) or solid-phase chemical synthesis.

Figures 1A, 1B, 1C:
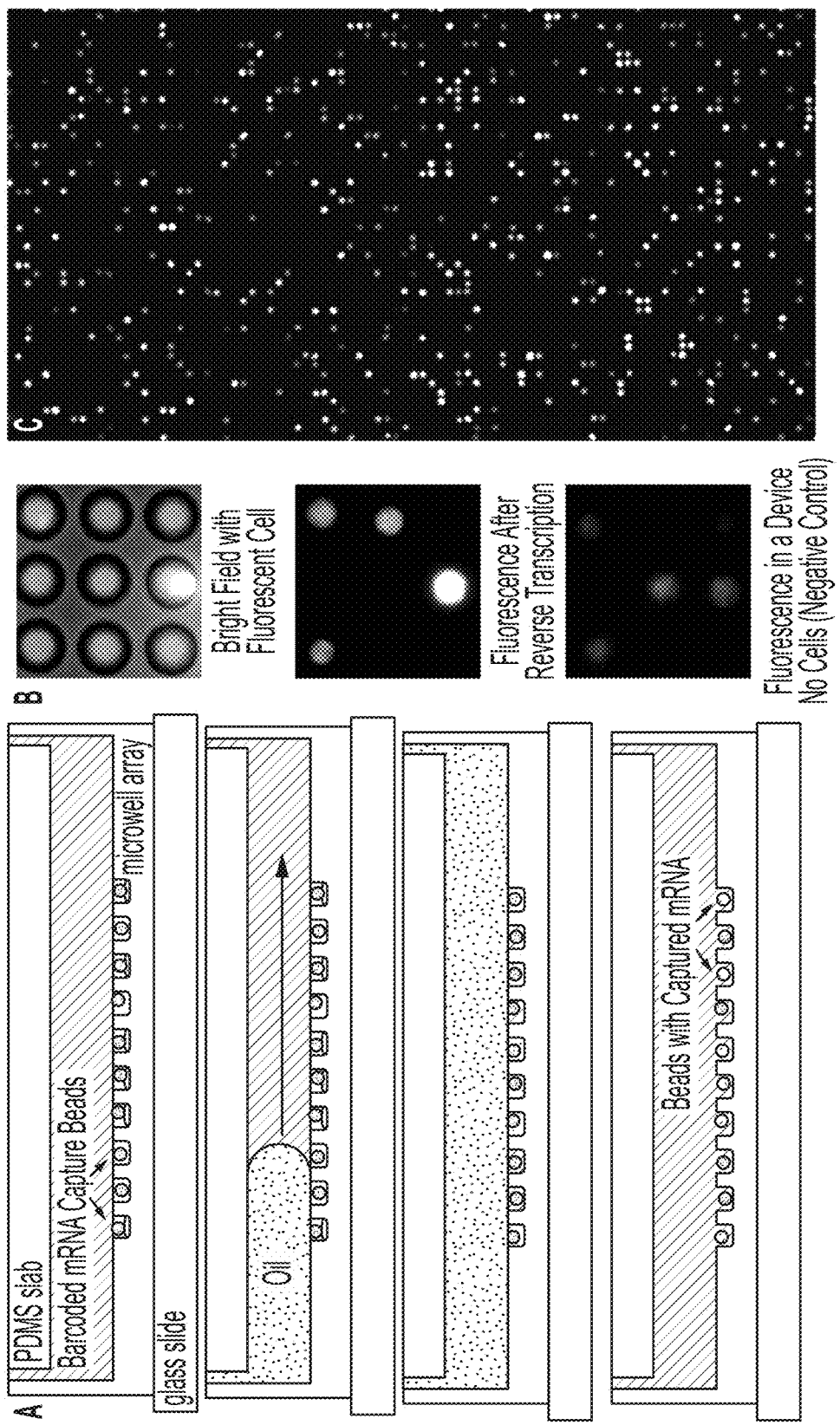
FIGS. 1A-1C show a reversibly sealable, PDMS microwell array device for single-cell mRNA capture on barcoded beads, and resulting mRNA capture and fluorescence.

The present disclosure is based on a versatile and scalable microfluidic platform for scRNA-seq that was developed and reported previously[3,11] (see FIGS. 1A-1C). FIGS. 1A-1C show a reversibly sealable, microwell array device for single-cell mRNA capture on barcoded beads. In the previous microfluidic device of FIG. 1, a single cell was co-encapsulated with a single mRNA capture bead in cylindrical microwells of a microwell array device. In the present invention, the microwells of the array are asymmetric to accommodate co-encapsulation of a single cell with exactly one each of differently sized RNA barcoding beads and DNA barcoding beads (see FIG. 6).

Co-encapsulating the RNA- and DNA-barcoding beads with a single cell within the asymmetric microwell of the device enables the workflow illustrated in FIG. 6 as follows:

1) Introduce cells by limiting dilution and allow them to settle into the bottom of wells.
2) Introduce DNA-barcoding beads into the wells. The large DNA-barcoding bead will occupy the larger diameter region of the well.
3) Introduce RNA-barcoding beads into the wells. The presence of the larger DNA-barcoding bead in the well will limit the well volume such that only single RNA-barcoding beads will fit in each well.
4) Seal the microwell array with oil immediately after introducing lysis buffer, trapping individual cell lysates co-encapsulated with the RNA- and DNA-barcoding beads. Capture polyadenylated mRNA on the RNA-barcoding beads.
5) Unseal the microwell array and wash out the cell lysate. The gDNA will remain in the microwell because it is too large to diffuse out on a short timescale. Introduce transposase and re-seal the microwells. The transposase will bind to the gDNA, cleave the gDNA, and integrate universal adapters into the gDNA.
6) Expose the device to UV light, which will result in photo-release of the oligonucleotides on the DNA-barcoding bead. The barcoded adapters released from the DNA-barcoding bead will hybridize to the universal adapters integrated into the gDNA by the transposase. The polyadenylated barcodes released from the DNA-barcoding bead will hybridize to the oligonucleotides on the RNA-barcoding bead.
7) Unseal the device and introduce a neutralization buffer to release the transposed, barcoded gDNA fragments from the transposases. Collect the barcoded DNA fragments from all of the microwells in a tube. Amplify the barcoded DNA fragments by PCR to generate a pooled genomic sequencing library.
8) Introduce reverse transcriptase to convert the captured mRNA and polyadenylated barcodes into cDNA and collect the RNA-barcoded beads. Amplify the cDNA by PCR or in vitro transcription. Selectively amplify the 3'-end of the barcoded cDNA amplicons by in vitro transposition and PCR.

This procedure yields two pooled libraries (see FIG. 9)—one containing gDNA fragments with a barcode from the DNA-barcoding bead that identifies each cell, and one containing both cDNA fragments with a barcode from the RNA-barcoding bead that identifies each cell and polyadenylated oligonucleotides containing the barcodes from both beads. Sequencing these two libraries provides the expression profile of each cell and the genome of each cell, and links the two using the polyadenylated oligonucleotides that indicate the barcode sequence that was on both co-encapsulated beads for each cell.

The expression profile and genome of each cell are linked together using the polyadenylated oligonucleotides that indicate the sequence of the barcode that was on both co-encapsulated beads for each cell.

Figure 6:
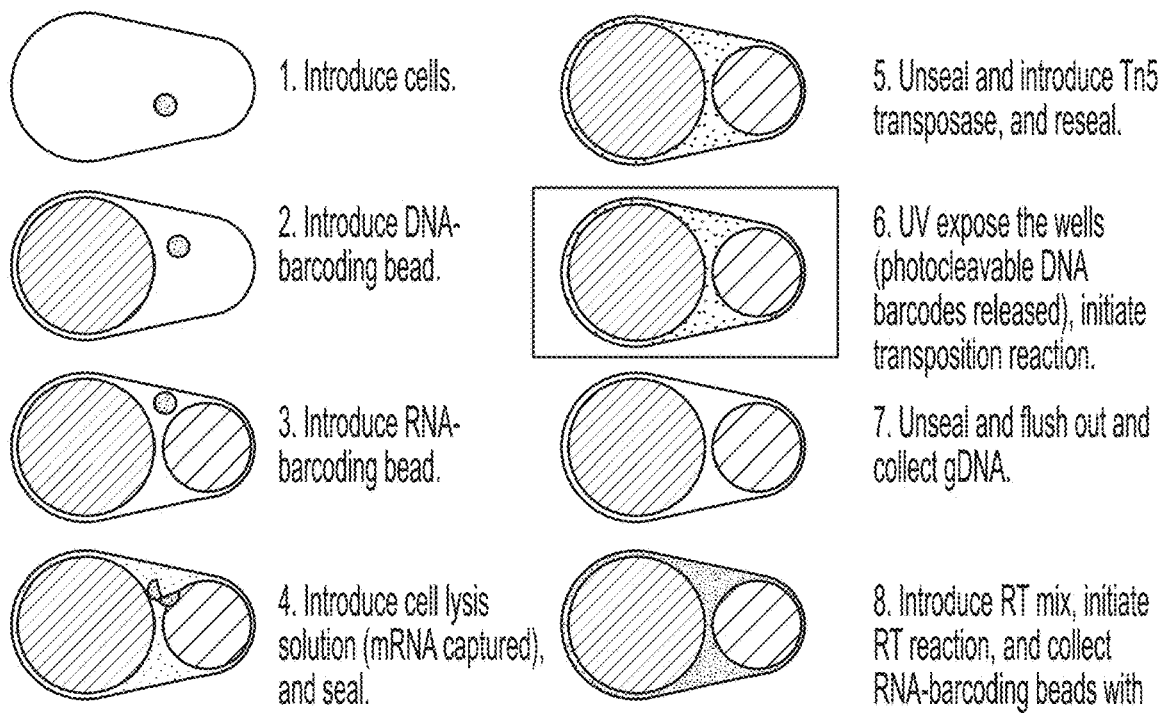
FIG. 6 illustrates a device-level procedure for generating linked multi-omic information from a single-cell within a microwell.
Figures 9A, 9B, 9C, 9D:
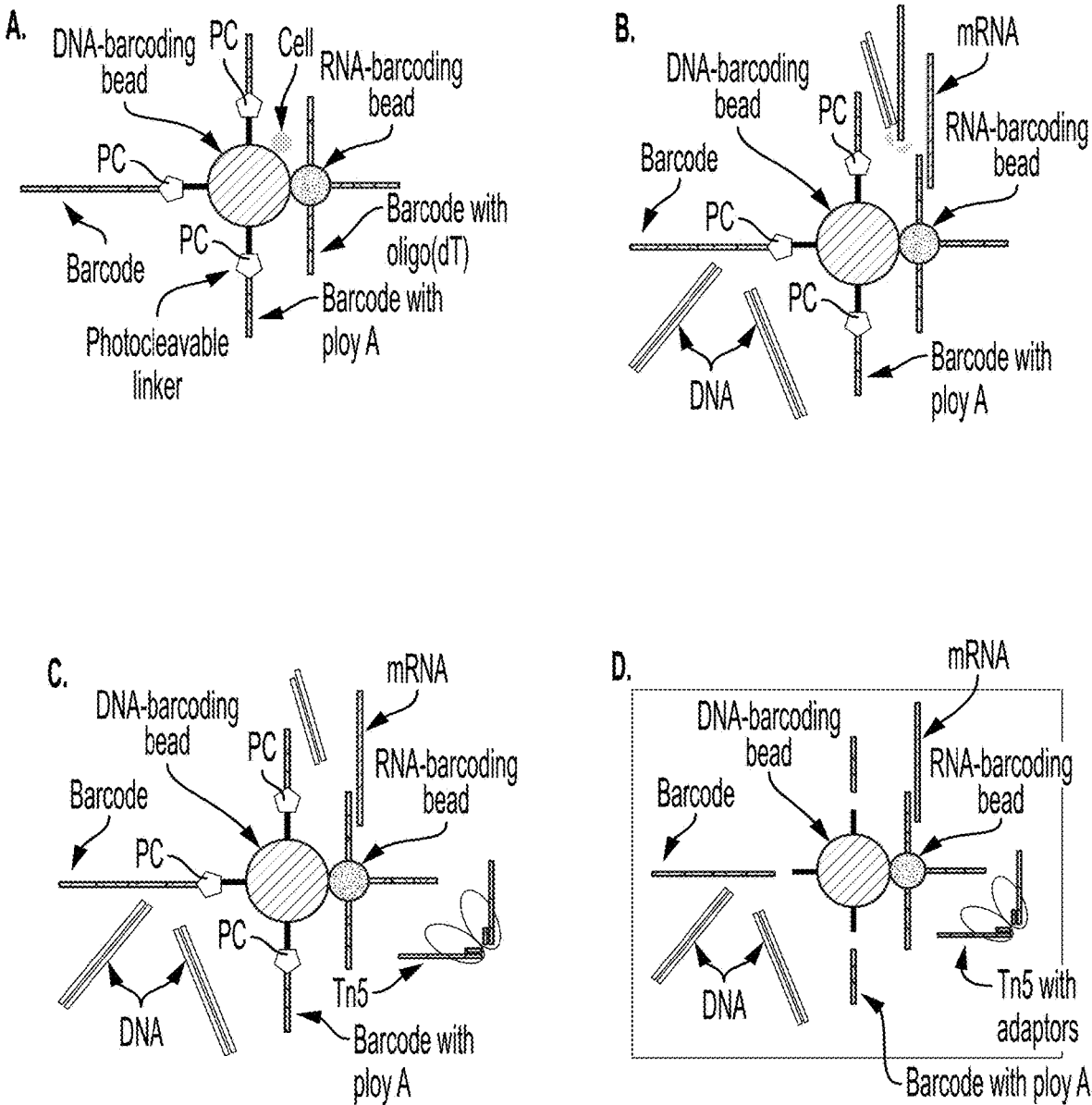
FIGS. 9A-9H illustrate molecular workflow using a DNA-barcoding bead, a RNA barcoding bead, and a cell co-encapsulated in a well.
Figures 9E, 9F, 9G, 9H:
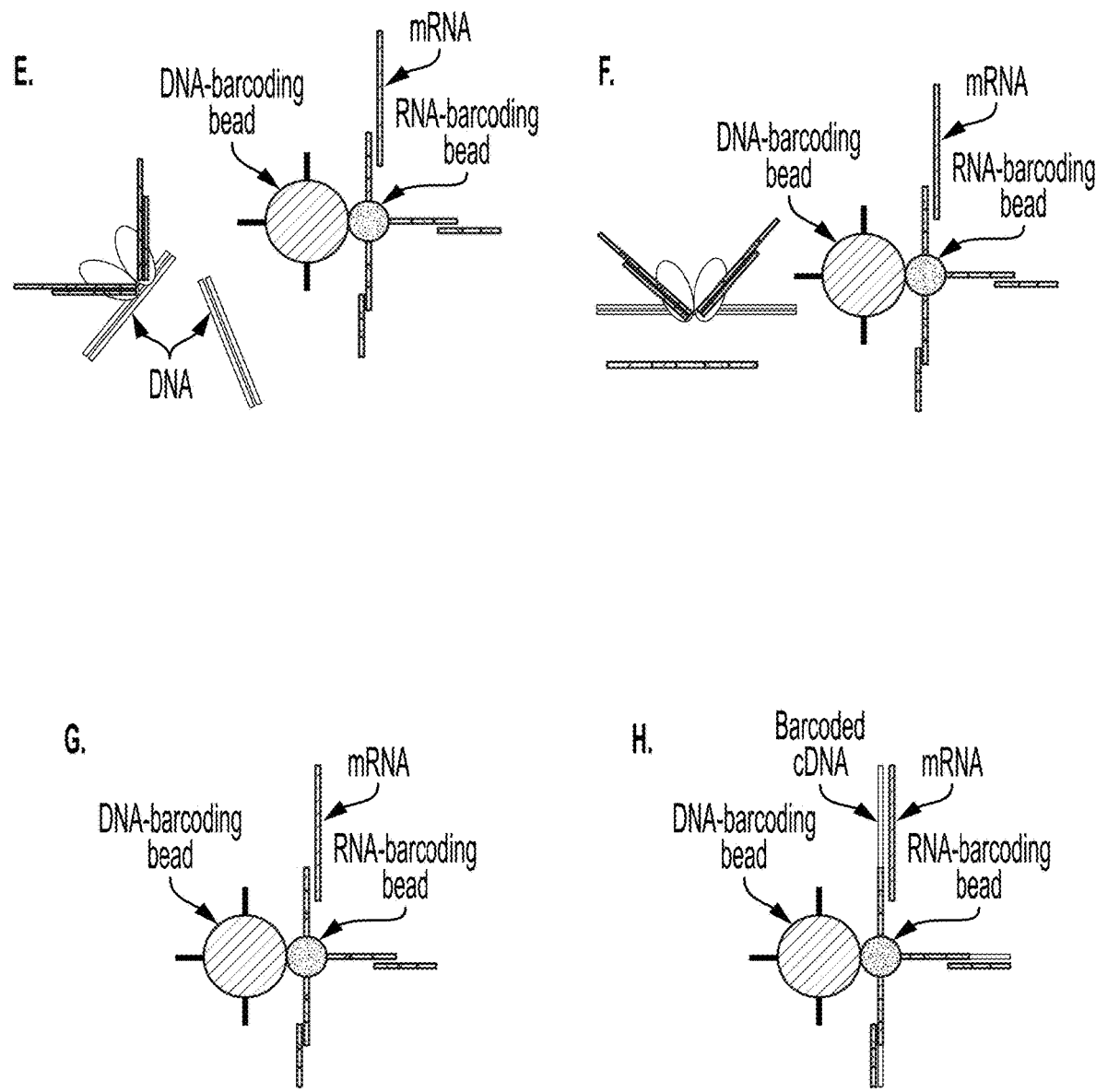

Molecular workflow is shown in FIGS. 9A-9H for the process shown in FIG. 6 once individual wells are loaded with a DNA-barcoding bead, an RNA barcoding bead, and a cell. FIG. 9A shows the contents of such a well, with a DNA-barcoding bead, RNA barcoding bead, and a cell. FIG. 9B shows the cell being lysed and releasing mRNA and gDNA. FIG. 9C shows the mRNA being captured by the RNA-barcoding bead, and Tn5 being introduced. FIG. 9D shows UV exposure releasing the DNA barcode and the DNA barcode with poly A. FIG. 9E shows Tn5 incorporating the barcode and binding to the gDNA. FIG. 9F shows transposition. FIG. 9G shows gDNA removal and collection. FIG. 9H shows reverse transcription producing cDNA.

The method relies on the retention of gDNA in microwells during fluidic exchanges. The large size of the gDNA confers a relatively low diffusivity, which allows the fluid in the microwell to be removed, replaced, and sealed while the gDNA remains in the well for later reactions.

Figure 5:
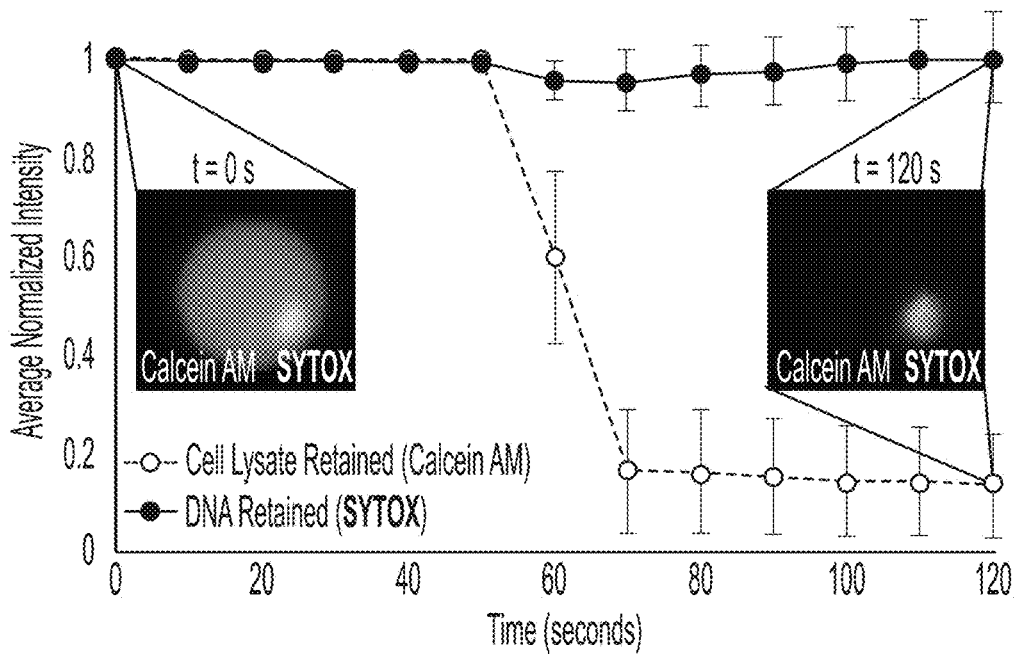
FIG. 5 is a graph showing retention of gDNA in microwells after unsealing showing, specifically, microwells containing Calcein AM stained cell lysate (lower line) and SYTOX-stained gDNA (upper line) while wash buffer is introduced (20 ul/min). At time zero both Calcein AM and SYTOX-stained gDNA are present in an oil-sealed well. After 2 mins of washing cell lysate is removed (Calcein AM lower line) while the SYTOX-stained gDNA remains in the well (traces are averaged over 10 microwells).
Figures 10A, 10B, 10C, 10D:
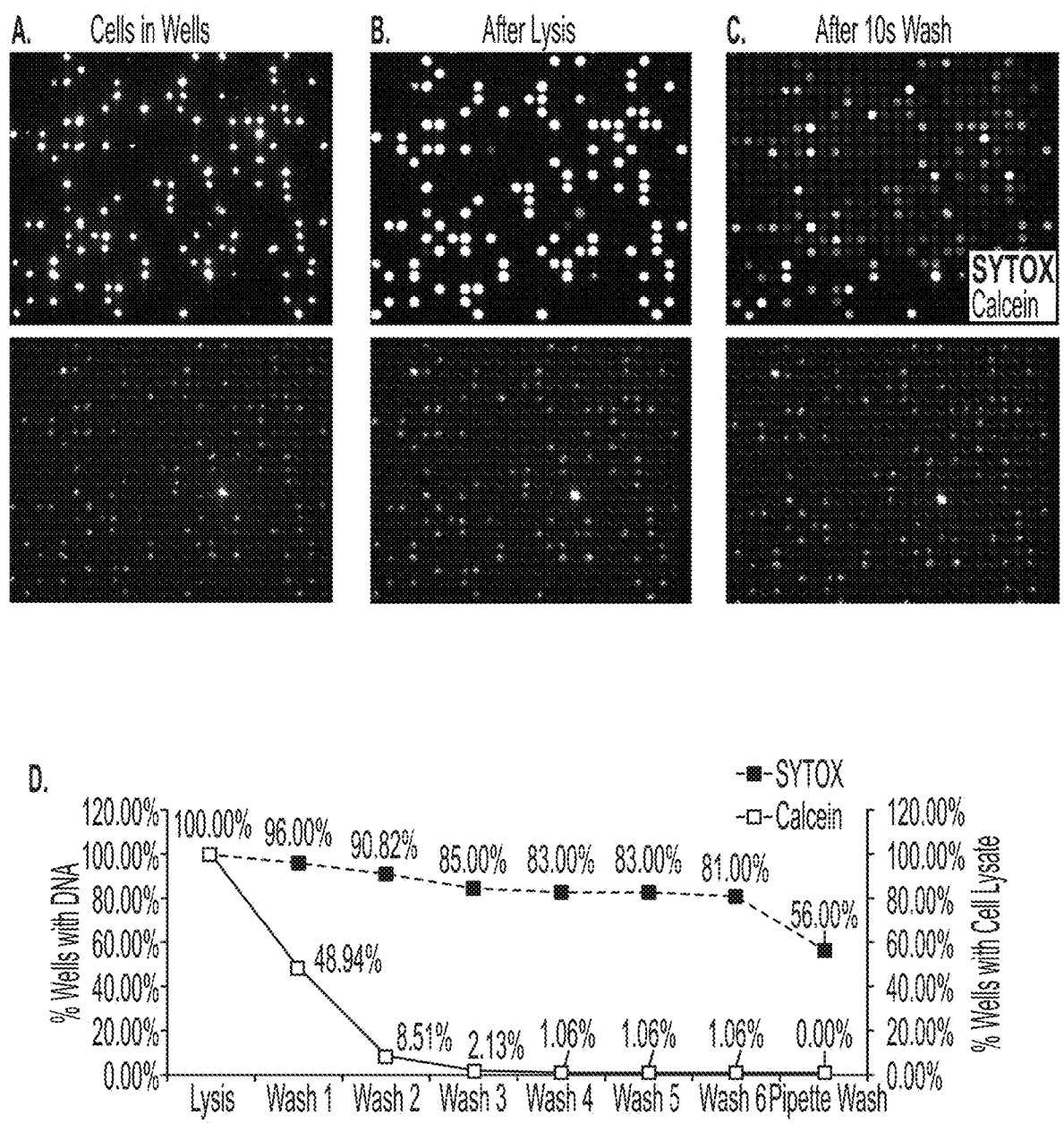
FIGS. 10A-10D are images and a plot showing that genomic DNA is retained in the microwells of a microwell array device after the cell lysate is removed with multiple washes.

That the gDNA can be retained in the microwells during sufficient washing to remove the cell lysate is illustrated in FIG. 5 and FIGS. 10A-10D which show that gDNA from captured cells remains in the microwells for several minutes even after unsealing and washing (see Example 2). This is consistent with the diffusion constant of gDNA, which precludes escape on this timescale. Specifically, this was demonstrated with cells labeled with calcein AM (a fluorogenic esterase substrate that labels the cytoplasm) and SYTOX Orange (a fluorogenic intercalator that labels dsDNA). These cells were captured in the microwells, lysis buffer was introduced, and the microwells were rapidly sealed. The device was unsealed and washed over the course of minutes. This resulted in removal of the calcein AM and essentially no loss of SYTOX-stained particles as shown FIG. 5. FIG. 5 is a graph showing that microwells containing calcein AM-stained cell lysate and SYTOX-stained gDNA at time zero retained intact gDNA after 2 minutes of washing, while lysate was removed (traces are averaged over 10 microwells). FIG. 10A (top) shows live cells in wells with gDNA, and (bottom) the tetramethylrhodamine isothiocyanate (TRITC) channel showing gDNA. FIG. 10B (top) shows the same region as FIG. 10A after cell lysis, and (bottom) the TRITC channel only showing gDNA. FIG. 10C (top) shows the same region as FIGS. 10A and 10B wherein the cell lysate has been partially removed by a 10 second wash, and (bottom) the gDNA remains in the wells after the wash. FIG. 10D is a plot of wells with gDNA remaining (upper line) and cell lysate remaining (lower line) after a series of washes.

Because gDNA remains in the microwell after unsealing and the mRNA is captured on a bead, the microwells of the array device can be unsealed after lysis and mRNA capture to exchange reagents. In one example, Tn5 transposase is introduced along with enzymes to cleave the barcoded oligonucleotides from the DNA barcoding bead after removing the lysis buffer for solution-phase, in vitro transposition, and then the microwells are re-sealed. Specifically, if using chemical or enzymatic release of barcoded oligonucleotides, the chemicals or enzymes for cleavage are introduced along with Tn5 at this stage, just before re-sealing. In the case where the barcoded oligonucleotides are attached through a photocleavable link, then only Tn5 transposase is introduced at this stage, the microwells are re-sealed, and the microwell array device is exposed to UV light for photocleavage. Thus, the following workflow is provided:

1) Seal the microwells with oil immediately after introducing lysis buffer, trapping individual cell lysates with the RNA barcoding beads and the DNA barcoding beads. Capture mRNA on the RNA barcoding beads.
2) Unseal and wash out the lysate. gDNA will remain in the microwells due to its size. Introduce transposase, USER enzymes (mixture of Uracil DNA glycosylase (UDG) and the DNA glycosylase-lyase Endonuclease VIII), and re-seal. The transposase will bind gDNA and integrate universal adapters. USER enzymes will release the barcoded oligonucleotides from the DNA barcoding bead, which will hybridize to adapters integrated into gDNA by the transposase. (Alternatively, oligonucleotides can be attached to the DNA barcoding bead via a photocleavable linker and the oligonucleotides can be photocleaved by exposing the beads to UV radiation.) Released polyadenylated barcodes will hybridize to primers on the RNA barcoding bead.

3) Unseal the microwells and introduce neutralization buffer to release the barcoded gDNA fragments from the transposase. Collect the solution phase containing the barcoded DNA fragments and set aside for PCR and library construction. An initial ligation step will covalently attach the cell-identifying barcodes hybridized to the transposase adapters into the DNA fragments for PCR.

4) Introduce reverse transcriptase and template-switching oligonucleotides to the microwells containing the RNA barcoding beads to generate barcoded cDNA from captured mRNA and incorporate the cell-identifying barcodes into the polyadenylated barcode from the DNA-barcoding bead.

5) Generate full-length, pre-amplified cDNA by direct PCR of the bead mixture. Construct a pooled Illumina sequencing library corresponding to the 3'-end of the captured mRNA and the polyadenylated barcode by in vitro transposition and PCR[6,27].

The bead specific, cell-identifying barcode of the SCOPE-seq RNA-barcoding beads described above is a cell-identifying optical barcode that functions as both a sequence barcode and an optical barcode that can be read out by sequential fluorescence hybridization in the device on a fluorescence microscope[8] (see FIGS. 2A-2G). This technique, known as SCOPE-seq, enables accurate linkage of scRNA-seq with live cell imaging on an unprecedented scale.

The RNA barcoding beads of the present disclosure can comprise such a cell-identifying optical barcode to enable read out of the barcode sequence by sequential fluorescence hybridization in the microwell array device on a fluorescence microscope. In an embodiment, the RNA barcoding beads of the present disclosure are suitable for SCOPE-seq, which uses optically barcoded mRNA capture beads in a microwell array device for linking imaging and scRNA-seq[10].

Figures 2A, 2B, 2C, 2D:
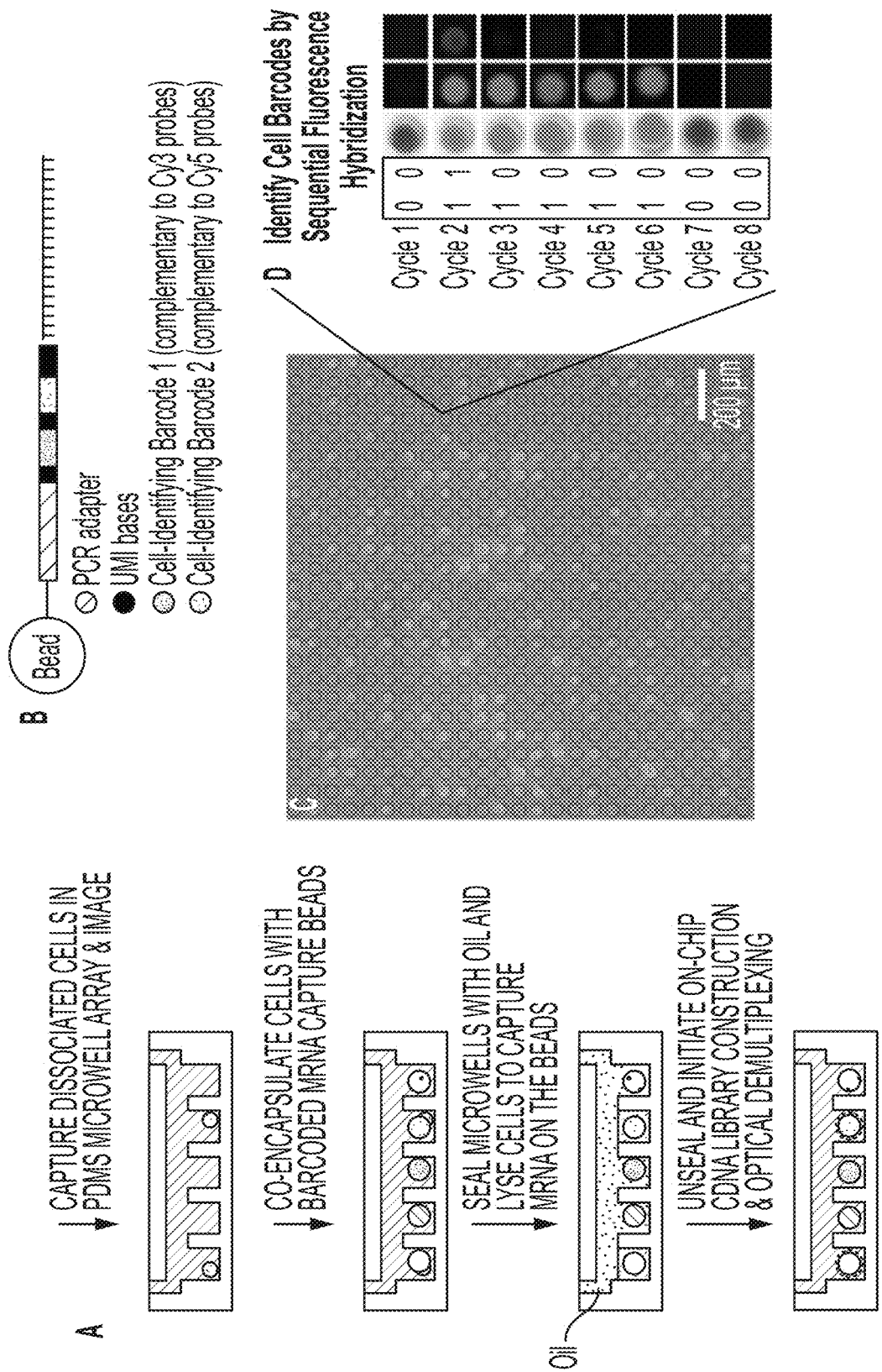
FIGS. 2A-2G show typical workflow for SCOPE-seq including a microwell array device, fluidics, imaging, and RNA barcoding beads having a bead-specific, cell identifying optical barcode sequence comprising a unique combination of nucleotide sequences that can be read out by hybridization to labeled complementary probes while present in the microwell on the device which enables the linking of single cell imaging and scRNA-seq for thousands of single cells in parallel, and related illustrations.

In this embodiment of the present disclosure, high-content, live-cell imaging is integrated with parallel analysis of RNA and DNA from the same cells. FIG. 2A shows typical workflow for a SCOPE-seq microwell array device enabling linking of cell imaging and scRNA-seq. FIG. 2B is a schematic of SCOPE-seq optically barcoded mRNA capture beads. FIG. 2C is a two-color fluorescence image of cells captured in microwell array device superimposed on bright field image. FIG. 2D shows fluorescence images of a SCOPE-seq bead after each cycle of two-color sequential fluorescence hybridization to read out the cell-identifying barcode.

Figures 2E, 2F, 2G:
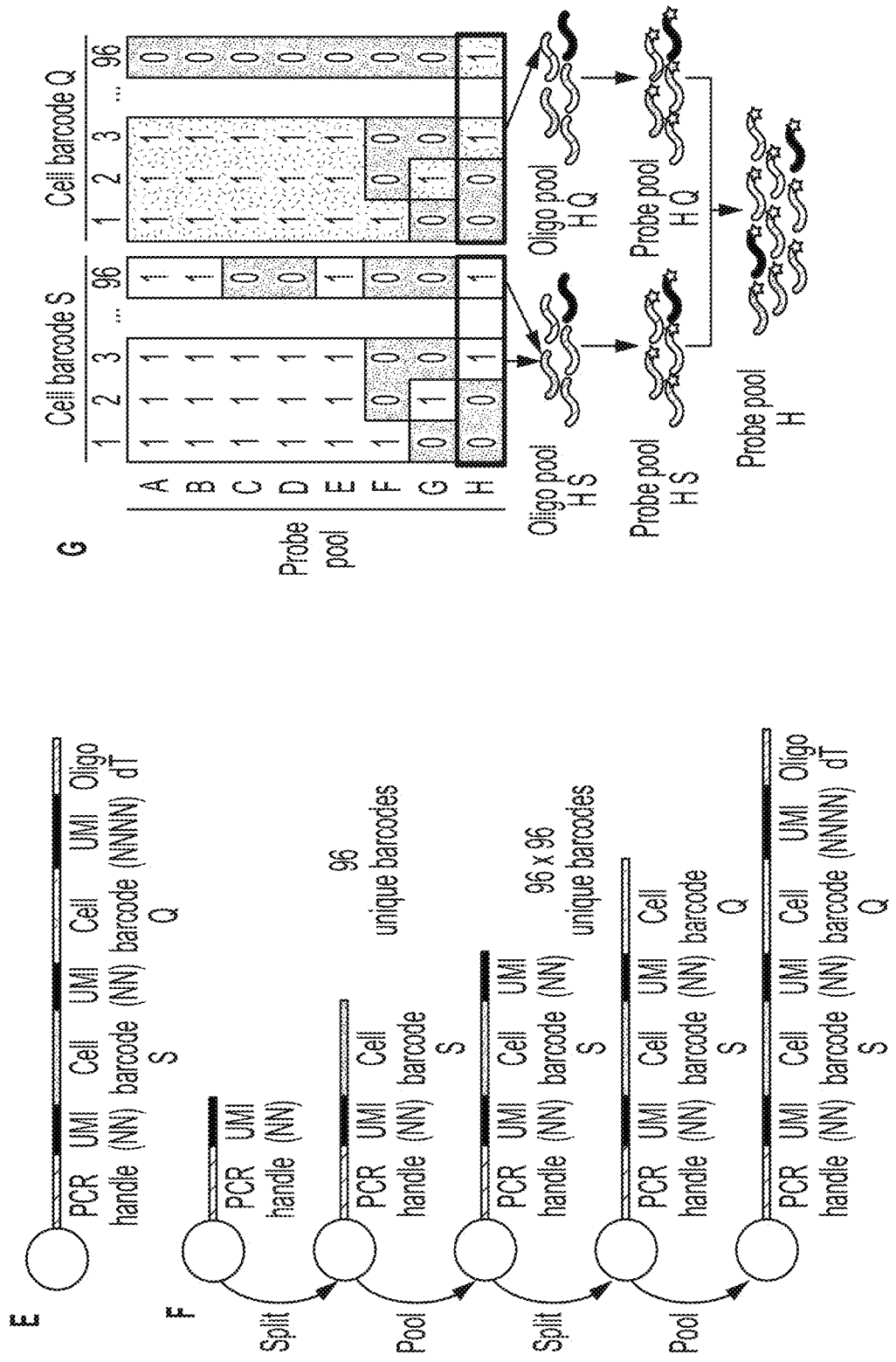

FIG. 2E is a diagram illustrating another example of the oligonucleotides attached to the RNA barcoding beads of the present disclosure that allow for optical decoding to identify an image of a given cell co-encapsulated with the RNA barcoding bead in the microwell array. In this example, the cell identifying optical barcode contains two 8-nucleotide sequences, each of which is a member of a pool of 96 sequences. An 8-nucleotide random sequence is dispersed into three parts and serves as both a unique molecular identifier (UMI) and a spacer between other functional sequences on the bead. The oligonucleotides on all beads share two common sequences—a universal PCR adapter and oligo(dT) for RNA capture and cDNA amplification.

The oligonucleotides for the RNA barcoding beads can be synthesized by split-pool, solid-phase synthesis as illustrated in FIG. 2F. In one example, beads are pooled together to add common sequences and random UMIs and are split into 96 reactions to add one of the 96 cell barcode sequences. After two rounds of split-pooling, a total of $96^2=9,216$ cell barcodes are generated. The desired number of unique RNA barcodes can be generated in this manner.

To link cellular imaging with scRNA-seq from the same cell, the cell identifying optical barcode sequence on each bead is identified while present in the microwell array by sequential fluorescent probe hybridization. Each cell barcode (i.e. "S" and "Q" in FIGS. 2E-2F) corresponds to a unique, pre-defined 8-bit binary code in the cell identifying optical barcode sequence. Each bit of the binary code can be read out by one cycle of probe hybridization, where the presence or absence of a hybridized probe indicates one or zero, respectively. The two parts of the cell identifying optical barcode sequence can be decoded simultaneously using two sets of differently colored fluorescent probes. To realize this decoding scheme, a pool of fluorescent probes can be generated for each cycle of hybridization. All probes that can be hybridized to the cell barcode sequence marked '1' in the corresponding binary code are pooled and conjugated with fluorophores, such as, for example, Cy5 or Cy3. Distinct fluorophore-conjugated probes against the two 8-nucleotide sequences comprising the cell identifying optical barcode sequence can then be pooled together to form the final probe pool (FIG. 2G). Thus, all possible cell barcode sequences in this example can be decoded by eight cycles of two-color probe hybridization. This approach is compatible with higher speed imaging, leading to higher throughput.

The microwell array device described above in FIG. 1 and FIG. 2 for the scRNA-seq and SCOPE-seq platforms does not readily accommodate robust co-encapsulation of exactly one RNA-barcoding and one DNA-barcoding bead with each cell. To facilitate the desired co-encapsulation, the cylindrical microwells are replaced with asymmetric microwells that can capture two differently sized beads. See FIGS. 7A-7C which are schematic diagrams showing loading of asymmetric microwell arrays. FIG. 7A shows how to load cells by limiting dilution to minimize multiplets. FIG. 7B shows how one first loads the larger of the DNA barcoding beads or the RNA barcoding beads at high density. The larger of the two bead types cannot fit in the smaller region of the microwells. Generally, the DNA barcoding beads will be larger, but the RNA barcoding beads can be larger in some embodiments. Next is loaded the smaller of the DNA barcoding beads or the RNA barcoding beads at high density, which fit in the remaining space in each microwell (see FIG. 7C).

In one example, one region of the asymmetric microwell will have a maximum width of about 70 microns while the smaller region will be about 40 microns in maximum width. The microwell will also contain a "step" so that the depth in the 40 micro region will be about 40 microns and that of the about 70 micron region will be about 70 microns (see FIGS. 7A-C).

In one example, the larger of the two beads (the DNA-barcoding bead) is about 60 microns in diameter and fits only in the wider part of each microwell. These beads can be loaded at high density with the goal of achieving >95% loading rate (as routinely achieved for the previously developed scRNA-seq device). Finally, the smaller, RNA-barcoding bead (about 30 microns in diameter) is loaded and fits in the remaining space in each asymmetric microwell at a high loading rate. The size range of the dual-bead microwells in the asymmetric microwell array device of the present disclosure is governed only by the sizes of the two beads. Preferably, the size of the larger bead is no more than about 100 microns in diameter, as the practical throughput benefits of this approach begin to diminish for beads of greater size.

Figures 13A, 13B:
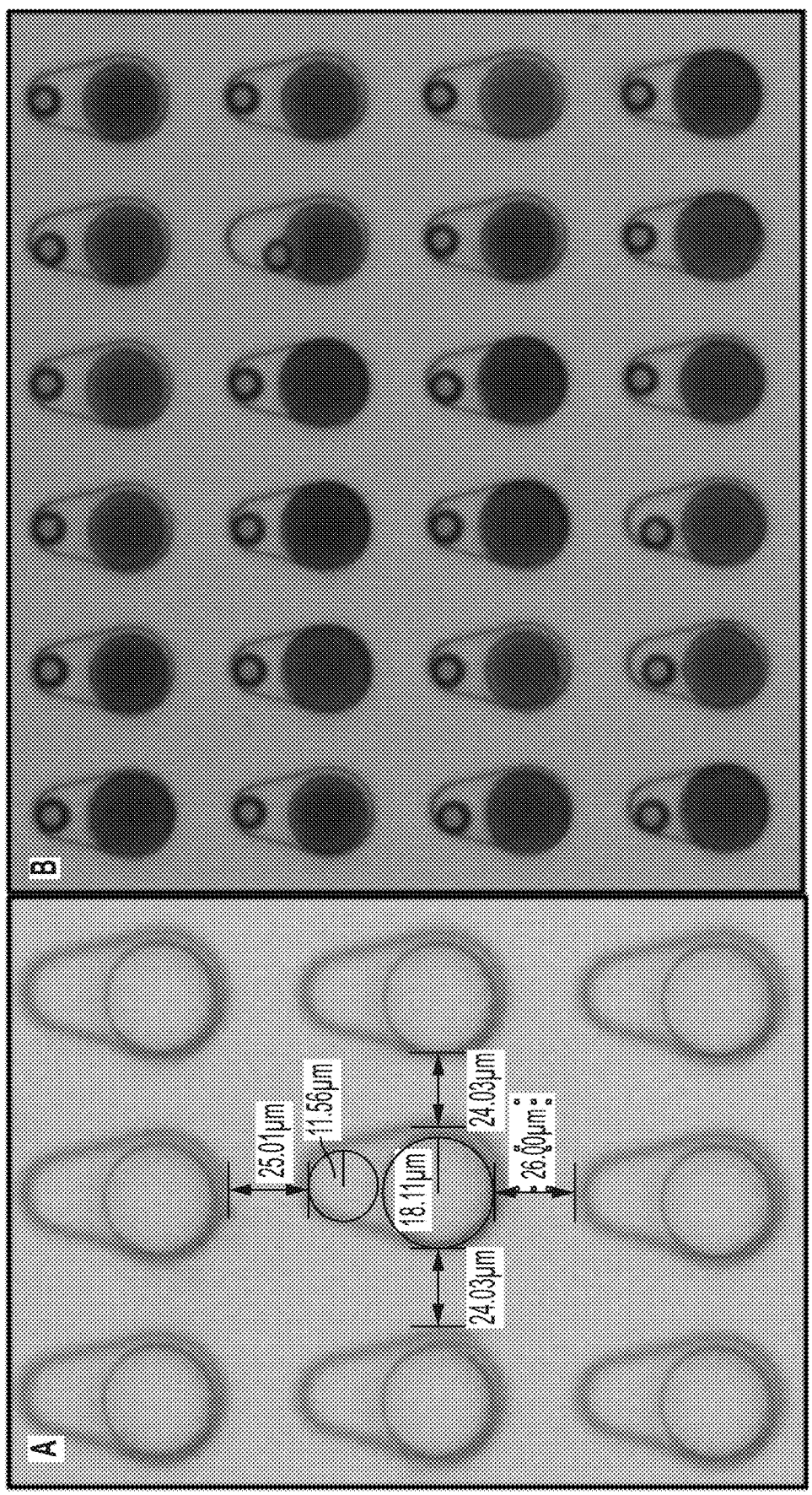
FIG. 13A shows a fabricated dual-bead device having wells without beads present with dimensions indicated.
FIG. 13B shows a fabricated dual-bead device loaded with DNA barcoding bead and RNA barcoding bead. 78.5% of wells on the device had a single DNA barcoding bead and a single RNA barcoding bead.

Fabrication of an asymmetric microwell array device and loading of exactly one DNA barcoding bead and one RNA barcoding into the microwells is illustrated in FIGS. 13A-13B and described in Example 4. A dual-bead device was fabricated using standard soft lithography techniques. In this example, the device features pear-shaped wells with a large diameter of approximately 36 μm and small diameters of approximately 12 μm. The large diameter region has a depth of 46.7 μm while the small diameter region has a depth of 25 μm. There is a 25 μm gap between wells in each direction. Brightfield images were taken of the device and 78.5% of wells had exactly one large bead and one small bead. FIG. 13A shows a fabricated dual-bead device having wells without beads present with dimensions indicated. FIG. 13B shows a fabricated dual-bead device loaded with DNA barcoding bead and RNA barcoding bead. 78.5% of wells on the device had a single DNA barcoding bead and a single RNA barcoding bead.

FIG. 7D shows larger DNA-barcoding beads containing both polyadenylated barcoded oligonucleotides and barcoded oligonucleotides each attached by a photocleavable linker. In both types of oligonucleotides, the gDNA cell barcode is specific to the bead and the UMI is specific to the oligonucleotide molecule. RNA-barcoding beads contain barcoded oligo(dT). Similar to the DNA barcoding bead, the cDNA cell barcode is specific to the bead and the UMI is specific to the oligonucleotide molecule.

Figure 7E:
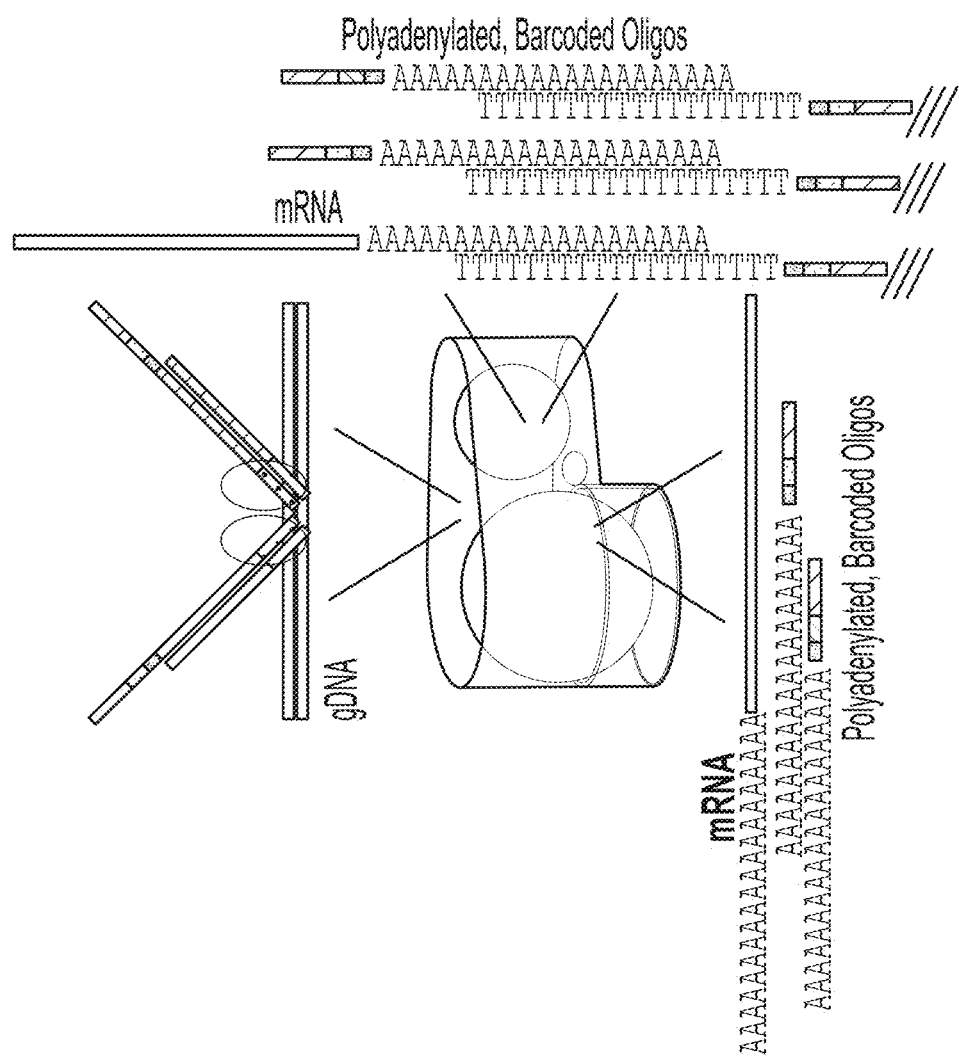
FIG. 7E illustrates how after lysis and photocleavage, the polyadenylated barcode and mRNA are captured on the RNA-barcoding bead.
Figure 7F:
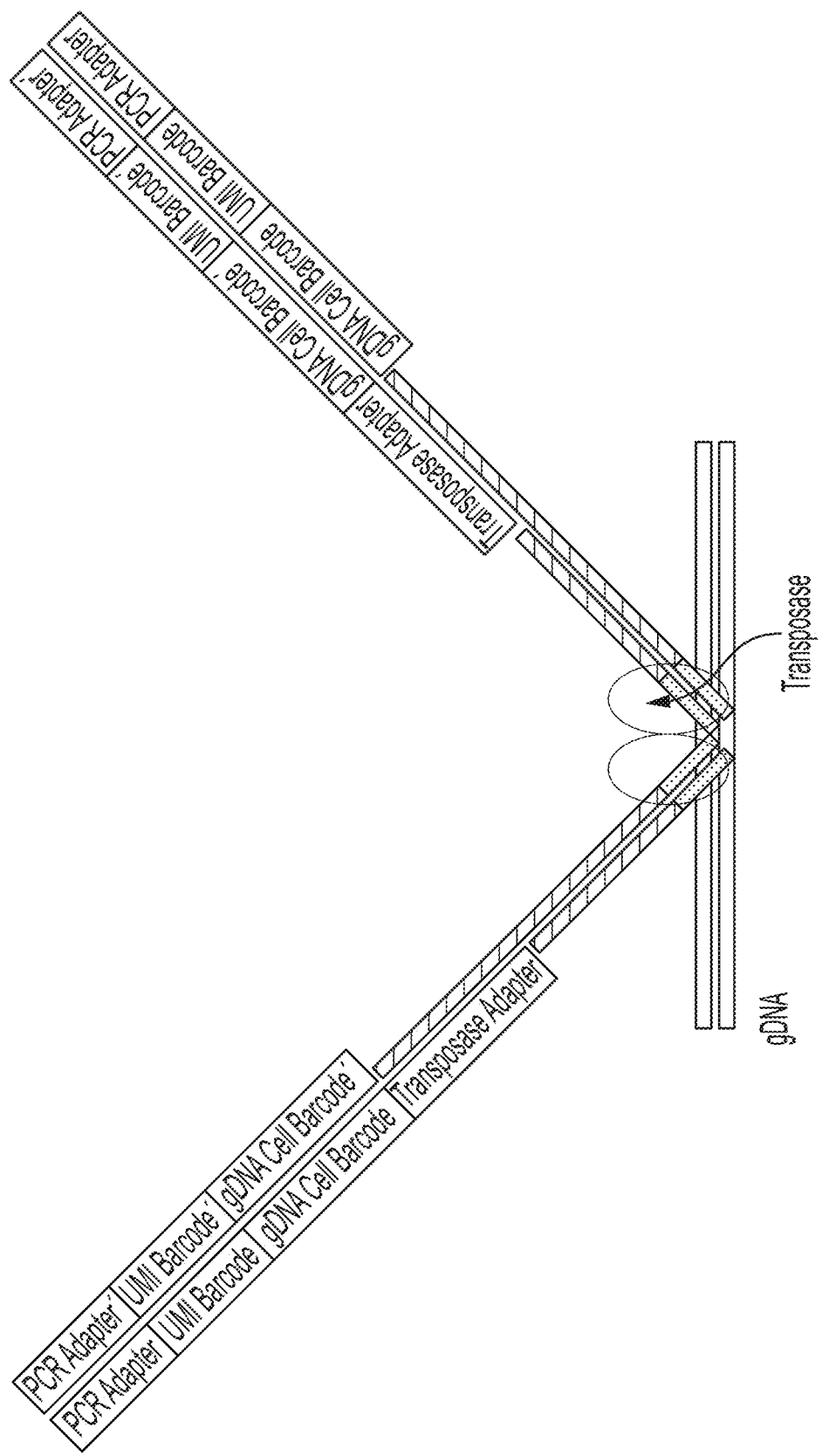
FIG. 7F is an expanded view of FIG. 7E illustrating the transposase bound to gDNA.

FIG. 7E shows that after cell lysis and photocleavage to release the oligonucleotides from the DNA barcoding bead, the polyadenylated DNA barcode and mRNA are captured on the RNA-barcoding bead. The barcoded transposases tagment the gDNA. FIG. 7F is an expanded view of FIG. 7E illustrating the transposase bound to gDNA.

Similar to the previously described device of FIG. 1 and FIG. 2, the devices of the present disclosure include a microfluidic flow cell with an array of microwells on top of a support, such as, for example, a glass slide. Individual cells can be loaded by gravity at limiting dilution. FIG. 8A shows an array of asymmetric microwells fabricated in PDMS with "step" geometry for accommodating both the large DNA barcoding and small RNA barcoding beads. FIG. 8B is a zoom-in of the microwell array after efficient dual-bead loading.

The microwells can be made by soft lithography in polydimethylsiloxiane (PDMS) on photoresist-on-silicon molds fabricated by photolithography. The microwells are reversibly sealable, to allow trapping thousands of individual cell lysates and capture mRNA by hybridization to barcoded oligonucleotides on beads. On-chip reverse transcription integrates cell-specific barcodes and molecule-specific barcodes into cDNA, which are then pooled for library construction at costs of about $0.03/cell for about 30,000 cells per experiment.

The devices can be fabricated to accommodate a variety of sample sizes from thousands of microwells to hundreds of thousands to facilitate parallel genomic and transcriptomic analysis of thousands to tens of thousands of individual cells. Devices of various sizes may be used, depending on the application. For example, a typical device can contain about 150,000 microwells for profiling about 5,000-10,000 cells.

Preferably, the microbeads and device have efficient bead loading, such that 80%, more preferably 90%, of microwells contain a single DNA-barcoding bead and a single RNA-barcoding bead.

Preferably, the device and barcoding capacity permits parallel, scRNA-seq and scDNA-seq profiling of about 5,000 cells per experiment. For RNA-barcoding beads, there are commercial bead libraries with millions of cell-identifying barcodes. In the case of RNA barcoding beads that are compatible with SCOPE-seq that comprise a cell identifying optical barcode sequence having a unique combination of nucleotide sequences that can be read out by hybridization to labeled complementary probes, the oligonucleotides for the RNA barcoding beads can be synthesized by split-pool, solid-phase synthesis as illustrated in FIG. 2F. In one example, beads are pooled together to add common sequences and random UMIs and are split into 96 reactions to add one of the 96 cell barcode sequences. After two rounds of split-pooling, a total of $96^2=9,216$ cell barcodes are generated. The desired number of unique RNA barcodes can be generated in this manner. For the DNA-barcoding beads, a 2×384-well plate split-pool synthesis can be used to generate 384×384=147,456 different barcode combinations.

Figure 11:
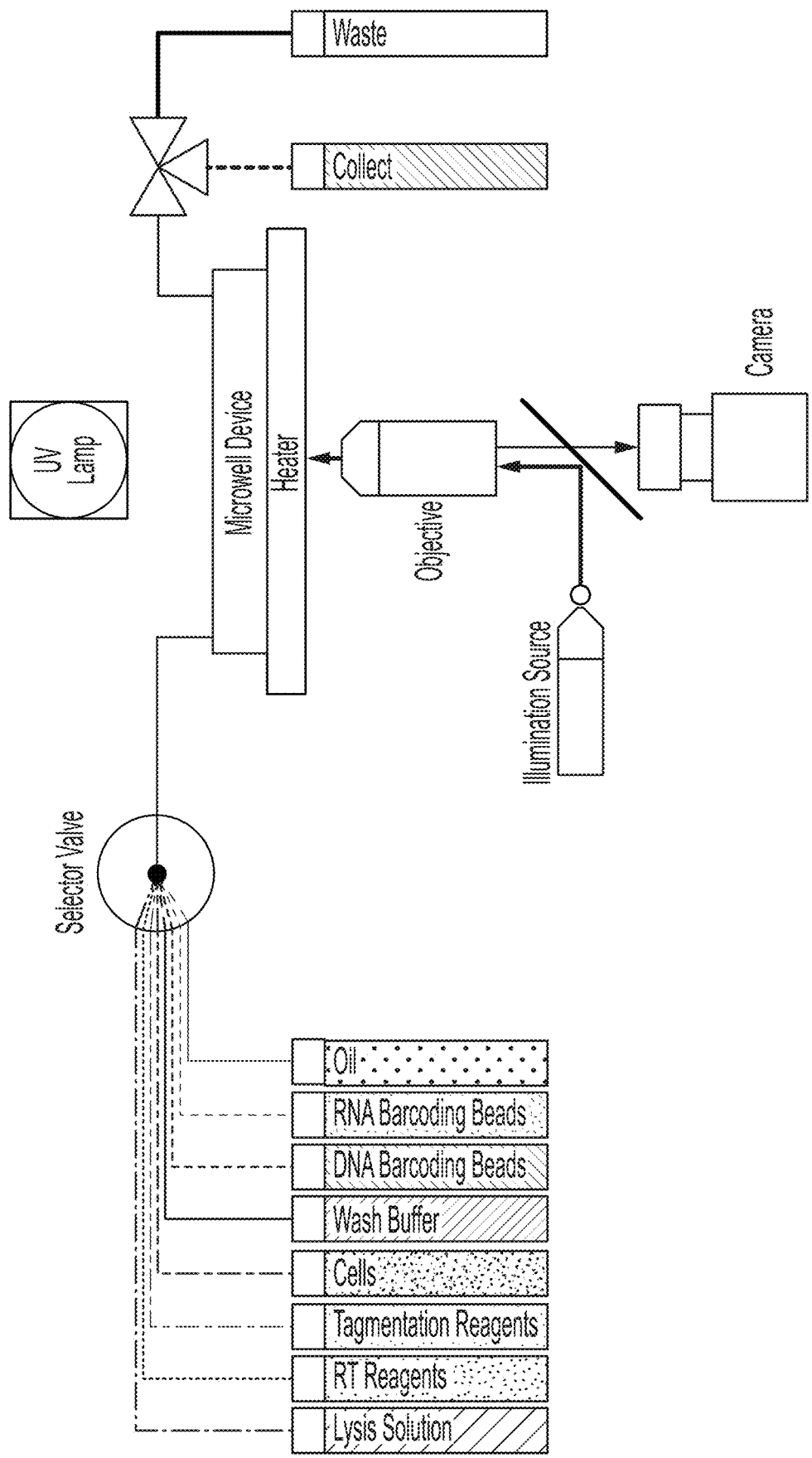
FIG. 11 is a diagram of an example system which can be automated and scaled including asymmetric microwell array, fluidics, imaging, and ultraviolet light source for associating a single cell image with unique optical barcode readout, and preparation of pooled RNA libraries and genomic DNA libraries from thousands of single cells.

The systems, methods, and compositions of the present disclosure can also accommodate the use of SCOPE-seq beads as the RNA barcoding bead which provides the added capability of linking high-content imaging of individual cells to genomic and transcriptomic profiles. FIG. 11 is a diagram of an exemplary system which can be automated and scaled including asymmetric microwell array, fluidics, imaging, and ultraviolet light source for associating a single cell image with unique optical barcode readout, and preparation of pooled RNA libraries and genomic DNA libraries from multiple single cells.

Resealing of microwells in the present method was examined by fluorescent recovery after photobleaching and the results are shown in FIGS. 12A-12F and described in Example 3. The microwell array device was filled with wash buffer (20 mM Tris-HCl, 50 mM NaCl, 0.1% Tween-20) and sealed with oil (Flurinert FC-770). A solution of oligos (100 nM) tagged with Cy3 in tris buffered saline (TBS) was then injected at flow rate 110 uL/min. The device was imaged to confirm the removal of the oil and the presence of Cy3 oligos throughout the device Subsequently oil was injected in the chip again to seal the Cy3 oligos in the wells of the device. The device was imaged again to confirm the Cy3 signal was limited to the wells. A green laser (beam size ~260 μm) was focused on the device for 10 minutes, photobleaching the Cy3 dye in approximately eight wells. The photobleached wells and their surrounding wells were imaged every 5 minutes for 180 minutes starting from the moment immediately after photobleaching (t=0 min). The fluorescence intensity of the photobleached wells and the surrounding wells were measured to determine whether the wells that were not photobleached had a decrease in fluorescent intensity (and thus a loss of Cy3 oligos), and to determine whether the photobleached wells had an increase in fluorescent intensity (and thus the diffusion of Cy3 oligos from unbleached wells to the photobleached wells).

Figures 14A, 14B, 14C, 14D, 14E:
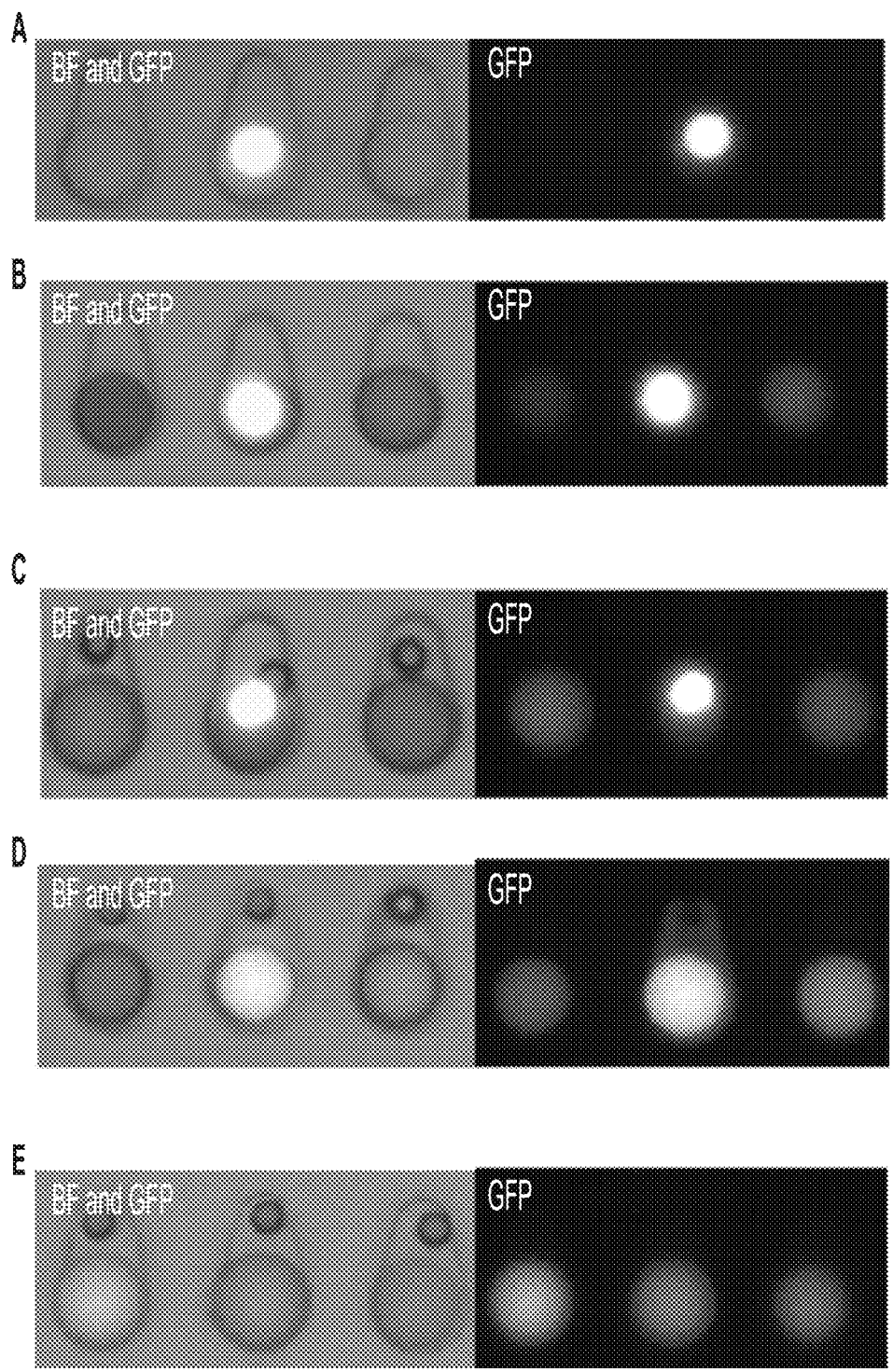
FIG. 14A is an image of wells of the dual-bead device where cells are stained with Calcein AM and images are taken with brightfield and GFP filters in which a cell suspension is introduced and the wells are washed leaving single cells in wells.
FIG. 14B is an image where the larger DNA sequencing beads are introduced.
FIG. 14C is an image after the RNA barcoding beads are introduced. FIG.
FIG. 14E is an image where tagmentation solution is introduced and tagmentation proceeds.

FIGS. 14A-14E and Example 5 demonstrate the method for simultaneous, genome-wide profiling of RNA and DNA from the same cell. Cells (U87) stained with Calcine AM were loaded into a dual bead asymmetric microwell array device. FIG. 14A is an image of the microwells of the dual-bead device where images are taken with brightfield and GFP filters after loading single cells in wells. It can be seen that the cell is introduced and trapped in the well. FIG. 14B is an image after loading of the DNA barcoding beads. The smaller RNA barcoding bead was then introduced into the device and the device was washed with TBS again. FIG. 14C is an image after the RNA barcoding beads were introduced. The wells can be seen to have a single large bead and a single small bead. Lysis buffer was then injected and released RNA is captured by the RNA sequencing beads (FIG. 14D). The lysis buffer lysed the cell causing the Calcein AM to fill the well, rather than being localized to the cytoplasm of the cell. Finally, FIG. 14E is an image after tagmentation solution was introduced and tagmentation proceeds. The introduction of tagmentation reagents washed out the Calcein AM but the two beads remained in the wells.

FIGS. 15A-15D and Example 6 show that oligonucleotides conjugated to beads can be efficiently released by photocleavage. Oligonucleotides with a Cy3 tag and a biotin group (with and without a photocleavable linker) were incubated with streptavidin beads and the beads were introduced into a an asymmetric microwell array device. After exposure to UV light for a total of 30 minutes, wash buffer unseals the wells containing the photocleaved oligos and flushes away oligos not bound to bead surfaces. When the oligos with photocleavable linker are used, the Cy3 signal decreases rapidly (<20% intensity of the original fluorescent intensity) during the first 5 minutes, and then gradually declines for the remained of the experiment indicating the release and removal of oligos from the device. On the contrary, when oligos without photocleavable linkers are used, the signal remains<80% of the starting fluorescent intensity.

Figure 16A:
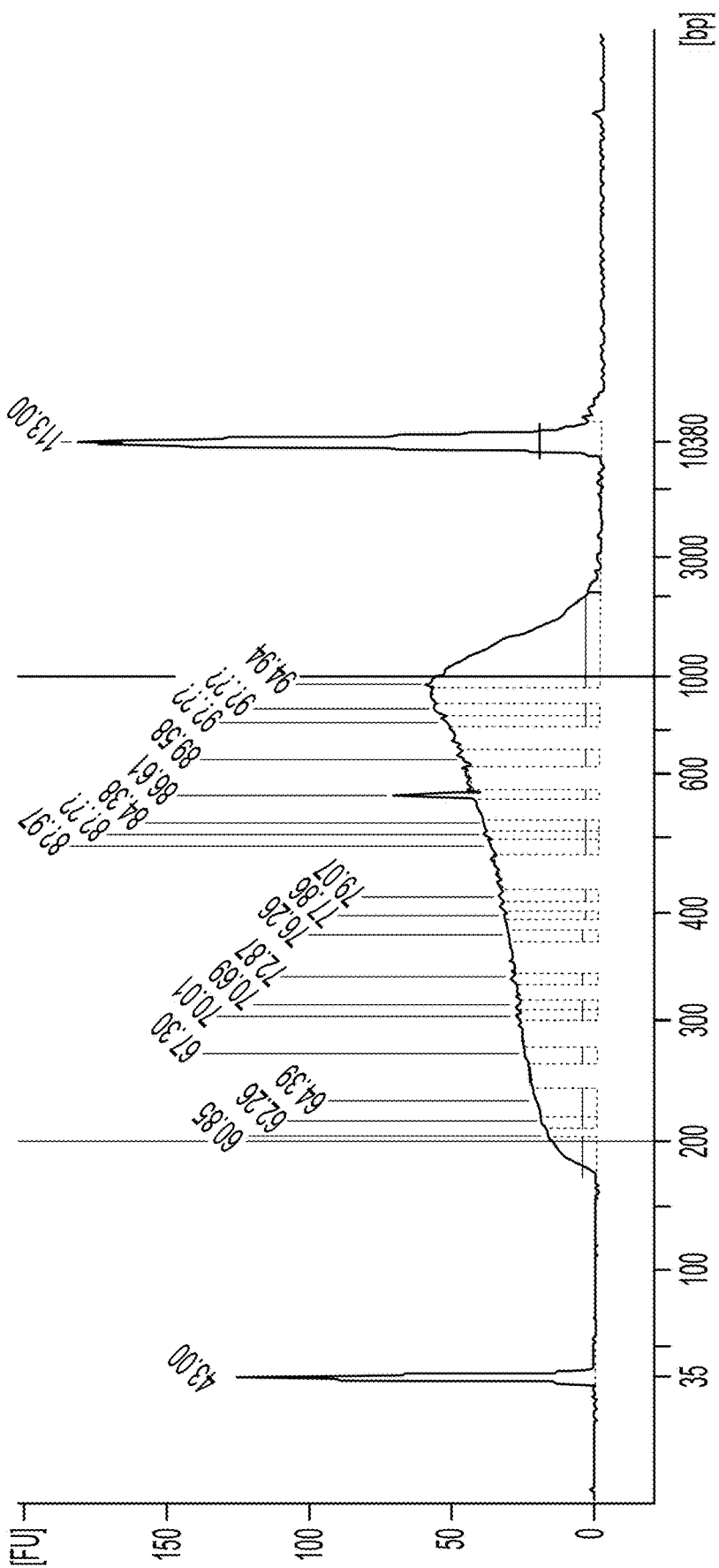
FIG. 16A is a bioanalyzer trace of DNA library prepared by on-chip processes of the dual-bead device in which single cells were introduced into the device, lysed, and tagmented.
Figure 16B:
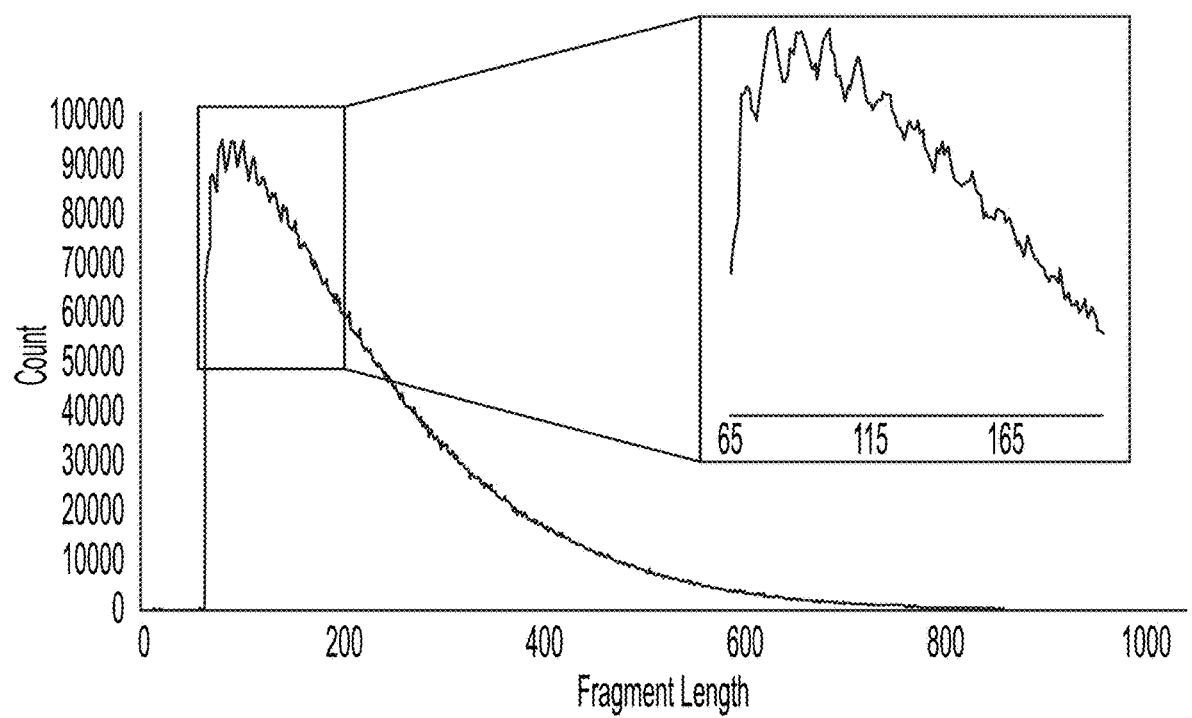
FIG. 16B is a plot showing mapped fragment lengths after removing duplicates in sequencing of the device-prepared gDNA in which ~10 bp periodicity is observed in the fragment length.
Figure 16C:
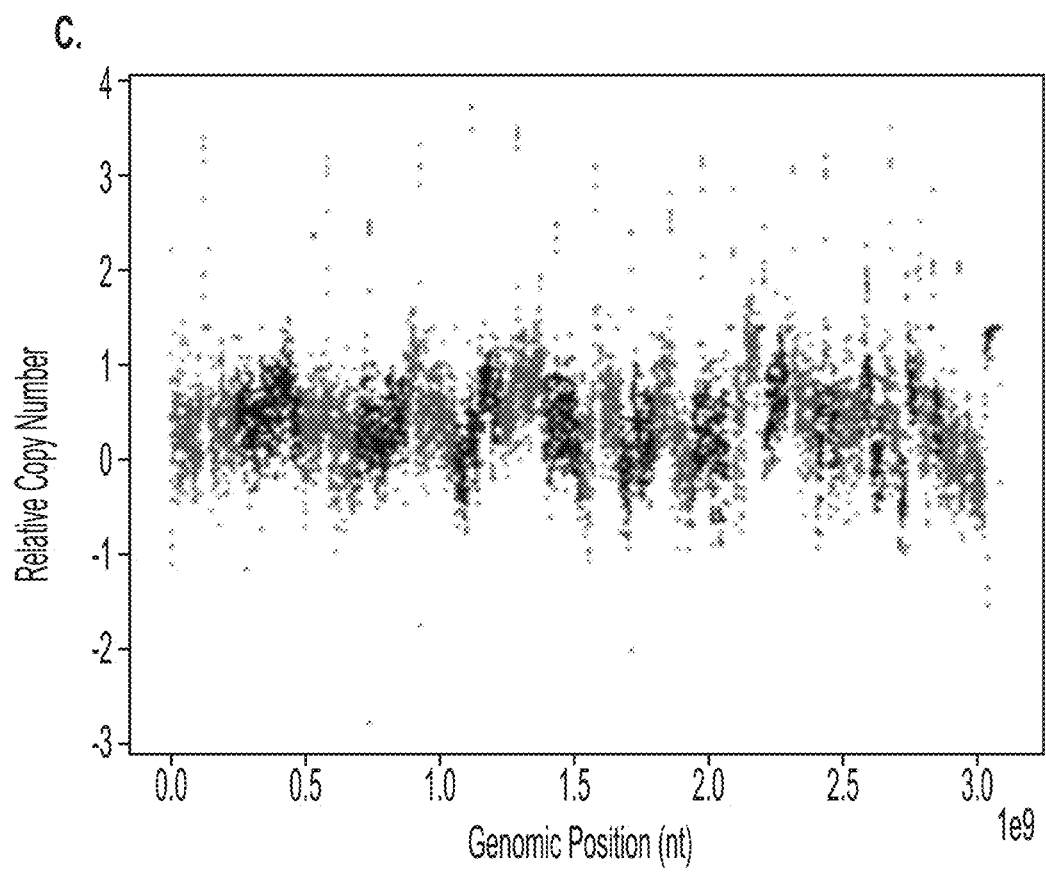
FIG. 16C is a plot showing coverage of 0.5 MB bins across the genome of U87 cells produced from the on-chip processes in which 8.3 million unique reads were mapped yielding ~0.4× overall coverage of the human genome.

FIGS. 16A-16C and Example 7 illustrate tagmentation of gDNA on the microwell array device. Cells (U87), RNA barcoding beads, and DNA barcoding beads were introduced into the device. Lysis buffer was introduced into the array followed by tagmentation reagents. After completion of the tagmentation reaction, neutralization buffer was introduced and the contents of the wells was collected. Libraries were prepared from the on-chip tagmented gDNA and the results are shown in FIGS. 16A-16C. FIG. 16A is a bioanalyzer trace of DNA library prepared by on-chip processes. FIG. 16B is a plot showing mapped fragment lengths after removing duplicates in sequencing of the device-prepared gDNA in which ~10 bp periodicity is observed in the fragment length. FIG. 16C is a plot showing coverage of 0.5 MB bins across the genome of U87 cells produced from the on-chip processes in which 8.3 million unique reads were mapped yielding ~0.4× overall coverage of the human genome. This agrees with other libraries prepared by Tn5 tagmentation and is suspected to be a result of the 10.5 bp DNA pitch length. The CNV plot had approximately 0.4× coverage and contained features characteristic of U87 cells, such as deletion of chromosome$_{[SZ1]}$ 9 p13. Furthermore, the CNV plot showed an amplification of the centromeres which is caused by the repetitive nature of the DNA in this region.

In one embodiment, a method is provided for linking scRNA-seq and scDNA-seq from the same cell, comprising: (a) introducing a single cell into an asymmetric microwell; (b) introducing into the microwell a DNA-barcoding bead according to any one of claims 1 to 6, wherein the DNA-barcoding bead and the microwell have relative size permitting only one DNA-barcoding bead to fit in the microwell; (c) introducing a RNA-barcoding bead into the microwell containing the DNA-barcoding bead, wherein the RNA-barcoding bead has a size permitting only one RNA-barcoding bead to fit in the microwell containing the DNA-barcoding bead; (d) lysing the cell to release gDNA and mRNA and capture polyadenylated mRNA on the RNA-barcoding beads; (e) washing out cell lysate under conditions to retain gDNA in the microwell; (f) introducing a transposase into the microwell to integrate universal adapters into the gDNA; and (g) releasing the oligonucleotides on the DNA-barcoding bead by cleavage, whereby barcoded adapters released from the DNA-barcoding bead hybridize to the universal adapters, and polyadenylated barcodes released from the DNA-barcoding bead hybridize to oligonucleotides on the RNA-barcoding bead.

The method can further comprise: (a) adding a neutralization buffer to the microwell to release transposed, barcoded gDNA fragments from the transposases, and amplifying the barcoded gDNA fragments to generate a genomic sequencing library; and (b) reverse transcribing the captured polyadenylated mRNA to cDNA and amplifying the cDNA.

Figure 17:
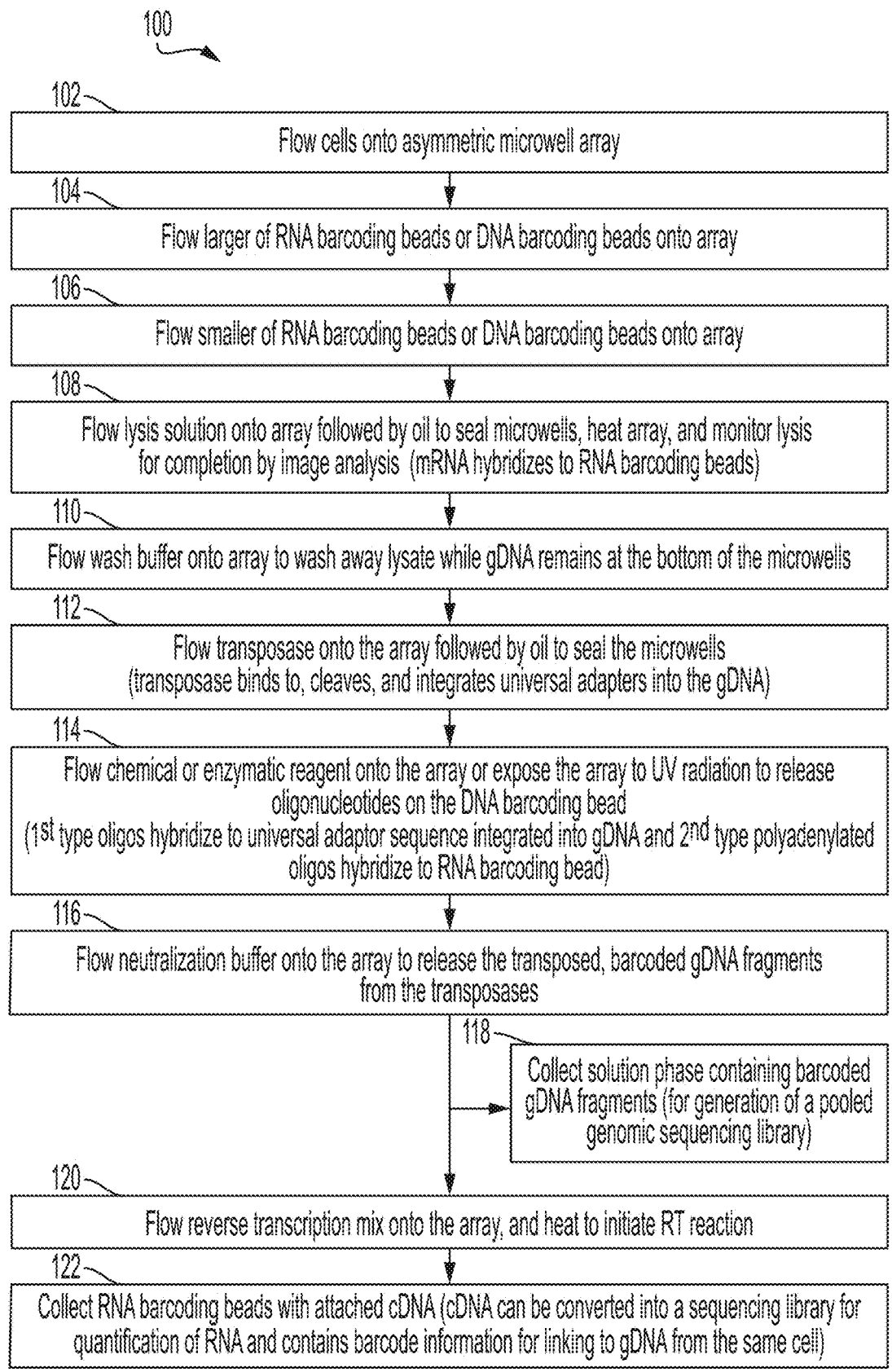
FIG. 17 is a flow diagram of a method for automated, large-scale sample preparation of cDNA and gDNA sequencing libraries from the same single cell.

FIG. 17 is a flow diagram of an instrument-level method 100 for generating linked multi-omic information, specifically scRNA-seq and scDNA-seq, from a single-cell within an asymmetric microwell.

The method 100 includes flowing cells onto the asymmetric microwell array of a system, such as the system illustrated in FIG. 11 (102). Cells are flowed onto the array by limiting dilution to maximize the number of single cells in the microwells. The method 100 includes flowing the larger of RNA capture beads or DNA barcoding beads onto the array (104). The DNA barcoding beads are conjugated to two different species of oligonucleotides: (1) barcoded adapter oligonucleotides that are complementary to oligonucleotides bound to the transposase that are eventually incorporated into gDNA fragments and (2) polyadenylated barcoded oligonucleotides containing the same barcode sequence as the adapters (see FIG. 4 and FIG. 7D). The latter polyadenylated barcoded oligonucleotides may be a small percentage of the barcoded adapter oligonucleotides. The method 100 includes flowing the smaller of RNA capture beads or DNA barcoding beads onto the array (106). The method 100 includes flowing a lysis buffer onto the array followed by flowing oil to seal the microwells, heating the array and performing image analysis to monitor lysis for completion within the microwells (108). The method 100 includes flowing wash buffer onto the array to remove cell lysate while genomic DNA (gDNA) is retained at the bottom of the microwells (110).

The method 100 includes flowing transposase onto the array followed by oil to seal the microwells (112). In this step the transposase binds to, cleaves, and integrates universal adaptors into the gDNA. The method 100 includes flowing chemical or enzymatic reagent onto the array or exposing the array to UV radiation to release the oligonucleotides conjugated to the DNA barcoding bead (114). In this step, the first type of oligonucleotides hybridize to the universal adaptor sequence integrated into the gDNA and the second type of polyadenylated oligonucleotides hybridize to RNA barcoding bead which contains poly(dT). The method 100 includes flowing neutralization buffer onto the array to release the transposed, barcoded gDNA fragments from the transposases (116). The method 100 includes collecting the solution phase of the neutralization buffer containing barcoded gDNA fragments (118). The collected barcoded gDNA fragments can be used in generation of a pooled genomic sequencing library.

The method 100 includes flowing reverse transcription mix onto the microwell array and heating the array to initiate the RT reaction (120).

In the method 100, microbeads with attached cDNA are collected from the microwell array (122). The cDNA attached to the RNA coding beads can be converted into a sequencing library for quantification of RNA and contains barcode information for linking to gDNA from the same cell.

Figure 18:
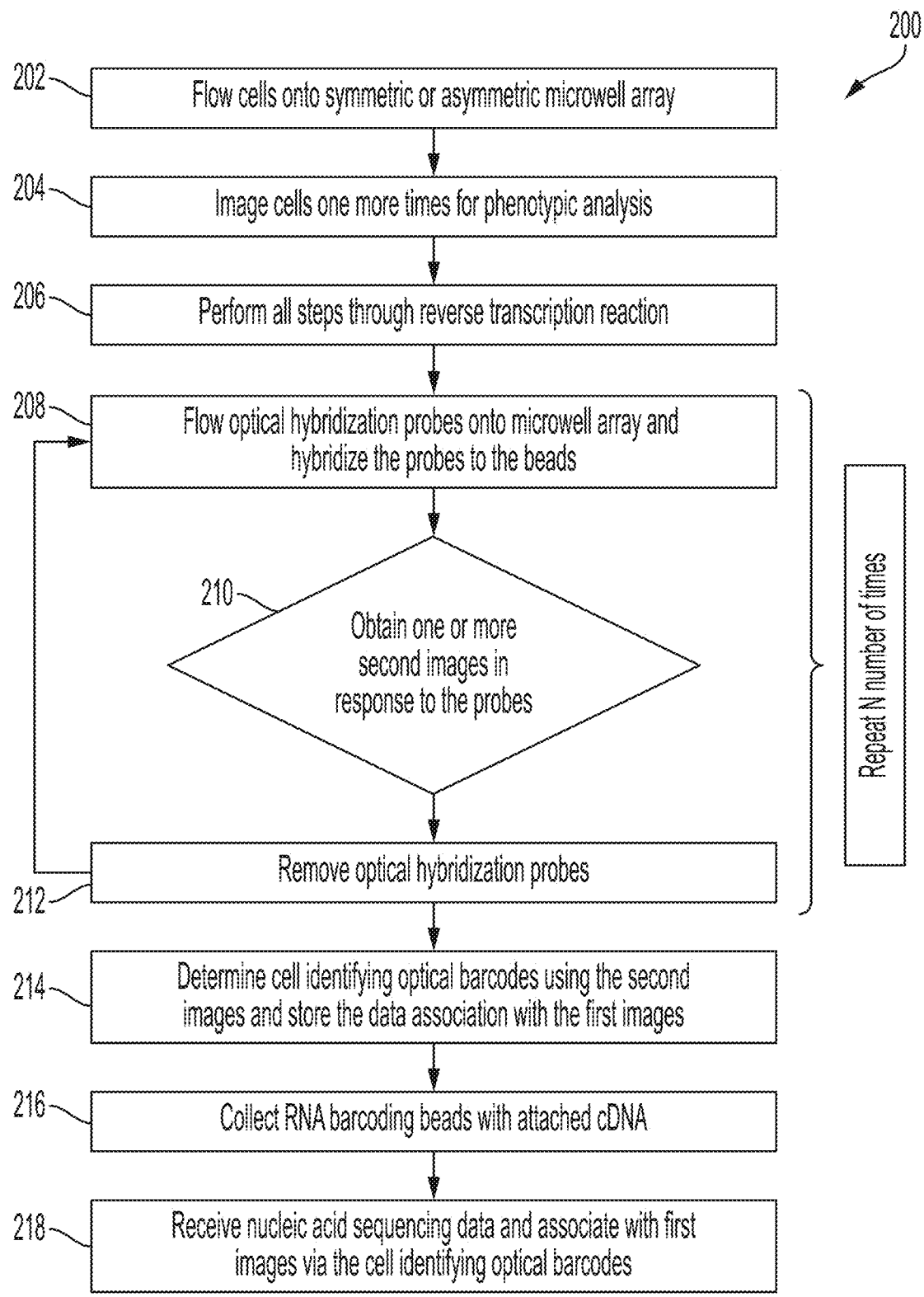
FIG. 18 is a flow diagram of a method for linking single cell phenotypic image analysis with unique optical barcode readout to enable association of the cell phenotypic data with multi-omic data including scRNA-seq, scDNA-seq, and intra- and extracellular protein from the same single cell for thousands of cells in parallel.

FIG. 18 is a flow diagram of a method 200 for linking single cell phenotypic image analysis with unique optical barcode readout to enable association of the cell phenotypic data with multi-omic data including scRNA-seq, scDNA-seq, and intra- and extracellular protein from the same single cell for thousands of cells in parallel.

In one embodiment, the method 200 can be merged with the method 100 to enable association of cell phenotypic data with scRNA-seq and scDNA-seq. For example, the method 200 includes flowing cells onto the symmetric or asymmetric microwell array of a system, such as the system illustrated in FIG. 11 (202). Cells are flowed onto the array by limiting dilution to maximize the number of single cells in the microwells. The method 200 includes imaging the cells one or more times to obtain, for each position in the microwell array, one or more first images of the phenotype of the cell at the position (204). Each image is associated with a corresponding position of the microwell in the array.

In one embodiment, the method 200 next includes performing the steps of the method 100 described above, up to and including the reverse transcription reaction (206) (specifically, steps 104-120 of method 100). In the method 200, the RNA barcoding beads used in step 104/106 of method 100 are SCOPE-seq beads and, in particular, comprise a cell-identifying optical barcode sequence comprising a unique combination of nucleotide sequences that can be read out by hybridization to labeled complementary probes.

The method 200 includes flowing a first of N pools of optical hybridization probes onto the microwell array and hybridizing the probes to the beads located therein having a complementary nucleotide sequence in the cell identifying optical barcode sequence attached thereto (208). The method 200 includes obtaining, for each position of the plurality of positions, one or more second images to quantify a fluorescent intensity at the position, each of the one or more second images used to create a binary code depicting a match or a lack of a match between at least one of the optical hybridization probes and the cell identifying optical barcodes (210). A match can be identified where a sufficient intensity of light is identified in an image of a microwell containing a RNA barcoding bead after flowing and hybridizing the optical hybridization probe. The method 200 includes removing the optical hybridization probes (212).

The method 200 includes repeating the flowing and hybridizing the probes (208), obtaining second image(s) in response to the probes (210), and removing the probes (212) steps for each of the N pools of probes.

The method 200 includes determining, by mapping the binary code for each of the N pools of probes to the cell identifying barcode sequence, for each position of the plurality of positions, the cell identifying optical barcode for the position and storing a data association between the cell identifying optical barcode for the position and the first image at the position (214). For example, determining the cell identifying optical barcode can comprise a digital value formatted such that each bit position in the value corresponds to a match or a lack of a match between an optical hybridization probe or a pool of optical hybridization probes and a cell identifying optical barcode.

The method 200 includes collecting the RNA barcoding beads with the attached cDNA (216) which is the same step as step 122 of method 100.

The method 200 includes storing, for each position of the plurality of positions, after receiving nucleic acid sequencing data for each cell identifying optical barcode, a data association between the nucleic acid sequencing data, the cell identifying optical barcode, and the first image associated with the cell identifying optical barcode (218). After receiving nucleic acid sequencing data for each cell identifying optical barcode from the pooled scRNA-seq libraries, there is a data association between the cell identifying optical barcode sequence for each position of the microwell array and the one or more first images of the phenotype of the cell at said position. In this manner, the method 100 is merged with method 200 to provide the additional advantage of associating cell phenotypic data with scRNA-seq and scDNA-seq from the same single cell.

In one embodiment, the single-cell resolution or the cross-talk rate (i.e., the rate at which RNA or DNA from the incorrect cell is associated with the barcode of a given cell) is preferably <1.5%, more preferably <1%, for scRNA-seq and scDNA-seq. A typical cross-talk rate is about 1% for scRNA-seq.

In one embodiment, the polyadenylated barcoded oligonucleotide capture process and library construction preferably permits an about 95% rate of linking scRNA-seq and scDNA-seq profiles with an accuracy of >99%. Preferably, this yields as few as about 1,000 copies of the polyadenylated barcode in solution per microwell.

The systems, methods, and compositions of the present disclosure can result in highly efficient molecular capture for scRNA-seq. Preferably, the average molecular capture efficiency is about 25,000 mRNA molecules on average per U87 human glioma cell line cell (a standard used in quality-control).

The systems, methods, and compositions of the present disclosure can result in uniform coverage for scDNA-seq. The system preferably achieves >25% conversion rate for gDNA and coverage uniformity coefficient-of-variation of <50% with 1 megabase bins at 0.05× average sequencing depth per cell (sequencing costs of about $8,500/5,000 cells on an Illumina NovaSeq).

The systems, methods, and compositions of the present disclosure can result in efficient, accurate linkage of single-cell genomic data with imaging. The previously described SCOPE-seq technology has a linking accuracy of about 97% and efficiency of >50%. Preferably, this performance (about 97% accuracy, >50% efficiency) is maintained for the presently disclosed system and methods for integrating imaging with parallel scRNA-seq and scDNA-seq. This may be evaluated using a mixed species experiment with differentially labeled cells from each species (e.g., blue human cells, green murine cells).

In addition to the embodiments described above, multiple embodiments are also provided herein for integrated analysis of RNA and protein, including intracellular protein, from individual cells using similar microwell array devices. The idea behind these strategies is to avoid protein fixation by first lysing an individual cell to liberate its intracellular contents, and then capturing protein either on a solid surface or in solution with barcoded affinity reagents.

In one embodiment of the present disclosure, systems, methods, and compositions are provided for scRNA-seq library preparation, where the library contains barcode information for linking to intra- and extracellular protein from the same cell.

Figure 19:
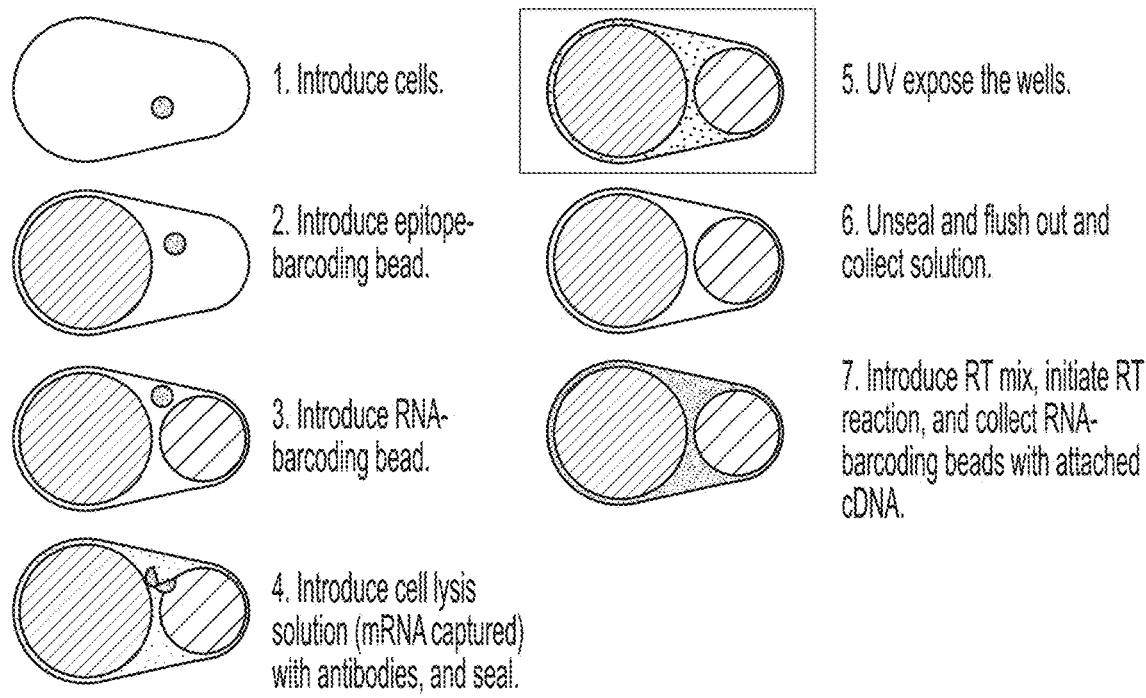
FIG. 19 is a schematic diagram showing a device-level procedure for linking scRNA-seq and intra- and extracellular protein information from a single-cell using bead-immobilized cDNA and bead-immobilized proteins.

In a first implementation (FIG. 19), cells are co-encapsulated with two beads conjugated to barcoded oligonucleotides. The first bead (RNA barcoding bead) is coated in oligonucleotide primers that contain a PCR adapter, a cell-identifying barcode, optionally, a unique molecular identifier or UMI barcode, and a poly(dT) (see FIG. 20). The oligonucleotide conjugated to this bead is shown as 'barcoded mRNA capture oligo' in FIG. 20 and is the same oligonucleotide conjugated to the RNA barcoding beads described herein above. The term "cell-identifying barcode" is used herein for the purposes of the specification and claims interchangeably with the term "cell barcode" and the term "cDNA cell barcode".

When the cell is lysed in a sealed microwell, this RNA barcoding bead captures the released mRNA by hybridization of 3'-poly(A) tails on mRNA to the poly(dT) on the bead. Subsequent reverse transcription will incorporate a unique, cell-identifying barcode sequence into the resulting cDNA. The RNA barcoding beads in this embodiment can also be SCOPE-seq beads having a cell identifying optical barcode sequence.

Figure 20:
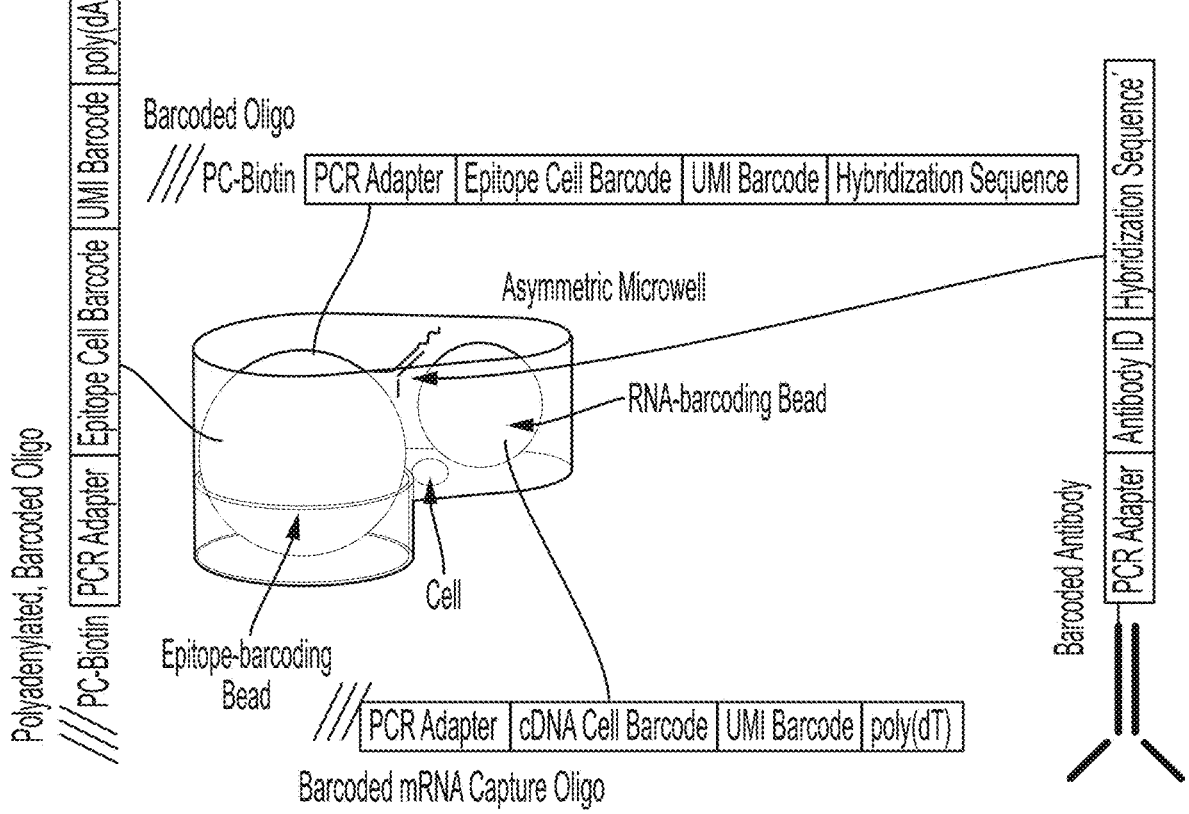
FIG. 20 is a schematic diagram showing a larger epitope-barcoding bead and a smaller RNA barcoding bead encapsulated with a single cell within the microwell device, the epitope-barcoding bead containing polyadenylated barcoded oligonucleotides and barcoded oligonucleotides each attached by a photocleavable linker. The epitope cell barcode on both the polyadenylated barcoded oligonucleotides and barcoded oligonucleotides is specific to the bead, whereas the UMI barcode is specific to the nucleotide molecule.
Figures 21A, 21B, 21C, 21D, 21E, 21F:
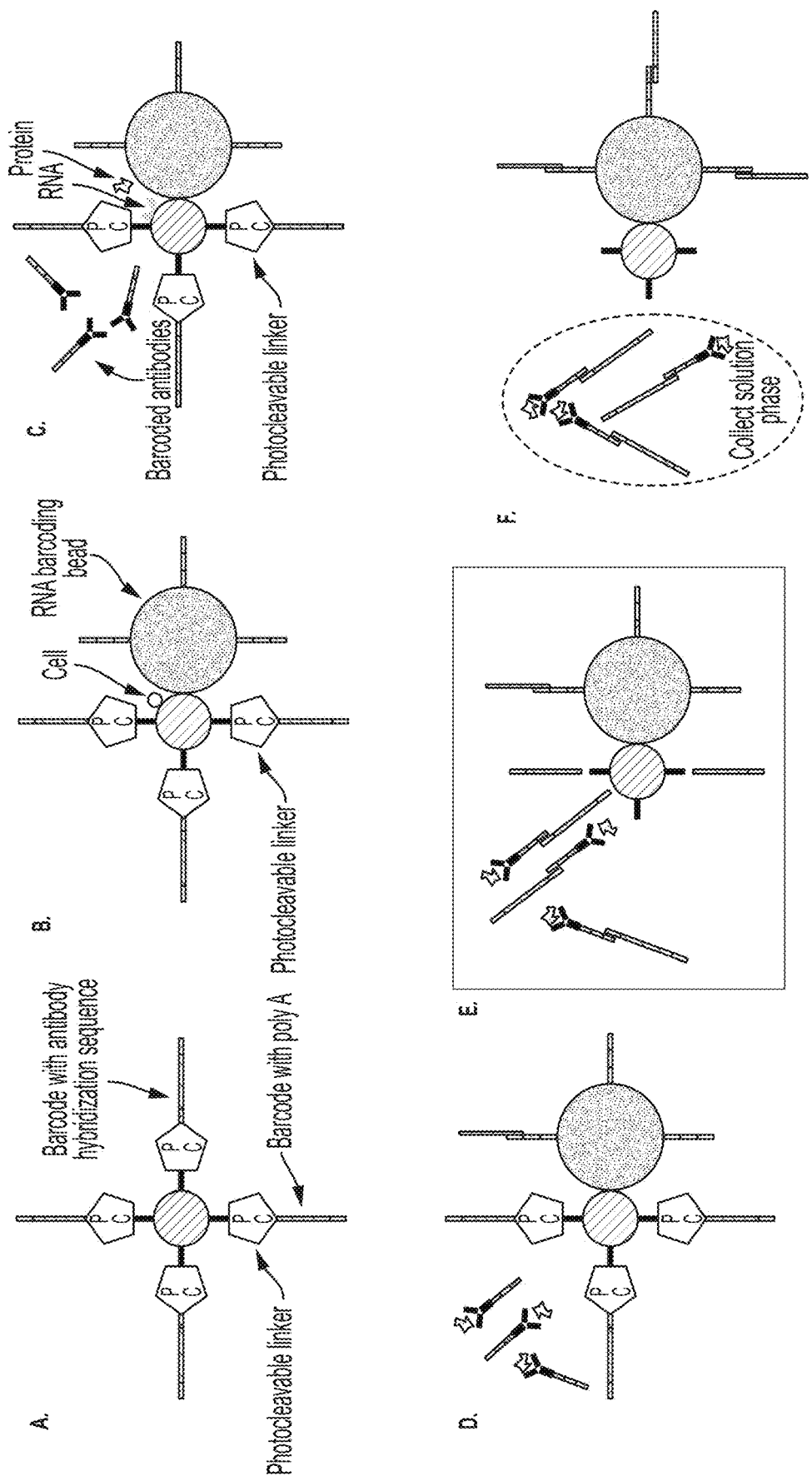
FIGS. 21A-21G are schematic diagrams of an example molecular workflow linking scRNA-seq and intra- and extracellular protein information from a single-cell using bead-immobilized cDNA and bead-immobilized proteins.
Figure 21G:
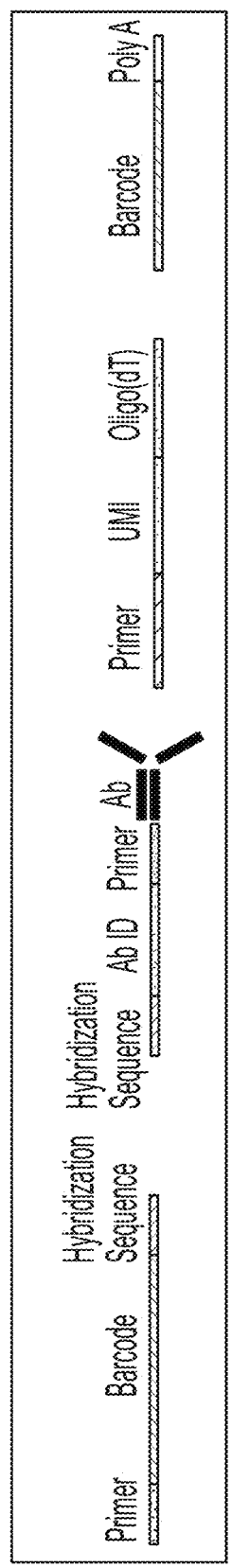

The second bead (epitope barcoding bead) is coated in two different types of oligonucleotide primers that are releasable attached to the bead (FIG. 20). One of them contains a PCR adapter, a cell-identifying barcode ('epitope cell barcode'), optionally a UMI, and an adapter sequence that is complementary to a universal adapter sequence on all DNA-barcoded antibodies or aptamers (here the DNA barcode identifies the antibody or aptamer) (see FIG. 20). The second oligonucleotide contains a PCR adapter, a cell-identifying barcode ('epitope cell barcode'), optionally a UMI, and a poly(A) (see FIG. 20).

The epitope barcoding beads can be generated combinatorially similar to the DNA barcoding beads. In one example, starting with commercial streptavidin-coated beads, a split-pool approach can be used to combinatorially conjugate barcoded oligos and polyadenylated barcodes. Two rounds of 384-well split-pooling can be used to obtain a library of 147,456 barcoded bead types. This can be accomplished via a series of enzymatic reactions (e.g. using DNA polymerase and/or DNA ligase) or solid-phase chemical synthesis.

Following cell lysis, the oligonucleotides on the second bead (epitope barcoding bead) are released into solution either via photocleavage, chemical cleavage, or enzymatic cleavage (see FIGS. 21A-21G). The first released oligonucleotide hybridizes and barcodes (with a cell-identifying barcode) the DNA-barcoded antibodies or aptamers that are included in the lysis buffer for capturing intra- and extra-cellular proteins. The second released oligonucleotide hybridizes to the oligonucleotides on the first RNA barcoding bead. Thus, when a scRNA-seq library is generated from the material captured on the first bead, the library contains not only the mRNA from the cell, but also the barcode information from the second epitope barcoding bead, allowing the two barcodes from the two beads to be linked together. This approach is used for linking protein and RNA from the same cells.

Figures 22A, 22B:
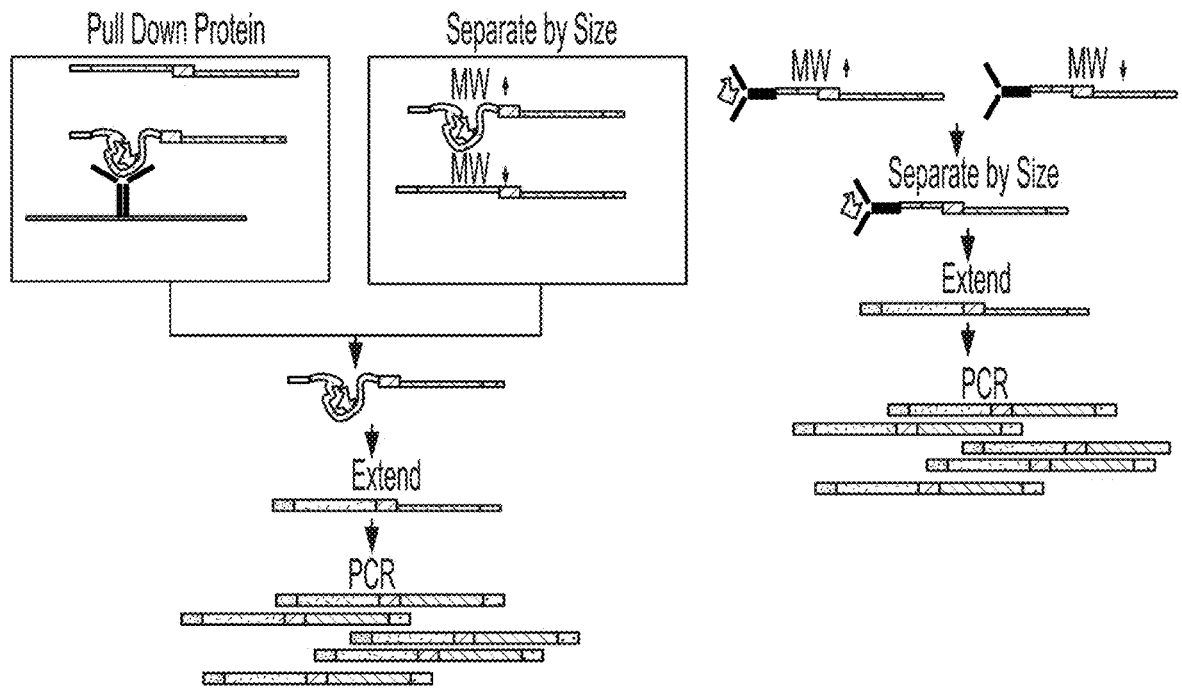
FIGS. 22A-22B are schematic diagrams of methods for separating affinity molecules with bound protein from affinity molecules without a bound protein.

After cell lysis and barcoding, the RNA barcoding beads can be removed from the device so that all of the captured material can be converted into a high-throughput sequencing library, and the solution-phase antibodies can be collected for isolation of antibody-protein or aptamer-protein complexes (FIGS. 22A-22B). The barcodes attached to the antibodies or aptamers can then be converted into a high-throughput sequencing library.

There are multiple possible approaches to isolating antibody-protein or aptamer-protein complexes including: 1) size-based chromatography (e.g. gel filtration or size exclusion); 2) affinity capture using a second set of antibodies against the same protein targets; 3) in the case of aptamers, selective enzymatic digestion of the epitope recognition sequence, which is protected for target-bound aptamers. In 3), any aptamer molecules that are not bound to their protein targets are destroyed prior to sequencing library preparation.

Figure 23:
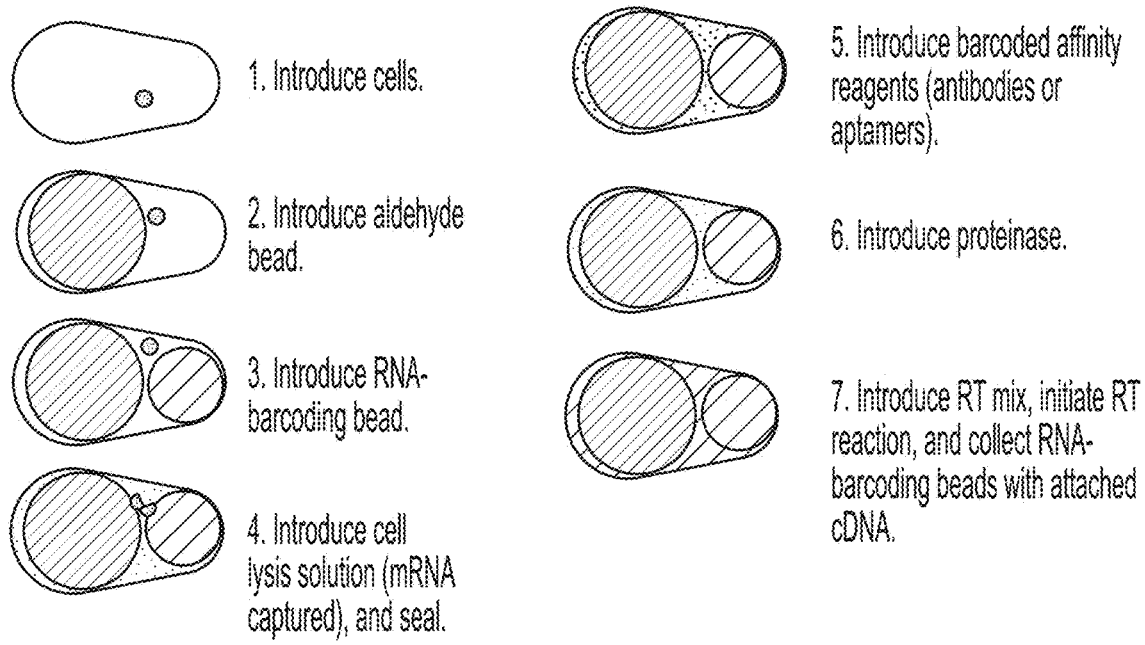
FIG. 23 is a schematic diagram showing a device-level procedure for linking scRNA-seq and intra- and extracellular protein information from a single-cell using bead-immobilized cDNA and bead-immobilized proteins.
Figures 24A, 24B, 24C, 24D:
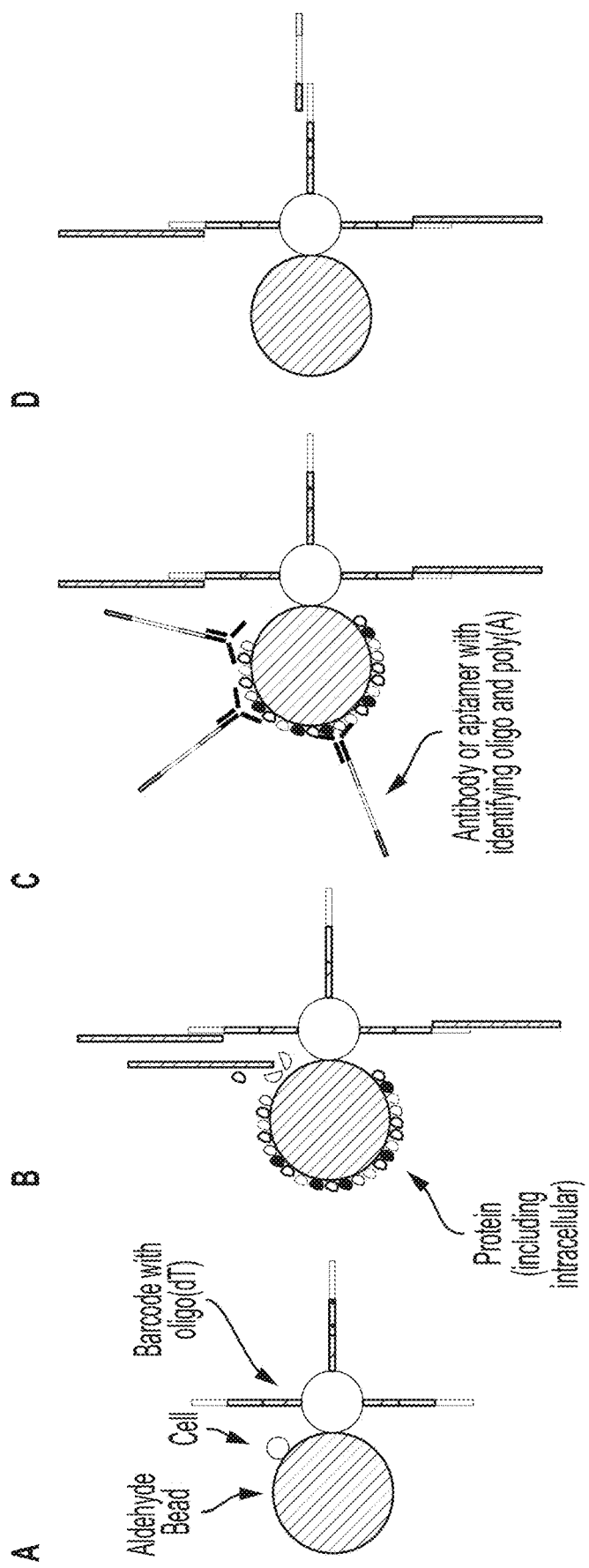
FIGS. 24A-24D are schematic diagrams showing the molecular workflow for the device-level procedure of FIG. 23.

In a second implementation (FIG. 23), the RNA barcoding bead is the same as described for the first implementation. However, the second bead has a non-specific protein capture surface (FIGS. 24A-24D). Examples of non-specific protein capture surfaces include amine-reactive (e.g. aldehyde, NHS) or thiol-reactive surfaces.

As described in embodiments herein above, an individual cell is co-encapsulated with an RNA barcoding bead and this second, non-specific protein binding bead in an asymmetric microwell array device. Upon lysis in a sealed microwell, mRNA from the cell is captured by hybridization on the RNA barcoding bead. The mRNA can be reverse transcribed, converting the mRNA into barcoded cDNA. Both intra- and extra-cellular protein is captured on the second non-specific protein binding bead.

At this point the microwell is unsealed and the remaining reactive groups on the protein capture bead can be quenched (e.g. with ethanolamine, trisamine, or glycine in the case of an amine-reactive bead). A set of DNA-barcoded antibodies or aptamers is introduced to bind to their targets that are bound to the second non-specific protein binding bead (see FIG. 23 and FIGS. 24A-24D).

The microwells are resealed in the presence of a non-specific protease to disrupt the antibody-protein complexes on the second bead so that their DNA barcodes can hybridize to the oligonucleotides on the mRNA capture bead. There are several ways this can be arranged. For example, the DNA barcodes conjugated to the antibodies or aptamers can be terminated with poly(A). The poly(A) tail can be further hybridized to oligo(dT) to prevent premature hybridization to the mRNA capture bead when the antibodies or aptamers are first introduced. During the protein-digestion process in the sealed microwell, the temperature can be raised briefly to melt the protecting oligo(dT) primer, allowing antibody or aptamer barcode capture by the RNA barcoding bead, which contains poly(dT) primers at a much higher concentration.

At this point, the nucleic acid captured on the RNA barcoding bead can be converted into a sequencing library that allows quantification of RNA and both intra- and surface epitopes from the same cell.

In a third implementation, the RNA barcoding bead is the same as described for the first and second implementations. However, there is no second bead for capturing proteins and instead proteins are captured non-specifically directly onto the surface of the microwells. In this embodiment, the microwells can be fabricated from a hydrophobic material that enables capture of proteins through adsorption. In another example, the surface of the microwells can be functionalized for non-specific protein capture. Such functionalized microwell surfaces include, but are not limited to, amine-reactive (e.g. aldehyde, NHS) or thiol-reactive surfaces.

Figures 25A, 25B, 25C:
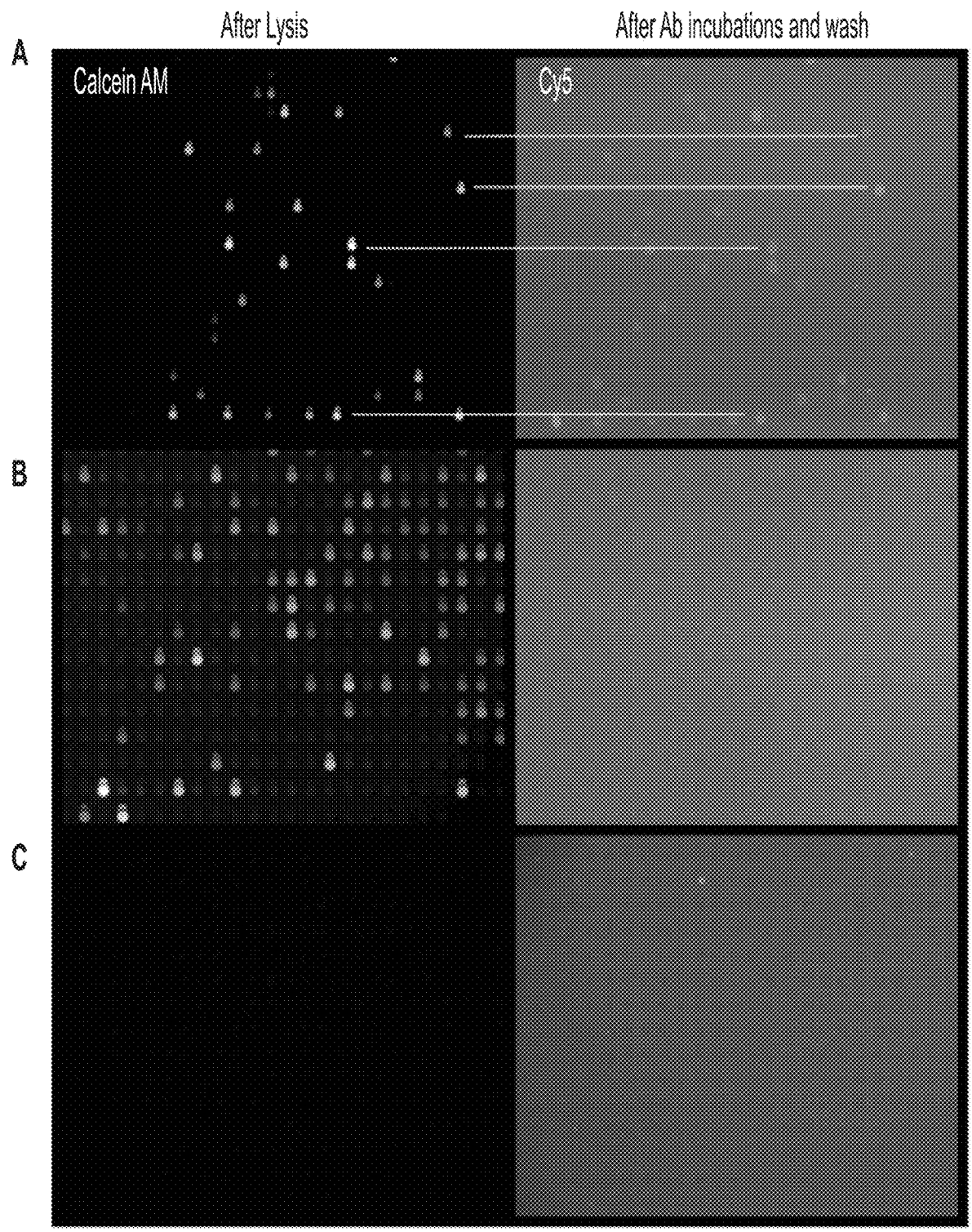
FIGS. 25A-25C are images demonstrating the capture and detection of intracellular proteins for single-cell lysates in microwells.

Example 8 describes and FIGS. 25A-25C are images demonstrating the capture and detection of intracellular proteins for single-cell lysates in microwells. TOP2A is an intracellular protein that functions primarily in the nucleus. For this example, the microwell array device is fabricated from PDMS that was not treated with chemicals, surface coatings, or oxygen plasma subsequent to curing. As a result, the PDMS surface of the microwells is highly hydrophobic, thus facilitating non-specific adsorption of protein. FIG. 25A shows fluorescence images of calcein AM in sealed microwells after lysis indicating microwells that contain individual cell lysates (left) and of Cy5 after unsealing the device, washing, and probing the capture surface with anti-TOP2A and Cy5-labeled secondary antibody (right). Cell-containing microwells are Cy5+, indicating TOP2A capture. Microwells without cells are Cy5−. FIG. 25B shows the same as (A) but repeated in the absence of anti-TOP2A antibody. None of the microwells are Cy5+, indicating the specificity of antibody detection of TOP2A. FIG. 25C shows the same as (A) but repeated in the absence of cells. None of the microwells are Cy5+, further indicating the lack of spurious signal for non-specific adsorption.

Figure 26:
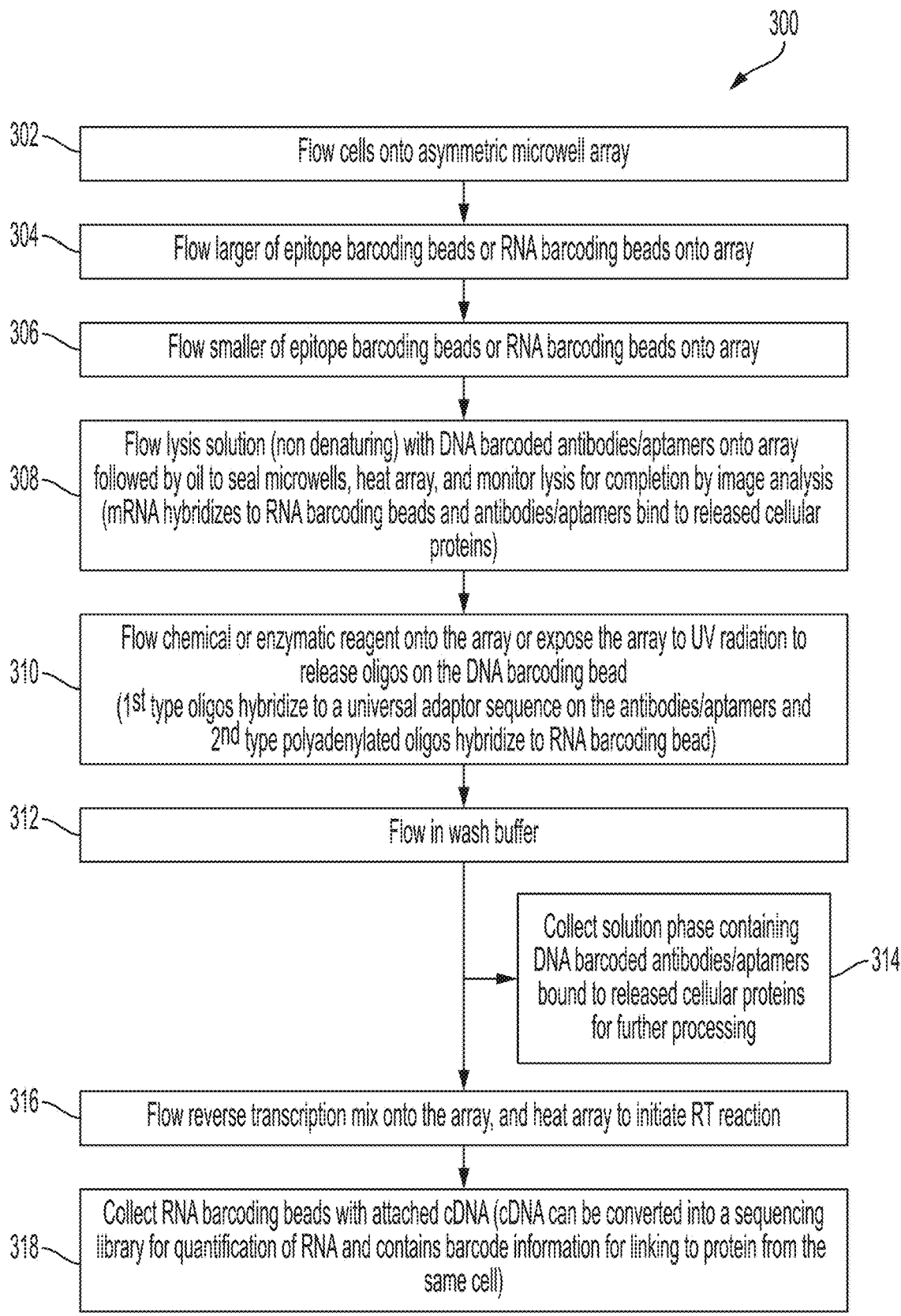
FIG. 26 is a flow diagram of a method for large-scale sample preparation of a cDNA sequencing library and generation of a solution phase of DNA barcoded antibodies/aptamers bound to released intra- and extracellular proteins from the same single cell.

FIG. 26 is a flow diagram of a method 300 for large-scale sample preparation of a cDNA sequencing library and generation of a solution phase of DNA barcoded antibodies/aptamers bound to released intra- and extracellular proteins from the same single cell.

The method 300 includes flowing cells onto the asymmetric microwell array of a system, such as the system illustrated in FIG. 11 (302). Cells are flowed onto the array by limiting dilution to maximize the number of single cells in the microwells. The method 300 includes flowing the larger of epitope barcoding beads or RNA barcoding beads onto the array (304). The RNA barcoding beads are the same as those described herein previously and may be RNA barcoding SCOPE-seq beads that comprise a cell identifying optical barcode sequence comprising a unique combination of nucleotide sequences that can be read out by hybridization to labeled complementary probes. The epitope-barcoding beads are conjugated to two different species of oligonucleotides: (1) a PCR adapter, a cell-identifying barcode ('epitope cell barcode'), optionally a UMI, and an adapter sequence ('hybridization sequence') that is complementary to a universal adapter sequence on all DNA-barcoded antibodies or aptamers (here the DNA barcode identifies the antibody or aptamer) and (2) a PCR adapter, a cell-identifying barcode ('epitope cell barcode'), optionally a UMI, and a poly(A) (see FIG. 20). The latter polyadenylated barcoded oligonucleotides may be a small percentage of the barcoded adapter oligonucleotides.

The method 300 includes flowing the smaller of epitope barcoding beads or RNA barcoding beads onto the array (306). The method 300 includes flowing a lysis buffer (non-denaturing) with DNA barcoded antibodies/aptamers onto the array followed by flowing oil to seal the microwells, heating the array, and performing image analysis to monitor lysis for completion within the microwells (308). In this step mRNA hybridizes to RNA barcoding beads and antibodies/aptamers bind to released cellular proteins. The method 300 includes flowing a chemical or enzymatic reagent onto the array or exposing the array to UV radiation to release the oligonucleotides on the DNA barcoding bead (310). In this step, the first type of oligonucleotides hybridize to a universal adaptor sequence on the antibodies/aptamers and the second type of polyadenylated oligonucleotides hybridize to the RNA barcoding bead.

The method 300 includes flowing in a wash buffer (312) and collecting the solution phase containing DNA barcoded antibodies/aptamers bound to released cellular proteins (314). The collected solution can be further processed for isolation of antibody-protein or aptamer-protein complexes as described herein above.

The method 300 includes flowing reverse transcription mix onto the microwell array and heating the array to initiate the RT reaction (316).

In the method 300, the RNA barcoding beads with attached cDNA are collected from the microwell array (318).

The cDNA attached to the RNA coding beads can be converted into a sequencing library for quantification of RNA and contains barcode information for linking to proteins from the same cell.

Figure 27:
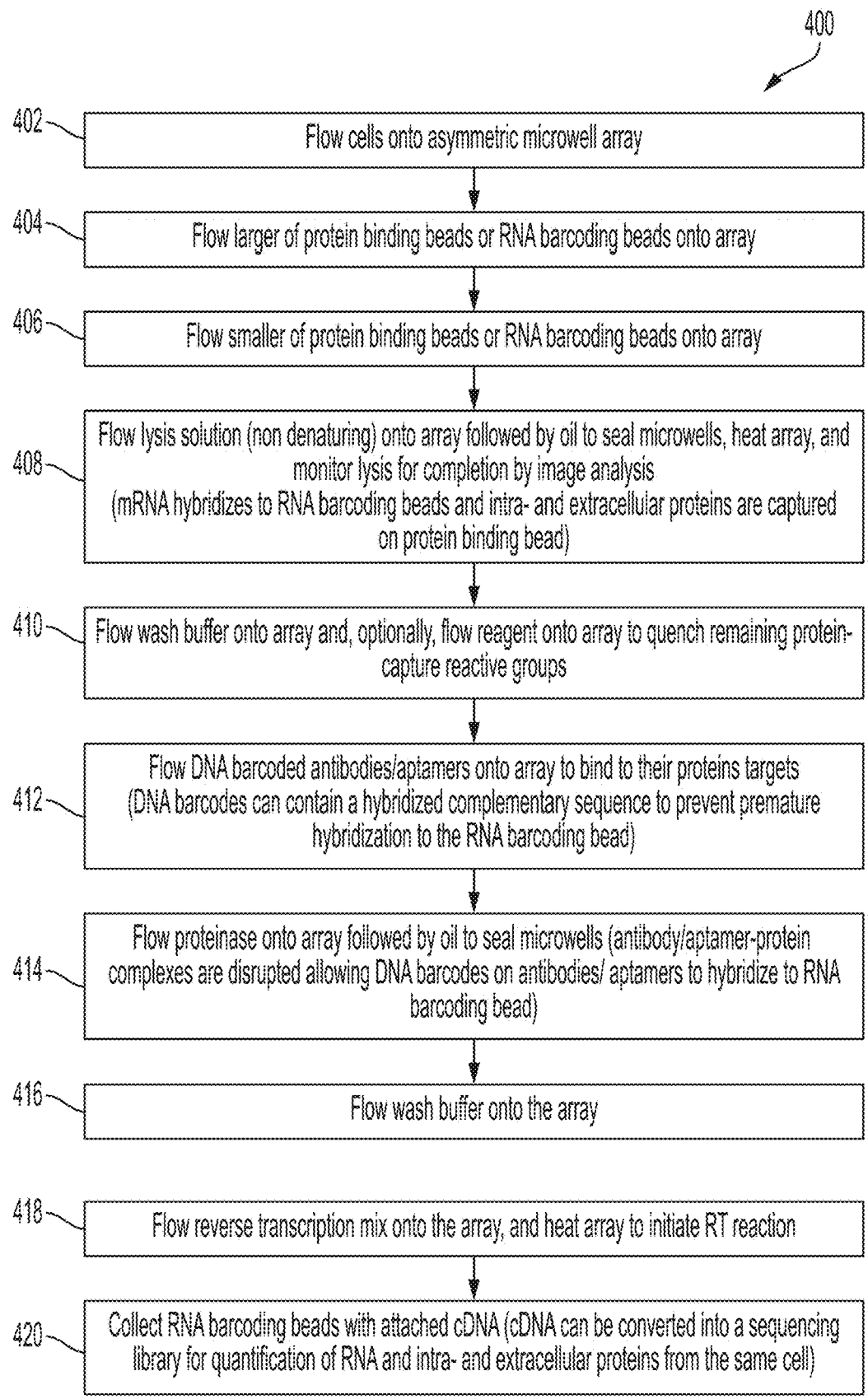
FIG. 27 is a flow diagram of a method for large-scale sample preparation of a cDNA sequencing library for quantification of RNA and intra- and extracellular proteins from the same single cell where protein is captured onto a bead functionalized for non-specific protein capture.

FIG. 27 is a flow diagram of a method 400 for large-scale sample preparation of a cDNA sequencing library for quantification of RNA and intra- and extracellular proteins from the same single cell where protein is captured onto a bead functionalized for non-specific or specific protein capture.

The method 400 includes flowing cells onto the asymmetric microwell array of a system, such as the system illustrated in FIG. 11 (402). Cells are flowed onto the array by limiting dilution to maximize the number of single cells in the microwells. The method 400 includes flowing the larger of protein binding beads or RNA barcoding beads onto the array (404). In one embodiment, the RNA barcoding beads are the same as those described herein previously and may be RNA barcoding SCOPE-seq beads that comprise a cell identifying optical barcode sequence comprising a unique combination of nucleotide sequences that can be read out by hybridization to labeled complementary probes.

In one embodiment, the RNA barcoding beads are the same as those described herein previously, except that they also include a subset of oligonucleotides that are terminated with a second adapter sequence in place of the oligo(dT) sequence. This adapter sequence can specifically capture DNA barcodes attached to antibodies/aptamers that are added to bind to cellular proteins. In this case, the DNA barcodes on the antibodies/aptamers comprise a sequence complementary to this second adapter sequence. This subset of oligonucleotides can comprise less than 10%, less than 5%, or less than 1% of the total barcoded oligonucleotides.

The protein binding beads can be non-specific or specific protein binding beads. The non-specific protein binding beads have a non-specific protein capture surface for covalent or non-covalent protein capture, including amine-reactive (e.g. aldehyde, NHS), thiol-reactive, or hydrophobic surfaces. The specific protein binding beads can be coated in aptamers, antibodies, proteins, or protein-binding small molecules can also be used to capture specific proteins or specific sets of proteins.

The beads of the present disclosure, including the RNA barcoding beads, the DNA barcoding beads, the epitope barcoding beads, and the protein binding beads, can be comprised of polymers and other materials including, but not limited to, polystyrene (PS), polycaprolactone (PCL), polyisoprene (PIP), poly(lactic acid), polyethylene, polypropylene, polyacrylonitrile, polyimide, polyamide, polyacrylamide, latex, silica, or agarose, and/or mixtures and/or co-polymers thereof.

The method 400 includes flowing the smaller of the protein binding beads or RNA barcoding beads onto the array (406).

The method 400 includes flowing a lysis buffer (non-denaturing) onto the array followed by flowing oil to seal the microwells, heating the array, and performing image analysis to monitor lysis for completion within the microwells (408). In this step mRNA hybridizes to RNA barcoding beads and intra- and extracellular proteins are captured onto the protein binding bead. The method 400 includes flowing in a wash buffer and, optionally, flowing a reagent onto the array to quench remaining protein-capture reactive groups (410).

The method 400 includes flowing DNA barcoded antibodies/aptamers onto the array to bind to their protein targets. The DNA barcode oligonucleotides attached the antibodies/aptamers can contain a hybridized complementary sequence to prevent premature hybridization to the RNA barcoding bead (412). In one embodiment of this step, the DNA barcodes conjugated to antibodies/aptamers are terminated with poly(A) and the poly(A) tail is hybridized to an oligo(dT) sequence to prevent premature hybridization of the DNA barcodes to the RNA barcoding bead. In another embodiment, as described above, the RNA barcoding beads comprise a subset of oligonucleotides terminated with the second adapter sequence that can specifically capture the DNA barcodes on the antibodies/aptamers. In this case, the DNA barcodes conjugated to the antibodies/aptamers can have a complementary sequence hybridized to the second adaptor sequence to prevent premature hybridization to the RNA barcoding bead. Optionally, the method 400 includes flowing a nuclease onto the array or heating the array to remove oligo(dT) (or another protective sequence) hybridized to the oligonucleotides conjugated to the antibodies/aptamers.

The method 400 includes flowing a protease onto the array followed by oil to seal the microwells (414). In this step antibody/aptamer-protein complexes are disrupted allowing the DNA barcodes on the antibodies/aptamers to hybridize to the oligonucleotides on the RNA barcoding beads. The method 400 can include flowing in a wash buffer (416). The method 400 includes flowing reverse transcription mix onto the microwell array and heating the array to initiate the RT reaction (418).

In the method 400, the RNA barcoding beads with attached cDNA are collected from the microwell array (420). The cDNA attached to the RNA barcoding beads can be converted into a sequencing library for quantification of RNA and intra- and extracellular proteins from the same cell.

Figure 28:
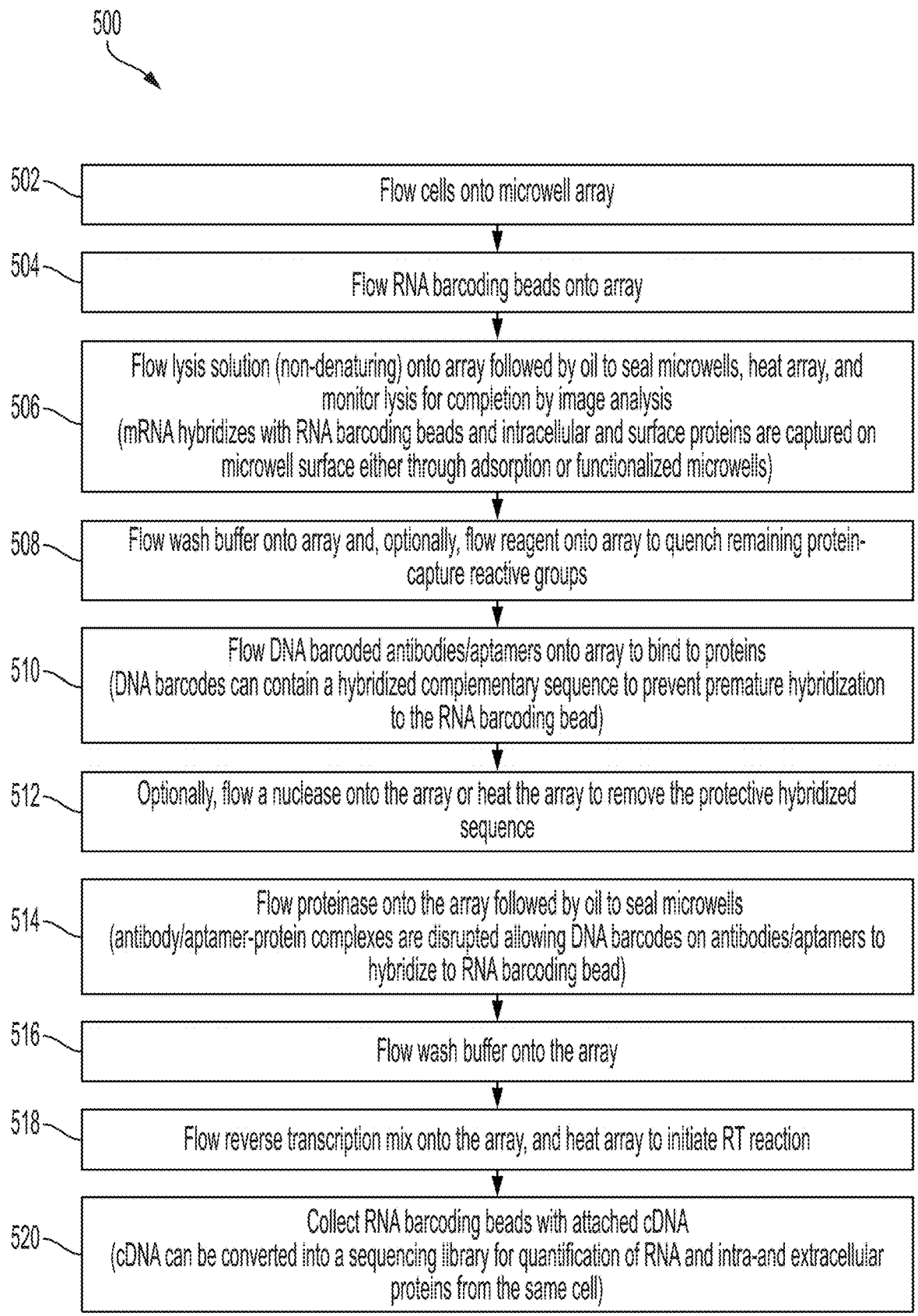
FIG. 28 is a flow diagram of a method for large-scale sample preparation of a cDNA sequencing library for quantification of RNA and intra- and extracellular proteins from the same single cell where protein is captured non-specifically onto the surface of the microwell.

FIG. 28 is a flow diagram of a method 500 for large-scale sample preparation of a cDNA sequencing library for quantification of RNA and intra- and extracellular proteins from the same single cell where protein is captured non-specifically onto the surface of the microwell.

The method 500 includes flowing cells onto a microwell array of a system, such as the system illustrated in FIG. 11 (502). In this case, only a single bead is utilized and, thus, the microwell array does not have to be asymmetric. The microwell array device can be fabricated, for example, from PDMS that was not treated with chemicals, surface coatings, or oxygen plasma subsequent to curing. As a result, the surface of the microwells is highly hydrophobic, thus facilitating non-specific adsorption of protein. In another example, the microwell surface can be functionalized for non-specific protein capture. In another example, the microwell surface can be functionalized with aptamers, antibodies, proteins, or protein-binding small molecules to capture specific proteins or specific sets of proteins.

Cells are flowed onto the array by limiting dilution to maximize the number of single cells in the microwells. The method 500 includes flowing RNA barcoding beads onto the array (504).

The RNA barcoding beads are the same as those described herein previously and may be RNA barcoding SCOPE-seq beads that comprise a cell identifying optical barcode sequence comprising a unique combination of nucleotide sequences that can be read out by hybridization to labeled complementary probes.

In one embodiment, the RNA barcoding beads are the same as those described herein previously, except that they also include a subset of oligonucleotides that are terminated with a second adapter sequence in place of the oligo(dT) sequence. This adapter sequence can specifically capture DNA barcodes attached to antibodies/aptamers that are added to bind to cellular proteins. In this case, the DNA barcodes on the antibodies/aptamers comprise a sequence complementary to this second adapter sequence.

The method 500 includes flowing a lysis buffer (non-denaturing) onto the array followed by flowing oil to seal the microwells, heating the array, and performing image analysis to monitor lysis for completion within the microwells (506). In this step mRNA hybridizes to RNA barcoding beads and intra- and extracellular proteins are non-specifically captured on the microwell surface either through adsorption or functionalized microwells. The method 500 includes flowing in a wash buffer and optionally flowing a reagent onto the array to quench remaining protein-capture reactive groups (508).

The method 500 includes flowing DNA barcoded antibodies/aptamers onto the array to bind to proteins (510). In on embodiment of this step, the DNA barcodes conjugated to antibodies/aptamers are terminated with poly(A) and the poly(A) tail is hybridized to an oligo(dT) sequence to prevent premature hybridization of the DNA barcodes to the RNA barcoding bead. In another embodiment, as described above, the RNA barcoding beads comprise a subset of oligonucleotides terminated with the second adapter sequence that can specifically capture the DNA barcodes on the antibodies/aptamers. In this case, the DNA barcodes conjugated to the antibodies/aptamers can have a complementary sequence hybridized to the second adaptor sequence to prevent premature hybridization to the RNA barcoding bead. Optionally, the method 500 includes flowing a nuclease onto the array or heating the array to remove oligo(dT) (or another protective sequence) hybridized to the oligonucleotides conjugated to the antibodies/aptamers (512).

The method 500 includes flowing a protease onto the array followed by oil to seal the microwells (514). In this step antibody/aptamer-protein complexes are disrupted allowing DNA barcodes on the antibodies/aptamers to hybridize to the oligonucleotides on the RNA barcoding beads. The method 500 can include flowing in a wash buffer (516). The method 500 includes flowing reverse transcription mix onto the microwell array and heating the array to initiate the RT reaction (518).

In the method 500, the RNA barcoding beads with attached cDNA are collected from the microwell array (520). The cDNA attached to the RNA coding beads can be converted into a sequencing library for quantification of RNA and intra- and extracellular proteins from the same cell.

In one embodiment, the method 200 can be merged with each of the methods 300,400, and 500 to enable association of cell phenotypic data with scRNA-seq and intra- and extracellular protein data. For example, the method 200 includes flowing cells onto the symmetric or asymmetric microwell array of a system, such as the system illustrated in FIG. 11 (202). Cells are flowed onto the array by limiting dilution to maximize the number of single cells in the microwells. The method 200 includes imaging the cells one or more times to obtain, for each position in the microwell array, one or more first images of the phenotype of the cell at the position (204). Each image is associated with a corresponding position of the microwell in the array.

In one embodiment, the method 200 next includes performing the steps of one of the methods 300,400, or 500 described above, up to and including the reverse transcription reaction (206) (specifically, steps 304-316 of method 300, steps 404-418 of method 400, or steps 504-518 of method 500). In the method 200, the RNA barcoding beads used in step 304/306 of method 300, step 404/406 of method 400, or step 504 of method 500 are SCOPE-seq beads and, in particular, comprise a cell-identifying optical barcode sequence comprising a unique combination of nucleotide sequences that can be read out by hybridization to labeled complementary probes.

The method 200 includes flowing a first of N pools of optical hybridization probes onto the microwell array and hybridizing the probes to the beads located therein having a complementary nucleotide sequence in the cell identifying optical barcode sequence attached thereto (208). The method 200 includes obtaining, for each position of the plurality of positions, one or more second images to quantify a fluorescent intensity at the position, each of the one or more second images used to create a binary code depicting a match or a lack of a match between at least one of the optical hybridization probes and the cell identifying optical barcodes (210). A match can be identified where a sufficient intensity of light is identified in an image of a microwell containing a RNA barcoding bead after flowing and hybridizing the optical hybridization probe. The method 200 includes removing the optical hybridization probes (212).

The method 200 includes repeating the flowing and hybridizing the probes (208), obtaining second image(s) in response to the probes (210), and removing the probes (212) steps for each of the N pools of probes.

The method 200 includes determining, by mapping the binary code for each of the N pools of probes to the cell identifying barcode sequence, for each position of the plurality of positions, the cell identifying optical barcode for the position and storing a data association between the cell identifying optical barcode for the position and the first image at the position (214). For example, determining the cell identifying optical barcode can comprise a digital value formatted such that each bit position in the value corresponds to a match or a lack of a match between an optical hybridization probe or a pool of optical hybridization probes and a cell identifying optical barcode.

The method 200 includes collecting the RNA barcoding beads with the attached cDNA (216), which is the same step as step 318 of method 300, step 420 of method 400, and step 520 of method 500.

The method 200 includes storing, for each position of the plurality of positions, after receiving nucleic acid sequencing data for each cell identifying optical barcode, a data association between the nucleic acid sequencing data, the cell identifying optical barcode, and the first image associated with the cell identifying optical barcode (218). In this manner, the methods 300, 400, and 500 are merged with method 200 to provide the additional advantage of associating cell phenotypic data with scRNA-seq and intra- and extracellular protein data from the same single cell.

This disclosure provides an automated, scalable platform for simultaneous, genome-wide analysis of RNA and DNA from thousands of individual cells.

An automated system is provided for simultaneous analysis of RNA and DNA from a plurality of single cells, comprising:

an instrument assembly comprising a fluidics subsystem, a thermal subsystem, and an imaging subsystem, wherein the imaging subsystem comprises a stage configured for holding a microwell array;

a control subsystem coupled to the instrument assembly, the control subsystem comprising at least one processor and memory, the control subsystem configured for performing operations comprising:

flowing, using the fluidics subsystem, a plurality of cells onto the microwell array, wherein a subset of the cells reside as single cells in the microwells;

optionally, obtaining, for each position of a plurality of positions in the microwell array, one or more first images of the cell at the position using the imaging subsystem;

flowing onto the microwell array, using the fluidics subsystem, a plurality of the larger sized of DNA barcoding beads or RNA barcoding beads, wherein the larger sized beads and the microwells have relative size permitting only one larger sized bead to fit in the wider region of each microwell, wherein a subset of the beads reside as a single cell-bead pair in the microwells, wherein the RNA barcoding beads, optionally, comprise a cell identifying optical barcode sequence comprising a unique combination of nucleotide sequences that can be read out by hybridization to labeled complementary probes;

flowing, using the fluidics subsystem, a plurality of the smaller sized of the DNA barcoding beads or the RNA barcoding beads onto the array, wherein the smaller sized beads and the microwells have relative size permitting only one smaller sized bead to fit in the narrower region of each microwell, wherein a subset of the beads reside as a single cell with one each of a RNA- and a DNA-barcoding bead in the microwells;

flowing onto the microwell array, using the fluidics subsystem, a cell lysis buffer and one or more reagents for washing and transposition of cellular gDNA;

optionally, using the imaging subsystem, obtaining images for each position of the plurality of positions to monitor completion of cell lysis;

flowing, using the fluidics subsystem, one or more reagents to release oligonucleotides on the DNA barcoding bead onto the microwell array or, using the imaging subsystem, exposing the microwell array to UV light to release oligonucleotides on the DNA barcoding bead;

flowing, using the fluidics subsystem, a neutralization buffer onto the microwell array to release transposed, barcoded gDNA fragments from the transposases, whereby a pooled genomic sequencing library can be generated from the gDNA fragments;

optionally, flowing, using the fluidics subsystem, a first of N pools of a plurality of optical hybridization probes onto the microwell array and hybridizing the probes to the beads located therein having a complementary nucleotide sequence in the cell identifying optical barcode sequence;

optionally, obtaining, for each position of the plurality of positions, one or more second images to quantify a fluorescent intensity at the position using the imaging subsystem, each of the one or more second images used to create a binary code depicting a match or a lack of a match between at least one of the optical hybridization probes and the cell identifying optical barcodes;

optionally, repeating the flowing and hybridizing step and obtaining of the one or more second images step for each of the N pools of probes;

optionally, determining, by mapping the binary code for each of the N pools of probes to the cell identifying barcode sequence, for each position of the plurality of positions, the cell identifying optical barcode for the position and storing a data association between the cell identifying optical barcode for the position and the first image at the position; and flowing, using the fluidics substation, one or more reverse transcription reagents onto the array to reverse transcribe the mRNA to cDNA, whereby the cDNA attached to the RNA coding beads can be converted into a sequencing library for quantification of RNA and contains barcode information for linking to gDNA from the same cell and, after receiving sequencing data from the sequencing library for each cell identifying optical barcode, a data association can be made between the sequencing data, the cell identifying optical barcode, and the first image associated with the cell identifying optical barcode.

An automated system is provided for simultaneous analysis of RNA and protein from a plurality of single cells, comprising:

an instrument assembly comprising a fluidics subsystem, a thermal subsystem, and an imaging subsystem, wherein the imaging subsystem comprises a stage configured for holding a microwell array;

a control subsystem coupled to the instrument assembly, the control subsystem comprising at least one processor and memory, the control subsystem configured for performing operations comprising:

flowing, using the fluidics subsystem, a plurality of cells onto the microwell array, wherein a subset of the cells reside as single cells in the microwells;

optionally, obtaining, for each position of a plurality of positions in the microwell array, one or more first images of the cell at the position using the imaging subsystem;

flowing onto the microwell array, using the fluidics subsystem, a plurality of the larger sized of epitope barcoding beads or RNA barcoding beads, wherein the larger sized beads and the microwells have relative size permitting only one larger sized bead to fit in the wider region of each microwell, wherein a subset of the beads reside as a single cell-bead pair in the microwells, wherein the RNA barcoding beads, optionally, comprise a cell identifying optical barcode sequence comprising a unique combination of nucleotide sequences that can be read out by hybridization to labeled complementary probes;

flowing, using the fluidics subsystem, a plurality of the smaller sized of the epitope barcoding beads or the RNA barcoding beads onto the array, wherein the smaller sized beads and the microwells have relative size permitting only one smaller sized bead to fit in the narrower region of each microwell, wherein a subset of the beads reside as a single cell with one each of a epitope- and a RNA-barcoding bead in the microwells;

flowing onto the microwell array, using the fluidics subsystem, a cell lysis buffer that includes DNA barcoded antibodies/aptamers;

optionally, using the imaging subsystem, obtaining images for each position of the plurality of positions to monitor completion of cell lysis;

flowing onto the microwell array, using the fluidics subsystem, one or more reagents to release oligonucleotides on the DNA barcoding bead or, using the imaging subsystem, exposing the microwell array to UV light to release oligonucleotides on the DNA barcoding bead;

optionally, flowing, using the fluidics subsystem, a first of N pools of a plurality of optical hybridization probes onto the microwell array and hybridizing the probes to the beads located therein having a complementary nucleotide sequence in the cell identifying optical barcode sequence;

optionally, obtaining, for each position of the plurality of positions, one or more second images to quantify a fluorescent intensity at the position using the imaging subsystem, each of the one or more second images used to create a binary code depicting a match or a lack of a match between at least one of the optical hybridization probes and the cell identifying optical barcodes;

optionally, repeating the flowing and hybridizing step and obtaining of the one or more second images step for each of the N pools of probes;

optionally, determining, by mapping the binary code for each of the N pools of probes to the cell identifying barcode sequence, for each position of the plurality of positions, the cell identifying optical barcode for the position and storing a data association between the cell identifying optical barcode for the position and the first image at the position; and flowing, using the fluidics substation, one or more reverse transcription reagents onto the array to reverse transcribe the mRNA to cDNA, whereby the cDNA attached to the RNA coding beads can be converted into a sequencing library for quantification of RNA and contains barcode information for linking to protein from the same cell and, after receiving sequencing data from the sequencing library for each cell identifying optical barcode, a data association can be made between the sequencing data, the cell identifying optical barcode, and the first image associated with the cell identifying optical barcode.

An automated system is provided for simultaneous analysis of RNA and protein from a plurality of single cells, comprising:

an instrument assembly comprising a fluidics subsystem, a thermal subsystem, and an imaging subsystem, wherein the imaging subsystem comprises a stage configured for holding a microwell array;

a control subsystem coupled to the instrument assembly, the control subsystem comprising at least one processor and memory, the control subsystem configured for performing operations comprising:

flowing, using the fluidics subsystem, a plurality of cells onto the microwell array, wherein a subset of the cells reside as single cells in the microwells;

optionally, obtaining, for each position of a plurality of positions in the microwell array, one or more first images of the cell at the position using the imaging subsystem;

flowing onto the microwell array, using the fluidics subsystem, a plurality of the larger sized of protein binding beads or RNA barcoding beads, wherein the larger sized beads and the microwells have relative size permitting only one larger sized bead to fit in the wider region of each microwell, wherein a subset of the beads reside as a single cell-bead pair in the microwells, wherein the RNA barcoding beads, optionally, comprise a cell identifying optical barcode sequence comprising a unique combination of nucleotide sequences that can be read out by hybridization to labeled complementary probes;

flowing, using the fluidics subsystem, a plurality of the smaller sized of the protein binding beads or the RNA barcoding beads onto the array, wherein the smaller sized beads and the microwells have relative size permitting only one smaller sized bead to fit in the narrower region of each microwell, wherein a subset of the beads reside as a single cell with one each of a protein binding- and a RNA barcoding bead in the microwells;

flowing onto the microwell array, using the fluidics subsystem, a cell lysis buffer;

optionally, using the imaging subsystem, obtaining images for each position of the plurality of positions to monitor completion of cell lysis;

optionally, flowing onto the microwell array, using the fluidics subsystem, one or more wash buffers of reagents to quench remaining reactive groups on the protein binding beads;

flowing onto the microwell array, using the fluidics subsystem, one a plurality of DNA barcoded antibodies/aptamers;

flowing onto the microwell array, using the fluidics subsystem, one or more protease reagents to disrupt the antibody/aptamer-protein complexes and to allow DNA barcodes on antibodies/aptamers to hybridize to the RNA barcoding bead;

optionally, flowing, using the fluidics subsystem, a first of N pools of a plurality of optical hybridization probes onto the microwell array and hybridizing the probes to the beads located therein having a complementary nucleotide sequence in the cell identifying optical barcode sequence;

optionally, obtaining, for each position of the plurality of positions, one or more second images to quantify a fluorescent intensity at the position using the imaging subsystem, each of the one or more second images used to create a binary code depicting a match or a lack of a match between at least one of the optical hybridization probes and the cell identifying optical barcodes;

optionally, repeating the flowing and hybridizing step and obtaining of the one or more second images step for each of the N pools of probes;

optionally, determining, by mapping the binary code for each of the N pools of probes to the cell identifying barcode sequence, for each position of the plurality of positions, the cell identifying optical barcode for the position and storing a data association between the cell identifying optical barcode for the position and the first image at the position; and flowing, using the fluidics substation, one or more reverse transcription reagents onto the array to reverse transcribe the mRNA to cDNA, whereby the cDNA attached to the RNA coding beads can be converted into a sequencing library for quantification of RNA and contains barcode information for linking to protein from the same cell and, after receiving sequencing data from the sequencing library for each cell identifying optical barcode, a data association can be made between the sequencing data, the cell identifying optical barcode, and the first image associated with the cell identifying optical barcode.

An automated system is provided for simultaneous analysis of RNA and protein from a plurality of single cells, comprising:

an instrument assembly comprising a fluidics subsystem, a thermal subsystem, and an imaging subsystem, wherein the imaging subsystem comprises a stage configured for holding a microwell array;

a control subsystem coupled to the instrument assembly, the control subsystem comprising at least one processor and memory, the control subsystem configured for performing operations comprising:

flowing, using the fluidics subsystem, a plurality of cells onto the microwell array, wherein a subset of the cells reside as single cells in the microwells;

optionally, obtaining, for each position of a plurality of positions in the microwell array, one or more first images of the cell at the position using the imaging subsystem;

flowing onto the microwell array, using the fluidics subsystem, a plurality of RNA barcoding beads, wherein a subset of the beads reside as a single cell-bead pair in the microwells, wherein the RNA barcoding beads, optionally, comprise a cell identifying optical barcode sequence comprising a unique combination of nucleotide sequences that can be read out by hybridization to labeled complementary probes;

flowing onto the microwell array, using the fluidics subsystem, a cell lysis buffer to release cellular mRNA and intra- and extracellular proteins, whereby mRNA hybridizes to the RNA barcoding bead and proteins are captured on a surface of the microwell;

optionally, using the imaging subsystem, obtaining images for each position of the plurality of positions to monitor completion of cell lysis;

optionally, flowing onto the microwell array, using the fluidics subsystem, one or more wash buffers or reagents to quench remaining reactive groups on the microwell surface;

flowing onto the microwell array, using the fluidics subsystem, a plurality of DNA barcoded antibodies/aptamers;

flowing onto the microwell array, using the fluidics subsystem, one or more protease reagents to disrupt the antibody/aptamer-protein complexes and to allow DNA barcodes on antibodies/aptamers to hybridize to the RNA barcoding bead;

optionally, flowing, using the fluidics subsystem, a first of N pools of a plurality of optical hybridization probes onto the microwell array and hybridizing the probes to the beads located therein having a complementary nucleotide sequence in the cell identifying optical barcode sequence;

optionally, obtaining, for each position of the plurality of positions, one or more second images to quantify a fluorescent intensity at the position using the imaging subsystem, each of the one or more second images used to create a binary code depicting a match or a lack of a match between at least one of the optical hybridization probes and the cell identifying optical barcodes;

optionally, repeating the flowing and hybridizing step and obtaining of the one or more second images step for each of the N pools of probes;

optionally, determining, by mapping the binary code for each of the N pools of probes to the cell identifying barcode sequence, for each position of the plurality of positions, the cell identifying optical barcode for the position and storing a data association between the cell identifying optical barcode for the position and the first image at the position; and flowing, using the fluidics substation, one or more reverse transcription reagents onto the array to reverse transcribe the mRNA to cDNA, whereby the cDNA attached to the RNA coding beads can be converted into a sequencing library for quantification of RNA and contains barcode information for linking to protein from the same cell and, after receiving sequencing data from the sequencing library for each cell identifying optical barcode, a data association can be made between the sequencing data, the cell identifying optical barcode, and the first image associated with the cell identifying optical barcode.

In another aspect, the disclosure provides for a kit comprising, consisting essentially of, or consisting of any of the beads and/or regents disclosed herein, alone or in combination. In particular, such a kit may include a collection of the DNA-barcoding beads described herein, optionally also including RNA barcoding beads. In another example, such a kit may include a collection of the epitope binding beads described herein, optionally also including RNA barcoding beads. In one embodiment, such a kit may include a collection of the protein binding beads described herein, optionally also including RNA barcoding beads. The kit may include the asymmetric microwell array devices described herein. The kit may also include instructions describing any of the methodologies described herein.

The following examples serve to illustrate certain aspects of the disclosure and are not intended to limit the disclosure. The contents of all references, pending patent applications and published patents, cited throughout this application are hereby expressly incorporated by reference.

EXAMPLES

Example 1: In Vitro Transposition with Barcoded Tn5 Transposases

A recently reported protocol for recombinant over-expression and purification[27] was used to produce Tn5 transposase in-house and generate barcoded Tn5 dimers. These barcoded Tn5 transposases were used for PCR and WGA of individual diploid cells (WI-38 human fibroblasts).

FIG. 3A shows a schematic of intro transposition with barcoded Tn5 transposases. FIGS. 3B-3E show physical coverage of 1 MB bins across the genome for four individual, diploid WI-38 cells produced by in vitro transposition. Even at 0.1× coverage, the profiles exhibit low noise and in one cell C), a structural alteration was observed. FIGS. 3B-3E show that relatively uniform coverage can be achieved even at low depth (0.1×) without applying any computational correction for GC bias, Tn5 sequence preference, etc.

In addition, FIGS. 3F-3G show that the results for this cell line compare favorably to MALBAC scWGA of the same cell type. FIGS. 3F-3G show the same as FIGS. 3B-3E but for two individual WI-38 cell genomes amplified by MALBAC WGA using the commercial MALBAC kit from Yikon Genomics. At the same sequencing depth, the coverage uniformity is visibly worse than in vitro transposition. The breadth achieved (~35% at 2× coverage) is significantly better than the typical performance of DOP-PCR[21], but less impressive than the best reports of, for example, MALBAC (~90%)[19].

However, many of these previous studies involve cancer cells with significant polyploidy (and therefore higher input). In addition, MALBAC performed similarly to tagmentation in our hands with these diploid cells in terms of overall breadth (~30-35%). Furthermore, rational improvements can be made such as the integration of in vitro transcription as in LIANTI[4,23]. For very large-scale CNV profiling applications, low-depth, low-breadth sequencing will likely be the preferred mode, whereas targeted enrichment of the barcoded amplicons will facilitate SNV detection.

Example 2: Retention of gDNA in Microwells after Unsealing and Washing

As shown in FIG. 5, gDNA from captured cells remains in the microwells for several minutes even after unsealing. This is consistent with the diffusion constant of gDNA, which precludes escape on this timescale. Cells were labeled with calcein AM (a fluorogenic esterase substrate that labels the cytoplasm) and SYTOX Orange (a fluorogenic intercalator that labels dsDNA). These cells were captured in the microwells, lysis buffer was introduced, and the microwells were rapidly sealed. Calcein AM filled the volume of the sealed microwells containing cells and the SYTOX stained small gDNA particles. The device was unsealed and washed over the course of minutes. This resulted in removal of the calcein AM and essentially no loss of SYTOX-stained particles. FIG. 5 is a graph showing that microwells containing calcein AM-stained cell lysate and SYTOX-stained gDNA at time zero retained intact gDNA after 2 minutes of washing, while lysate was removed (traces are averaged over 10 microwells).

The retention of gDNA within the device after washing to remove cell lysate was demonstrated in another experiment. Specifically, a microwell device was used to demonstrate feasibility of this retention scheme (see FIG. 10). Single cells stained with a DNA intercalating dye (SYTOX) and a cell viability dye (calcein AM) were introduced into the microwells of a device. After lysing the cells, the cell lysate (indicated by calcein AM) was washed away while retaining the gDNA (indicated by SYTOX). RNA, despite its significantly lower molecular weight, was also retained in the well throughout fluidic exchanges, because the RNA remained hybridized to the RNA-barcoding bead in the well. FIG. 10A (top) shows live cells in wells with gDNA and cells shown, and (bottom) the tetramethylrhodamine isothiocyanate (TRITC) channel showing gDNA. FIG. 10B (top) shows the same region as FIG. 10A after cell lysis, and (bottom) the TRITC channel only showing gDNA. FIG. 10C (top) shows the same region as FIGS. 10A and 10B wherein the cell lysate has been partially removed by a 10 second wash, and (bottom) the gDNA remains in the wells after the wash. FIG. 10D is a plot of wells with gDNA remaining (upper line in red) and cell lysate remaining (lower line in green) after a series of washes.

Example 3: Demonstration of Efficient Resealing of Microwells in the Array Device Resealing of wells was examined by fluorescent recovery after photobleaching and the results are shown in FIGS. 12A-12F. The microwell array device was filled with wash buffer (20 mM Tris-HCl, 50 mM NaCl, 0.1% Tween-20) and sealed with oil (Flurinert FC-770). A solution of oligos (100 nM) tagged with Cy3 in tris buffered saline (TBS) was then injected at flow rate 110 uL/min. The device was imaged to confirm the removal of the oil and the presence of Cy3 oligos throughout the device Subsequently oil was injected in the chip again to seal the Cy3 oligos in the wells of the device. The device was imaged again to confirm the Cy3 signal was limited to the wells. A green laser (beam size ~260 μm) was focused on the device for 10 minutes, photobleaching the Cy3 dye in approximately eight wells. The photobleached wells and their surrounding wells were imaged every 5 minutes for 180 minutes starting from the moment immediately after photobleaching (t=0 min). The fluorescence intensity of the photobleached wells and the surrounding wells were measured to determine whether the wells that were not photobleached had a decrease in fluorescent intensity (and thus a loss of Cy3 oligos), and to determine whether the photobleached wells had an increase in fluorescent intensity (and thus the diffusion of Cy3 oligos from unbleached wells to the photobleached wells).

Figures 12A, 12B, 12C, 12D, 12E, 12F:
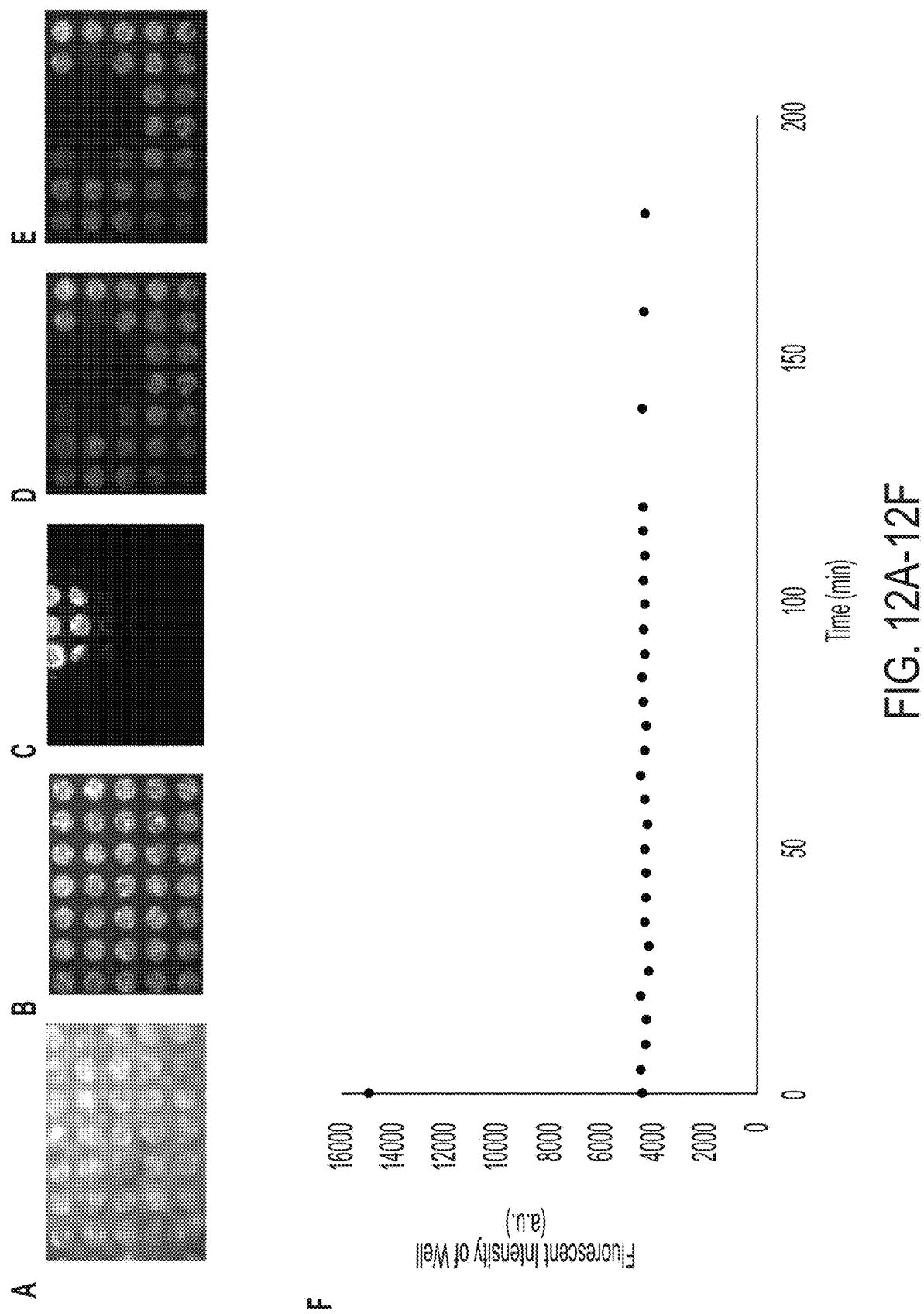
FIG. 12A is an image of fluorescent recovery after photobleaching (FRAP) assay to test well sealing in which sealed wells were unsealed with solution containing fluorescent oligos.
FIG. 12B is an image in which the wells were then resealed with oil.
FIG. 12C is an image in which a focused laser was used to photobleach some of the wells.
FIG. 12D is an image in which the photobleached wells were observed at the t=0 s time point to create a baseline.
FIG. 12E is an image in which the wells were imaged and the fluorescent intensity of the wells were measured over time.
FIG. 12F is a plot of the measured fluorescent intensity over the time course. The wells did not recover any fluorescent intensity indicating the wells remained sealed after the resealing oil.

FIG. 12A is an image of fluorescent recovery after photobleaching (FRAP) assay to test well sealing in which sealed wells were unsealed with solution containing fluorescent oligos. FIG. 12B is an image in which the wells were then resealed with oil. FIG. 12C is an image in which a focused laser was used to photobleach some of the wells. FIG. 12D is an image in which the photobleached wells were observed at the t=Os time point to create a baseline. FIG. 12E is an image in which the wells were imaged and the fluorescent intensity of the wells were measured over time. FIG. 12F is a plot of the measured fluorescent intensity over the time course. The wells did not recover any fluorescent intensity indicating the wells remained sealed after the resealing oil.

The results demonstrate the wells were photobleached by the laser and there was no observable recovery of fluorescence in the bleached wells during the 180-minute time course. Also, there was no observable decrease in fluorescent signal in the unbleached wells. Therefore, it can be concluded the wells remained sealed by oil and their contents are unable to interact with the contents of other wells, including wells in close proximity.

Example 4: Fabrication of an Asymmetric Microwell Array Device and Loading of Exactly One DNA Barcoding Bead and One RNA Barcoding Bead in the Microwells A dual-bead device was fabricated using standard soft lithography techniques (see FIGS. 13A-13B). The device features pear-shaped wells with a large diameter of approximately 36 µm and small diameters of approximately 12 µm. The large diameter region has a depth of 46.7 um while the small diameter region has a depth of 25 µm. There is a 25 µm gap between wells in each direction. FIG. 13A shows a fabricated dual-bead device having wells without beads present with dimensions indicated. First large beads (Dropseq Beads (these beads were used to simulate DNA barcoding beads), diameter: 30 µm) were loaded into the device with a pipette and were trapped in the large diameter region of the well. The device was then washed to remove excess beads, and then the smaller RNA barcoding bead was introduced (Bangs streptavidin polystyrene, diameter: 15 µm) and trapped by the smaller diameter region. Excess RNA barcoding smaller beads were removed by washing. Brightfield images were taken of the device and 78.5% of wells had exactly one large bead and one small bead. FIG. 13B shows a fabricated dual-bead device loaded with DNA barcoding bead and RNA barcoding bead. 78.5% of wells on the device had a single DNA barcoding bead and a single RNA barcoding bead.

Example 5: Demonstration of the Simultaneous, Genome-Wide Profiling of RNA and DNA from the Same Cell Cells (U87) stained with Calcine AM were loaded into a dual bead device using a pipette, washed with TBS. FIG. 14A is an image of wells of the dual-bead device where cells are stained with Calcein AM and images are taken with brightfield and GFP filters in which a cell suspension is introduced and the wells are washed leaving single cells in wells. The larger DropSeq bead (used in place of the DNA barcoding bead) was then introduced into the device, excess beads were removed with TBS washes. FIG. 14B is an image where the DNA sequencing beads are introduced. The smaller RNA barcoding bead was then introduced into the device and the device was washed with TBS again. FIG. 14C is an image after the RNA barcoding beads were introduced. Lysis buffer was then injected (345 nM Proteinase K in buffer TCL), and the device was imaged. FIG. 14D is an image after the cells were lysed in the wells and released RNA is captured by the RNA sequencing beads. Finally, tagmentation reagents (Nextera XT tagment DNA buffer and amplicon tagmentation mix) were injected and the device was imaged. FIG. 14E is an image after tagmentation solution was introduced and tagmentation proceeds.

It can be seen that the cell is introduced and trapped in the well. Then the beads are introduced and the wells have a single large bead and a single small bead. The lysis buffer lysed the cell causing the Calcein AM to fill the well, rather than being localized to the cytoplasm of the cell. Finally, the introduction of tagmentation reagents washed out the Calcein AM but the two beads remained in the wells.

Example 6: Demonstration of Photocleavage of Oligonucleotides from Beads

Figures 15A, 15B, 15C, 15D:
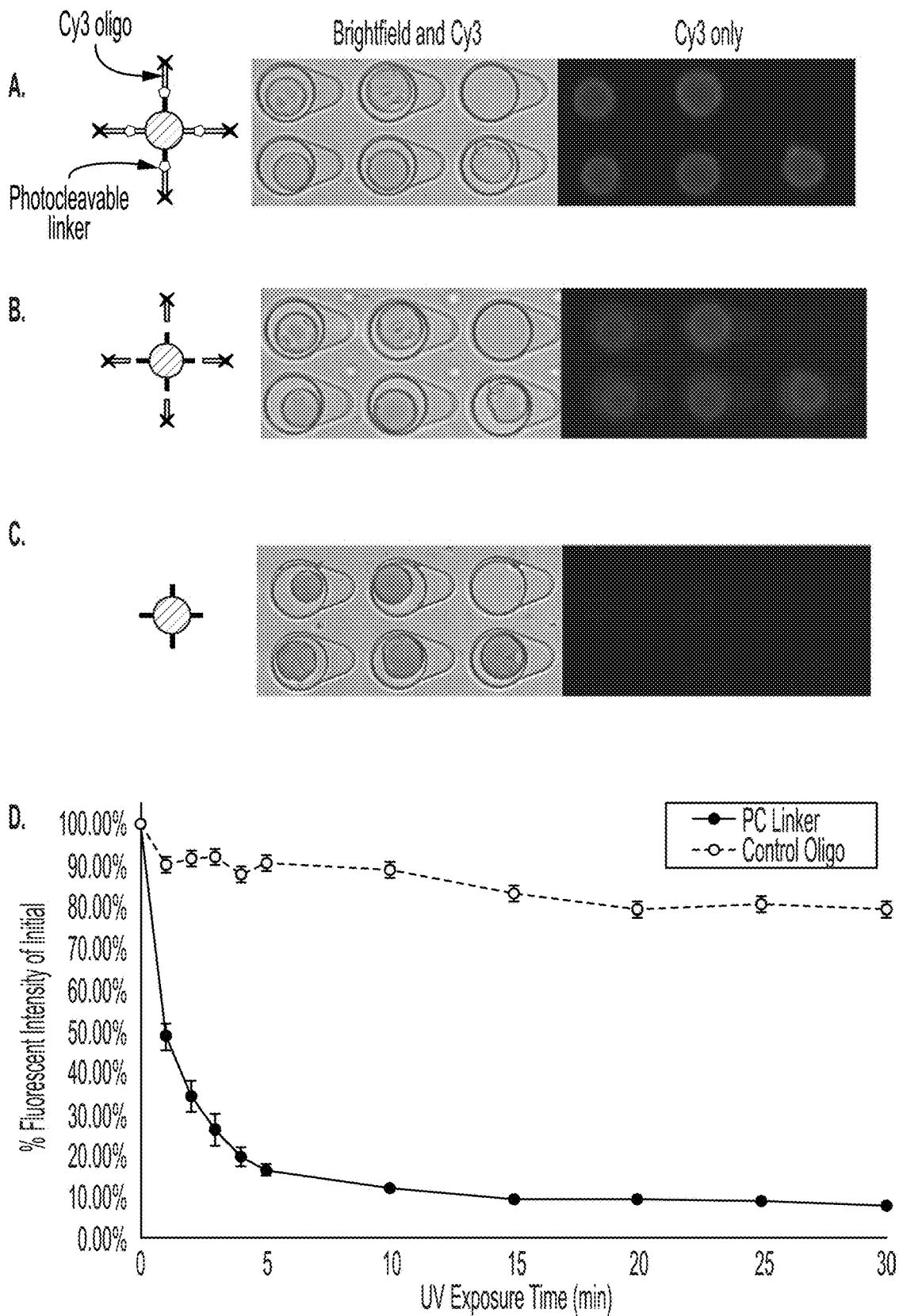
FIG. 15A shows a schematic of in-device photocleavage of oligos and images of beads with fluorescent oligos attached by photocleavable linker after having been introduced into the dual-bead device.
FIG. 15B shows the device is then exposed to ultraviolet light.
FIG. 15C shows wash buffer is then introduced which unseals the wells containing the photocleaved oligos and flushes away oligos not bound to bead surfaces.
FIG. 15D is a plot showing photocleavable oligonucleotide release characterization where beads with fluorescent oligonucleotides attached by photocleavable linker are introduced into the device and imaged, the beads are then exposed to UV light and washed, the washed surfaces are measured for fluorescent intensity, indicating the amount of oligonucleotides that were not released by photocleavage, and showing that more than 80% of oligonucleotides were released with 5 minutes of UV exposure. A control oligonucleotide was also used which featured the same fluorescent dye and was attached to the bead by biotin-streptavidin chemistry and did not contain a photocleavable element.

Oligonucleotides with a Cy3 tag and a photocleavable biotin group were incubated with streptavidin beads (Pierce Streptavidin agarose) and washed. The beads were introduced into a device which was then washed to remove excess beads. The device was then imaged under brightfield and Cy3 channels (FIG. 15A). The device was then placed under a UV lamp (365 nm) for 1 minute, washed to remove UV-released oligos, and imaged again (FIG. 15B). This process was repeated in 1-minute intervals for the first 5 minutes, and then in 5-minute intervals until the device had been exposed to UV light for a total of 30 minutes. FIG. 15C shows wash buffer unseals the wells containing the photocleaved oligos and flushes away oligos not bound to bead surfaces. This process was repeated using oligos with a Cy3 tag and a biotin group (without photocleavable linker). When the oligos with photocleavable linker are used, the Cy3 signal decreases rapidly (<20% intensity of the original fluorescent intensity) during the first 5 minutes, and then gradually declines for the remained of the experiment indicating the release and removal of oligos from the device (see FIG. 15D). On the contrary, when oligos without photocleavable linkers are used, the signal remains <80% of the starting fluorescent intensity (see FIG. 15D).

Example 7: On-Chip Tagmentation of gDNA

Libraries were prepared from on-chip tagmented gDNA (see FIGS. 16A-16C). Cells (U87), RNA barcoding beads, and DNA barcoding beads were introduced into the device. Lysis buffer (345 nM Proteinase K in buffer TCL) was introduced and the cells were lysed over a 130-minute process (20 min at 25° C., 20 minutes at 55° C., 90 min at 25° C.). Nextera tagmentation reagents (Nextera XT tagment DNA buffer and amplicon tagmentation mix) were then injected at 20 uL/min and the device was heated to 55° C. for 10 minutes. Neutralization buffer was then injected and the contents of the well were collected with ethanol. Sodium acetate (60 uL, 3 M) was added to the extracted solution which was then incubated overnight at −20° C. The effluent was removed and the precipitate was washed and resuspended in 10 uL of $H_2O$. The solution was then filtered through a 10 um membrane to remove beads and amplified by the polymerase chain reaction (PCR). The amplified product was then purified with Ampure XP beads following the standard protocol (16 uL of beads), had its size distribution measured with a Bioanalyzer (average fragment length 624 bp), and then sequenced on a MiSeq sequencer. FIG. 16A is a bioanalyzer trace of DNA library prepared by on-chip processes of the dual-bead device in which single cells were introduced into the device, lysed, and tagmented.

The resulting sequence data was aligned to the human genome with Burrows-Wheeler Aligner, filtered based on size and quality, and had duplicates removed. Plots of the fragment length and of the copy number variation (CNV) were created. An average filtered read length of 218.9 base pairs. A 10 bp periodicity was also observed in the fragment length plot. FIG. 16B is a plot showing mapped fragment lengths after removing duplicates in sequencing of the device-prepared gDNA in which ~10 bp periodicity is observed in the fragment length. FIG. 16C is a plot showing coverage of 0.5 MB bins across the genome of U87 cells produced from the on-chip processes in which 8.3 million unique reads were mapped yielding ~0.4× overall coverage of the human genome. This agrees with other libraries prepared by Tn5 tagmentation and is suspected to be a result of the 10.5 bp DNA pitch length. The CNV plot had approximately 0.4× coverage and contained features characteristic of U87 cells, such as deletion of chromosome$_{[SL2]}$ 9 p13. Furthermore, the CNV plot showed an amplification of the centromeres which is caused by the repetitive nature of the DNA in this region.

Example 8: Single-Cell Epitope Staining

An experiment was performed to demonstrate the capture and detection of intracellular proteins from single-cell lysates in microwells by non-specific adsorption of the intra- and extracellular proteins onto the surfaces of the microwells.

Specifically, Calcein AM stained cells (3T3, 500,000 cells/mL) were introduced into a microfluidic device and allowed to settle into microwells. The device was fabricated from PDMS that was not treated with chemicals, surface coatings, or oxygen plasma subsequent to curing. As a result, the PDMS surface of the microwells is highly hydrophobic, thus facilitating non-specific adsorption of protein.

Lysis solution (phosphate buffered saline with 0.1% Triton-X 100) and then oil (Fluorinert FC 770) were injected into the device. Thus, wells contained lysis solution and were sealed with oil. The wells were incubated for 20 minutes at room temperature, 20 minutes at 50° C., and then 90 minutes at room temperature. Following this incubation, the wells were imaged under GFP filters with an epifluorescent microscope. The microfluidic device was then washed with wash buffer (PBS+0.1% Tween 20) and a primary antibody solution (anti-TOP2A, 5 ug/mL) was introduced. After a one-hour incubation, the device was washed again with wash buffer. A Cy5 labeled secondary antibody (anti-rat IgG, 5 ug/mL) was then introduced and allowed to incubate for one hour. The device was washed a final time with wash buffer and imaged with Cy5 filters on an epifluorescent microscope. The process was repeated (1) omitting the primary antibody (Cy5 labeled secondary antibody only) and (2) omitting cells.

The results are shown in FIGS. 25A-25C. FIG. 25A shows fluorescence images of calcein AM in sealed microwells after lysis indicating microwells that contain individual cell lysates (left) and of Cy5 after unsealing the device, washing, and probing the capture surface with anti-TOP2A and Cy5-labeled secondary antibody (right). Cell-containing microwells are Cy5+, indicating TOP2A capture. Microwells without cells are Cy5−. FIG. 25B shows the same as (A) but repeated in the absence of anti-TOP2A antibody. None of the microwells are Cy5+, indicating the specificity of antibody detection of TOP2A. FIG. 25C shows the same as (A) but repeated in the absence of cells. None of the microwells are Cy5+, further indicating the lack of spurious signal for non-specific adsorption.

From FIGS. 25A-25C it can be seen that wells containing cells at the time of lysis also exhibited TOP2A staining. The images show the same region of the microfluidic device. With cell loading, primary antibody staining, and secondary antibody staining, 28 out of 29 cells showed TOP2A staining. When only the secondary antibody was used, none of the wells had a clear Cy5 signal, thus indicating the antibodies are not non-specifically binding to cell lysate. Again, discernible Cy5 signal was not present in the wells for the no-cell control. Therefore, we conclude that the protein containing cell lysate remained present in the wells during these fluid exchange operations, that this protein remained accessible for antibody interactions, that the protein did not become modified in a way that inhibited antibody recognition, and that the lysate containing wells did not have a large secondary, non-specific effect on binding that obscured the antibody signal.

While the above disclosure has been described with reference to exemplary embodiments, those of ordinary skill in the art will understand that various changes in form and details may be made without departing from the spirit and scope of the present invention as defined by the following claims.

REFERENCES

1 Macosko, E. Z., Basu, A., Satija, R., Nemesh, J., Shekhar, K., Goldman, M., Tirosh, I., Bialas, A. R., Kamitaki, N., Martersteck, E. M., Trombetta, J. J., Weitz, D. A., Sanes, J. R., Shalek, A. K., Regev, A. & McCarroll, S. A. Highly Parallel Genome-wide Expression Profiling of Individual Cells Using Nanoliter Droplets. Cell 161, 1202-1214, doi:10.1016/j.cell.2015.05.002 (2015).
2 Klein, A. M., Mazutis, L., Akartuna, I., Tallapragada, N., Veres, A., Li, V., Peshkin, L., Weitz, D. A. & Kirschner, M. W. Droplet barcoding for single-cell transcriptomics applied to embryonic stem cells. Cell 161, 1187-1201, doi:10.1016/j.cell.2015.04.044 (2015).
3 Bose, S., Wan, Z., Carr, A., Rizvi, A. H., Vieira, G., Pe'er, D. & Sims, P. A. Scalable microfluidics for single-cell RNA printing and sequencing. Genome biology 16, 120, doi:10.1186/s13059-015-0684-3 (2015).
4 Yin, Y., Jiang, Y., Berletch, J. B., Disteche, C. M., Noble, W. S., Steemers, F. J., Adey, A. C. & Shendure, J. A. High-throughput mapping of meiotic crossover and chromosome mis-segregation events in interspecific hybrid mice. bioRxiv, 338053, doi:10.1101/338053 (2018).
5 Macaulay, I. C., Haerty, W., Kumar, P., Li, Y. I., Hu, T. X., Teng, M. J., Goolam, M., Saurat, N., Coupland, P., Shirley, L. M., Smith, M., Van der Aa, N., Banerjee, R., Ellis, P. D., Quail, M. A., Swerdlow, H. P., Zernicka-Goetz, M., Livesey, F. J., Ponting, C. P. & Voet, T. G&T-seq: parallel sequencing of single-cell genomes and transcriptomes. Nature methods 12, 519-522, doi: 10.1038/nmeth.3370 (2015).
6 Dey, S. S., Kester, L., Spanjaard, B., Bienko, M. & van Oudenaarden, A. Integrated genome and transcriptome sequencing of the same cell. Nature biotechnology 33, 285-289, doi:10.1038/nbt.3129 (2015).
7 Nam, A. S., Kim, K. T., Chaligne, R., Izzo, F., Ang, C., Taylor, J., Myers, R. M., Abu-Zeinah, G., Brand, R., Omans, N. D., Alonso, A., Sheridan, C., Mariani, M., Dai, X., Harrington, E., Pastore, A., Cubillos-Ruiz, J. R., Tam, W., Hoffman, R., Rabadan, R., Scandura, J. M., Abdel-Wahab, O., Smibert, P. & Landau, D. A. Somatic mutations and cell identity linked by Genotyping of Transcriptomes. Nature, doi:10.1038/s41586-019-1367-0 (2019).
8 Yuan, J., Sheng, J. & Sims, P. A. SCOPE-Seq: a scalable technology for linking live cell imaging and single-cell RNA sequencing. Genome biology 19, 227, doi:10.1186/s13059-018-1607-x (2018).
9 Zahn, H., Steif, A., Laks, E., Eirew, P., Vanlnsberghe, M., Shah, S. P., Aparicio, S. & Hansen, C. L. Scalable whole-genome single-cell library preparation without pre-amplification. Nature methods 14, 167-173, doi:10.1038/nmeth.4140 (2017).
10 Yuan, J., Sheng, J. & Sims, P. A. An Optically Decodable Bead Array for Linking Imaging and Sequencing with Single-Cell Resolution. bioRxiv, doi:10.1101/355677 (2018).
11 Yuan, J. & Sims, P. A. An Automated Microwell Platform for Large-Scale Single Cell RNA-Seq. Sci Rep 6, 33883, doi:10.1038/srep33883 (2016).
12 Yuan, J., Levitin, H. M., Frattini, V., Bush, E. C., Boyett, D. M., Samanamud, J., Ceccarelli, M., Dovas, A., Zanazzi, G., Canoll, P., Bruce, J. N., Lasorella, A., lavarone, A. & Sims, P. A. Single-cell transcriptome analysis of lineage diversity in high-grade glioma. Genome Med 10, 57, doi:10.1186/s13073-018-0567-9 (2018).
13 Zhao, J. et al. Immune and genomic correlates of response to anti-PD-1 immunotherapy in glioblastoma. Nature medicine, doi:10.1038/541591-019-0349-y (2019).
14 Levitin, H. M., Yuan, J., Cheng, Y. L., Ruiz, F. J. R., Bush, E. C., Bruce, J. N., Canoll, P., lavarone, A., Lasorella, A., Blei, D. M. & Sims, P. A. De novo Gene Signature Identification from Single-Cell RNA-seq with Hierarchical Poisson Factorization. Molecular Systems Biology 15 (2019).
15 Mizrak, D., Levitin, H. M., Delgado, A. C., Crotet, V., Yuan, J., Chaker, Z., Silva-Vargas, V., Sims, P. A. & Doetsch, F. Single-Cell Analysis of Regional Differences in Adult V-SVZ Neural Stem Cell Lineages. Cell reports 26, 394-406.e395, doi:10.1016/j.celrep.2018.12.044 (2019).
16 Dean, F. B., Nelson, J. R., Giesler, T. L. & Lasken, R. S. Rapid amplification of plasmid and phage DNA using phi29 DNA polymerase and multiply-primed rolling circle amplification. Genome research 11, 1095-1099 (2001).
17 Dean, F. B., Hosono, S., Fang, L. H., Wu, X. H., Faruqi, A. F., Bray-Ward, P., Sun, Z. Y., Zong, Q. L., Du, Y. F., Du, J., Driscoll, M., Song, W. M., Kingsmore, S. F., Egholm, M. & Lasken, R. S. Comprehensive human genome amplification using multiple displacement amplification. Proceedings of the National Academy of Sciences of the United States of America 99, 5261-5266, doi:10.1073/pnas.082089499 (2002).
18 Blanco, L., Bernad, A., Lázaro, J. M., Martin, G., Garmendia, C. & Salas, M. Highly efficient DNA synthesis by the phage phi 29 DNA polymerase. Symmetrical mode of DNA replication. Journal of Biological Chemistry 264, 8935-8940 (1989).
19 Zong, C., Lu, S., Chapman, A. R. & Xie, X. S. Genome-wide detection of single-nucleotide and copy-number variations of a single human cell. Science (New York, N.Y.) 338, 1622-1626 (2012).
20 Navin, N., Kendall, J., Troge, J., Andrews, P., Rodgers, L., McIndoo, J., Cook, K., Stepansky, A., Levy, D., Esposito, D., Muthuswamy, L., Krasnitz, A., McCombie, W., Hicks, J. & Wigler, M. Tumour evolution inferred by single-cell sequencing. Nature 472, 90-94 (2011).
21 Baslan, T., Kendall, J., Rodgers, L., Cox, H., Riggs, M., Stepansky, A., Troge, J., Ravi, K., Esposito, D., Lakshmi, B., Wigler, M., Navin, N. & Hicks, J. Genome-wide copy number analysis of single cells. Nature protocols 7, 1024-1041, doi:10.1038/nprot.2012.039 (2012).
22 Shiroguchi, K., Jia, T. Z., Sims, P. A. & Xie, X. S. Digital RNA sequencing minimizes sequence-dependent bias and amplification noise with optimized single-molecule barcodes. Proceedings of the National Academy of Sciences of the United States of America 109, 1347-1352 (2012).
23 Chen, C., Xing, D., Tan, L., Li, H., Zhou, G., Huang, L. & Xie, X. S. Single-cell whole-genome analyses by Linear Amplification via Transposon Insertion (LIANTI). Science (New York, N.Y.) 356, 189-194, doi:10.1126/science.aak9787 (2017).
24 Amini, S., Pushkarev, D., Christiansen, L., Kostem, E., Royce, T., Turk, C., Pignatelli, N., Adey, A., Kitzman, J. O., Vijayan, K., Ronaghi, M., Shendure, J., Gunderson, K. L. & Steemers, F. J. Haplotype-resolved whole-genome sequencing by contiguity-preserving transposition and combinatorial indexing. Nat Genet 46, 1343-1349, doi: 10.1038/ng.3119 (2014).
25 Cusanovich, D. A., Daza, R., Adey, A., Pliner, H. A., Christiansen, L., Gunderson, K. L., Steemers, F. J., Trapnell, C. & Shendure, J. Multiplex single cell profiling of chromatin accessibility by combinatorial cellular indexing. Science (New York, N.Y.) 348, 910-914, doi:10.1126/science.aab1601 (2015).
26 Adey, A., Morrison, H. G., Asan, X. X., Kitzman, J. O., Turner, E. H., Stackhouse, B., MacKenzie, A. P., Caruccio, N. C., Zhang, X. & Shendure, J. Rapid, low-input, low-bias construction of shotgun fragment libraries by high-density in vitro transposition. Genome biology 11, R119 (2010).
27 Picelli, S., Bjorklund, A. K., Reinius, B., Sagasser, S., Winberg, G. & Sandberg, R. Tn5 transposase and tagmentation procedures for massively scaled sequencing projects. Genome research 24, 2033-2040, doi:10.1101/gr.177881.114 (2014).

What is claimed is:

1. A method for generating linked single cell RNA sequencing (scRNA-seq) and single cell DNA sequencing (scDNA-seq) libraries, comprising:
   (a) flowing cells onto an asymmetric microwell array device, wherein each microwell viewed from above has a pear-shaped cross-section with a wider and a narrower region;
   (b) flowing onto the array a plurality of the larger sized of DNA barcoding beads or RNA barcoding beads, wherein the larger sized beads and the microwells have relative size permitting only one larger sized bead to fit in the wider region of each microwell, wherein the DNA barcoding beads comprise a plurality of oligonucleotides attached via a cleavable linker on the bead surface, the oligonucleotides comprising;
      (i) a first subset of barcoded oligonucleotides comprising a transposase adaptor, a genomic DNA (gDNA) cell barcode identical for all oligonucleotides on the bead, a PCR adaptor, and optionally a unique molecular identifier (UMI) barcode, wherein the transposase adaptor can hybridize to a transposase-integrated universal adaptor sequence in gDNA, and (ii) a second subset of polyadenylated barcoded oligonucleotides comprising a PCR adaptor, the gDNA cell barcode, a poly(dA), and optionally a UMI barcode, and wherein the RNA barcoding beads comprise a plurality of oligonucleotides attached on the surface, said oligonucleotides comprising a PCR adaptor, a cDNA cell barcode identical for all oligonucleotides on one bead, a poly(dT), and optionally a UMI barcode;

(c) flowing a plurality of the smaller sized of the DNA barcoding beads or the RNA barcoding beads onto the array, wherein the smaller sized beads and the microwells have relative size permitting only one smaller sized bead to fit in the narrower region of each microwell;

(d) flowing lysis buffer onto the array to release gDNA and mRNA and capture mRNA on the RNA barcoding beads;

(e) flowing wash buffer onto the array to remove cell lysate and retain gDNA in the microwells;

(f) flowing a transposase onto the microwell to integrate universal adapters into the gDNA;

(g) flowing a chemical or enzymatic reagent onto the array or exposing the array to UV radiation to release the oligonucleotides on the DNA barcoding, whereby the barcoded oligonucleotides comprising the transposase adaptor hybridize to the transposase-integrated universal adapter in the gDNA, and the polyadenylated barcoded oligonucleotides hybridize to the RNA barcoding bead;

(h) flowing a neutralization buffer onto the array to release transposed, barcoded gDNA fragments from the transposases, whereby a pooled genomic sequencing library can be generated from the gDNA fragments;

(i) flowing a reverse transcription mixture onto the array to reverse transcribe the mRNA to cDNA; and (j) collecting the RNA barcoding beads with attached cDNA, whereby a pooled RNA sequencing library can be generated from the cDNA that also contains barcode information for linking to the gDNA fragments from the same cell.

2. The method of 1, further comprising flowing oil onto the array immediately after flowing the lysis buffer in step (d) and immediately after flowing transposase onto the array in step (f) to seal the microwells.

3. The method of claim 1, wherein the second subset of polyadenylated barcoded oligonucleotides comprises less than 10%, less than 5%, or less than 1% of the first subset of barcoded oligonucleotides.

4. The method of claim 1, wherein the cleavable linker is an enzymatically cleavable linker, a photocleavable linker, or a chemically cleavable linker.

5. The method of claim 1, wherein the cleavable linker is photocleavable biotin or an enzymatically cleavable dU-base.

6. The method of claim 1, wherein the DNA barcoding bead is a polymer bead, wherein the polymer comprises polystyrene (PS), polycaprolactone (PCL), polyisoprene (PIP), poly(lactic acid), polyethylene, polypropylene, polyacrylonitrile, polyimide, polyamide, polyacrylamide, latex, silica, or agarose, and/or mixtures and/or co-polymers thereof.

7. The method of claim 1, wherein the cells are flowed onto the array under limiting dilution to maximize the number of microwells that contain a single cell.

8. The method of claim 1, further comprising imaging the cells one or more times after flowing the cells onto the microwell array device.

9. A method for generating pooled single cell RNA sequencing (scRNA-seq) libraries with barcode information for linking to epitopes from the same single cell, comprising:

(a) flowing cells onto an asymmetric microwell array device, wherein each microwell viewed from above has a pear-shaped cross-section with a wider and a narrower region;

(b) flowing onto the array a plurality of the larger sized of epitope barcoding beads or RNA barcoding beads, wherein the larger sized beads and the microwells have relative size permitting only one larger sized bead to fit in the wider region of each microwell, wherein the epitope barcoding beads comprise a plurality of oligonucleotides attached via a cleavable linker on the bead surface, the oligonucleotides comprising (i) a first subset of barcoded oligonucleotides comprising a PCR adaptor, an epitope cell barcode identical for all oligonucleotides on the bead, a hybridization sequence, and optionally a unique molecular identifier (UMI) barcode, wherein the hybridization sequence can hybridize to a universal adaptor sequence on DNA barcoded antibodies or aptamers, and (ii) a second subset of polyadenylated barcoded oligonucleotides comprising a PCR adaptor, the epitope cell barcode, a poly(dA), and optionally a UMI barcode, and wherein the RNA barcoding beads comprise a plurality of oligonucleotides attached on the surface, said oligonucleotides comprising a PCR adaptor, a cDNA cell barcode identical for all oligonucleotides on one bead, a poly(dT), and optionally a UMI barcode;

(c) flowing a plurality of the smaller sized of the epitope barcoding beads or the RNA barcoding beads onto the array, wherein the smaller sized beads and the microwells have relative size permitting only one smaller sized bead to fit in the narrower region of each microwell;

(d) flowing lysis buffer with DNA barcoded antibodies/aptamers onto the array, whereby released mRNA hybridizes to RNA barcoding beads and antibodies/aptamers bind to released cellular proteins;

(e) flowing a chemical or enzymatic reagent onto the array or exposing the array to UV radiation to release the oligonucleotides on the epitope barcoding bead, whereby the barcoded oligonucleotides hybridize to the universal adapter on the DNA barcoded antibodies/aptamers, and the polyadenylated barcoded oligonucleotides hybridize to the RNA barcoding bead;

(f) flowing wash buffer onto the array and collecting a solution phase containing the DNA barcoded antibodies/aptamers bound to released cellular proteins;

(g) flowing a reverse transcription mixture onto the array to reverse transcribe the mRNA to cDNA; and (h) collecting the RNA barcoding beads with attached cDNA, whereby a pooled RNA sequencing library can be generated from the cDNA that also contains barcode information for linking to the intracellular and surface epitopes from the same cell.

10. The method of 9, further comprising flowing oil onto the array immediately after flowing the lysis buffer in step (d) to seal the microwells.

11. The method of claim 9, wherein the second subset of polyadenylated barcoded oligonucleotides comprises less than 10%, less than 5%, or less than 1% of the first subset of barcoded oligonucleotides.

12. The method of claim 9, wherein the cleavable linker is an enzymatically cleavable linker, a photocleavable linker, or a chemically cleavable linker.

13. The method of claim 9, wherein the cleavable linker is photocleavable biotin or an enzymatically cleavable dU-base.

14. The method of claim 9, wherein the epitope barcoding bead is a polymer bead, wherein the polymer comprises polystyrene (PS), polycaprolactone (PCL), polyisoprene (PIP), poly(lactic acid), polyethylene, polypropylene, polyacrylonitrile, polyimide, polyamide, polyacrylamide, latex, silica, or agarose, and/or mixtures and/or co-polymers thereof.

15. The method of claim 9, wherein the cells are flowed onto the array under limiting dilution to maximize the number of microwells that contain a single cell.

16. The method of claim 9, further comprising imaging the cells one or more times after flowing the cells into the microarray device.

17. A method for generating pooled single cell RNA sequencing (scRNA-seq) libraries with barcode information for linking to epitopes from the same single cell, comprising:
(a) flowing a plurality of cells onto an asymmetric microwell array device, wherein each microwell viewed from above has a pear-shaped cross-section with a wider and a narrower region;
(b) flowing onto the array a plurality of the larger sized of protein binding beads or RNA barcoding beads, wherein the larger sized beads and the microwells have relative size permitting only one larger sized bead to fit in the wider region of each microwell, wherein the protein binding beads, optionally, comprise functional groups for protein binding, and wherein the RNA barcoding beads have a plurality of oligonucleotides attached on the surface comprising a PCR adaptor, a cDNA cell barcode identical for all oligonucleotides on one bead, a poly(dT), and an optional UMI barcode, and, optionally, a small subset of the same oligonucleotides having a sequence complementary to that comprised in a plurality of DNA barcoded antibodies/aptamers in place of the poly(dT);
(c) flowing a plurality of the smaller sized of the protein binding beads or the RNA barcoding beads onto the array, wherein the smaller sized beads and the microwells have relative size permitting only one smaller sized bead to fit in the narrower region of each microwell;
(d) flowing lysis buffer onto the array to release cellular mRNA and intra- and extracellular proteins, whereby mRNA hybridizes to the RNA barcoding beads and proteins are captured on the protein binding beads;
(e) optionally, flowing wash buffer onto the array and flowing a reagent onto the array to quench remaining functional groups on the protein binding bead;
(f) flowing onto the array the DNA barcoded antibodies/aptamers to bind to their protein targets, wherein, optionally, the DNA barcodes can contain a hybridized complementary sequence to prevent premature hybridization to the RNA barcoding bead;
(g) flowing protease onto the array to disrupt the antibody/aptamer-protein complexes and to allow DNA barcodes on antibodies/aptamers to hybridize to the RNA barcoding bead;
(h) optionally, flowing wash buffer onto the array;
(i) flowing a reverse transcription mixture onto the array to reverse transcribe the mRNA to cDNA; and
(j) collecting the RNA barcoding beads with attached cDNA, whereby a pooled RNA sequencing library can be generated from the cDNA that also contains barcode information for linking to the intracellular and surface epitopes from the same cell.

18. The method of 17, wherein the functional groups for protein binding comprise amine-reactive groups, aldehyde groups, NHS groups, or thiol-reactive groups.

19. The method of 17, wherein the protein binding beads comprise hydrophobic surfaces.

20. The method of 17, wherein the protein binding beads comprise surfaces coated in aptamers, antibodies, proteins, or protein-binding small molecules to capture specific proteins or specific sets of proteins.

21. The method of 17, further comprising flowing oil onto the array immediately after flowing the lysis buffer in step (d) and the protease in step (g) to seal the microwells.

22. The method of claim 9, wherein the cells are flowed onto the array under limiting dilution to maximize the number of microwells that contain a single cell.

* * * * *